(12) United States Patent
Chuang et al.

(10) Patent No.: US 10,666,974 B2
(45) Date of Patent: May 26, 2020

(54) METHODS OF ESCAPE PIXEL CODING IN INDEX MAP CODING

(71) Applicant: HFI Innovation Inc., Zhubei, Hsinchu County (TW)

(72) Inventors: Tzu-Der Chuang, Zhubei (TW); Ching-Yeh Chen, Taipei (TW); Yu-Chen Sun, Keelung (TW); Jing Ye, San Jose, CA (US); Shan Liu, San Jose, CA (US); Xiaozhong Xu, Fremont, CA (US); Jungsun Kim, San Jose, CA (US)

(73) Assignee: HFI Innovation Inc., Zhubei, Hsinchu County (TW)

( * ) Notice: Subject to any disclaimer, the term of this patent is extended or adjusted under 35 U.S.C. 154(b) by 195 days.

(21) Appl. No.: 15/524,369

(22) PCT Filed: Nov. 12, 2015

(86) PCT No.: PCT/CN2015/094410
§ 371 (c)(1),
(2) Date: May 4, 2017

(87) PCT Pub. No.: WO2016/074627
PCT Pub. Date: May 19, 2016

(65) Prior Publication Data
US 2019/0116380 A1 Apr. 18, 2019

Related U.S. Application Data

(60) Provisional application No. 62/170,828, filed on Jun. 4, 2015, provisional application No. 62/162,313, filed
(Continued)

(51) Int. Cl.
*H04N 19/157* (2014.01)
*H04N 19/169* (2014.01)
(Continued)

(52) U.S. Cl.
CPC ......... *H04N 19/593* (2014.11); *H04N 19/159* (2014.11); *H04N 19/176* (2014.11);
(Continued)

(58) Field of Classification Search
CPC .... H04N 19/593; H04N 19/159; H04N 19/44; H04N 19/70; H04N 19/176; H04N 19/463
See application file for complete search history.

(56) References Cited

U.S. PATENT DOCUMENTS 5,936,606 A * 8/1999 Lie ........................... G09G 5/02
345/629
6,208,350 B1 * 3/2001 Herrera .............. H04N 21/4143
345/503
(Continued)

FOREIGN PATENT DOCUMENTS

CN 102523367 A 6/2012
EP 1 445 734 A1 8/2004
(Continued)

OTHER PUBLICATIONS

Xiu, X., "Removal of parsing dependency in palette-based coding", Oct. 17-24, 2014 (Year: 2014).*
(Continued)

*Primary Examiner* — Philip P. Dang
(74) *Attorney, Agent, or Firm* — Oblon, McClelland, Maier & Neustadt, L.L.P.

(57) ABSTRACT

A method of video coding with reduced implementation cost by reusing transform coefficient buffer palette for palette coding is disclosed. If the current prediction mode is an Intra prediction mode or the Inter prediction mode, information related to transform coefficients for prediction residual of the current block resulted from Intra prediction or Inter prediction is stored in the transform coefficient buffer. If the current
(Continued)

prediction mode is the palette coding mode, information related to palette data associated with the current block is stored in the transform coefficient buffer. The current block is then encoded or decoded based on the information related to the transform coefficients if the current block is coded in the Intra prediction mode or the Inter prediction mode, or the information related to the palette data stored in the transform coefficient buffer if the current prediction mode is the palette coding mode.

12 Claims, 31 Drawing Sheets

Related U.S. Application Data on May 15, 2015, provisional application No. 62/145,578, filed on Apr. 10, 2015, provisional application No. 62/119,950, filed on Feb. 24, 2015, provisional application No. 62/087,454, filed on Dec. 4, 2014, provisional application No. 62/078,595, filed on Nov. 12, 2014.

(51) Int. Cl.
*H04N 19/46* (2014.01)
*H04N 19/593* (2014.01)
*H04N 19/70* (2014.01)
*H04N 19/463* (2014.01)
*H04N 19/426* (2014.01)
*H04N 19/93* (2014.01)
*H04N 19/159* (2014.01)
*H04N 19/176* (2014.01)
*H04N 19/44* (2014.01)

(52) U.S. Cl.
CPC .......... *H04N 19/426* (2014.11); *H04N 19/44* (2014.11); *H04N 19/463* (2014.11); *H04N 19/70* (2014.11); *H04N 19/93* (2014.11)

(56) References Cited

U.S. PATENT DOCUMENTS

| | | | | |
|---|---|---|---|---|
| 6,237,079 B1* | 5/2001 | Stoney | ................ | G06F 9/3879 711/153 |
| 6,347,157 B2* | 2/2002 | Chui | ................ | G06F 17/148 375/240.19 |
| 6,937,759 B2* | 8/2005 | Ridge | ................ | H04N 1/644 345/589 |
| 7,072,512 B2* | 7/2006 | Mehrotra | ................ | G06T 9/00 382/173 |
| 7,143,353 B2* | 11/2006 | McGee | ................ | G11B 27/105 715/723 |
| 7,302,006 B2* | 11/2007 | Apostolopoulos | ... | H04N 19/176 375/240.24 |
| 7,414,632 B1* | 8/2008 | Piazza | ................ | G06F 3/14 345/592 |
| 7,596,180 B2* | 9/2009 | Sullivan | ................ | H04N 21/25808 375/240.25 |
| 7,634,011 B2* | 12/2009 | Sullivan | ................ | H04N 21/25808 375/240.25 |
| 7,649,943 B2* | 1/2010 | Speed | ................ | H04N 21/25808 375/240.16 |
| 7,660,516 B2* | 2/2010 | McCrossan | ................ | G11B 27/034 386/326 |
| 7,668,242 B2* | 2/2010 | Sullivan | ................ | H04N 21/25808 375/240.25 |
| 8,369,682 B2* | 2/2013 | McCrossan | ................ | G11B 27/034 386/241 |
| 9,116,634 B2* | 8/2015 | Driever | ................ | G06F 12/0646 |
| 9,343,076 B2* | 5/2016 | Davis | ................ | G10L 19/04 |
| 9,477,423 B2* | 10/2016 | Cai | ................ | G06F 3/065 |
| 9,501,401 B2* | 11/2016 | Wang | ................ | G06F 12/0246 |
| 9,558,567 B2* | 1/2017 | Guo | ................ | G06T 9/00 |
| 9,609,336 B2* | 3/2017 | Topiwala | ................ | H04N 19/164 |
| 9,654,777 B2* | 5/2017 | Guo | ................ | H04N 19/50 |
| 2004/0213469 A1* | 10/2004 | Apostolopoulos | ..... | H04N 19/96 382/239 |
| 2008/0238939 A1* | 10/2008 | Tamura | ................ | H04N 5/44504 345/629 |
| 2013/0317833 A1* | 11/2013 | Davis | ................ | G10L 19/04 704/500 |
| 2014/0072239 A1 | 3/2014 | Alakuijala | | |
| 2014/0301474 A1 | 10/2014 | Guo et al. | | |
| 2014/0301475 A1* | 10/2014 | Guo | ................ | H04N 19/50 375/240.24 |
| 2015/0110181 A1* | 4/2015 | Saxena | ................ | H04N 19/176 375/240.12 |
| 2015/0181208 A1* | 6/2015 | Park | ................ | H04N 19/00206 375/240.02 |
| 2016/0100193 A1* | 4/2016 | Mishra | ................ | H04N 19/423 375/240.2 |
| 2016/0330455 A1* | 11/2016 | Lin | ................ | H04N 19/503 |
| 2017/0238001 A1* | 8/2017 | Li | ................ | H04N 19/436 375/240.12 |
| 2017/0318301 A1* | 11/2017 | Li | ................ | H04N 19/176 |

FOREIGN PATENT DOCUMENTS

| | | | | |
|---|---|---|---|---|
| WO | WO 2014/165784 A1 | | 10/2014 | |
| WO | WO-2014165789 A1 | * | 10/2014 | ............ H04N 19/50 |
| WO | 2015/041647 A1 | | 3/2015 | |
| WO | WO-2015041647 A1 | * | 3/2015 | ............ H04N 19/44 |

OTHER PUBLICATIONS

Hsiang, Shih-Ta, "Run coding of the palette index mail using a universal entropy coding scheme", Jun. 30-Jul. 9, 2014 (Year: 2014).*
Zhan Ma, "Ad.vanced. Screen Content Coding using Color Table and Index Map", IEEE Oct. 2014 (Year: 2014).*
Wei Pu, "Non-CE6: Syntax Redundancy .Fixed for•Palette Mode" Oct. 17-24, 2014 (Year: 2014).*
Seung-Hwan Kim, "Non-SCCE3: High Throughput•Palette Coding" Jun. 30-Jul. 9, 2014 (Year: 2014).*
Guillaume Laroche, "AhG10:Run coding for•Palette Coding" Mar. 27-Apr. 4, 2014 (Year: 2014).*
Liwei Guo "Palette Mode for Screen Content Coding" Apr. 18-26, 2013 (Year: 2013).*
Liwei Guo, "Color Palette for Screen Content Coding"—ICIP 2014 (Year: 2014).*
Yu-Chen Sun et al., "CE1-related: Harmonization between JCTVC-T0065 Non CEI: Grouping Palette Indices at Front and CE1 Test A.1.5", Feb. 10-18, 2015 (Year: 2015).*
International Search Report dated Feb. 17, 2016, issued in application No. PCT/CN2015/094410.
Xiu, X., et al.; "Non-CE6 Removal of parsing dependency in palette-based coding;" Joint Collaborative Team on Video Coding (JCT-VC) of ITU-T SG 16 WP 3 and ISO/IEC JTC 1/SC 29/WG 11; Oct. 2014; pp. 1-10.
Gisquet, C., et al.; "Non-SCCE3: memory reduction for palette mode software;" Joint Collaborative Team on Video Coding (JCT-VC) of ITU-T SG 16 WP 3 and ISO/IEC JTC 1/SC 29/WG 11; Jun.-Jul. 2014; pp. 1-6.
"Parallel Programming Guide for HP-UX Systems;" Fifth Edition; Hewlett-Packard; Aug. 2003; pp. 1-423.
Wikipedia page for "Loop interchange;" http://docs.hp.com/en/B3909-90003/ch05s08.html; Mar. 2014; pp. 1-2.
"Writing Efficient Code;" https://jblevins.org/log/efficient-code; Dec. 2010; pp. 1-3.

* cited by examiner

| (20,0,0) | (21,0,0) | (22,0,0) | (23,0,0) | (200,0,0) | (201,0,0) | (202,0,0) | (203,0,0) |
|---|---|---|---|---|---|---|---|
| | | | | | | | |
| | | | | | | | |
| | | | | | | | |
| | | | | | | | |
| | | | | | | | |
| | | | | | | | |
| Pixel 0 | Pixel 1 | Pixel 2 | Pixel 3 | Pixel 4 | Pixel 5 | Pixel 6 | Pixel 7 |

Fig. 3A

| | (20,0,0) | (21,0,0) | (22,0,0) | (23,0,0) | (200,0,0) | (201,0,0) | (202,0,0) | (203,0,0) |
|---|---|---|---|---|---|---|---|---|
| (20,0,0) | | | | | | | | |
| (20,0,0) | | | | | | | | |
| (20,0,0) | | | | | | | | |
| (20,0,0) | | | | | | | | |
| (20,0,0) | | | | | | | | |
| (20,0,0) | | | | | | | | |
| (20,0,0) | | | | | | | | |
| (200,0,0) | Pixel 0 | Pixel 1 | Pixel 2 | Pixel 3 | Pixel 4 | Pixel 5 | Pixel 6 | Pixel 7 |

Fig 6B

|          | (20,0,0) | (21,0,0) | (22,0,0) | (23,0,0) | (200,0,0) | (201,0,0) | (202,0,0) | (203,0,0) |
|----------|----------|----------|----------|----------|-----------|-----------|-----------|-----------|
| (20,0,0) | Pixel 0  | Pixel 1  | Pixel 2  | Pixel 3  | Pixel 4   | Pixel 5   | Pixel 6   | Pixel 7   |
| (20,0,0) |          |          |          |          |           |           |           |           |
| (20,0,0) |          |          |          |          |           |           |           |           |
| (20,0,0) |          |          |          |          |           |           |           |           |
| (20,0,0) |          |          |          |          |           |           |           |           |
| (20,0,0) |          |          |          |          |           |           |           |           |
| (20,0,0) |          |          |          |          |           |           |           |           |
| (200,0,0)|          |          |          |          |           |           |           |           |

Fig. 7B

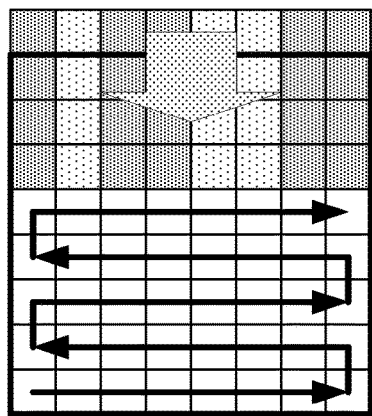
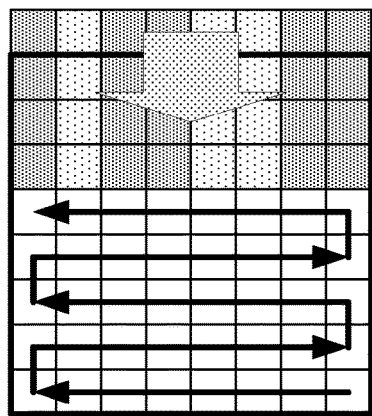
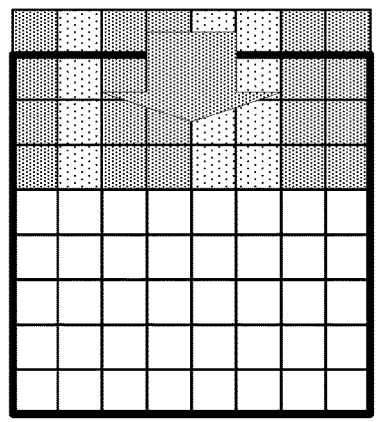
Fig. 12A   Fig. 12B   Fig. 13
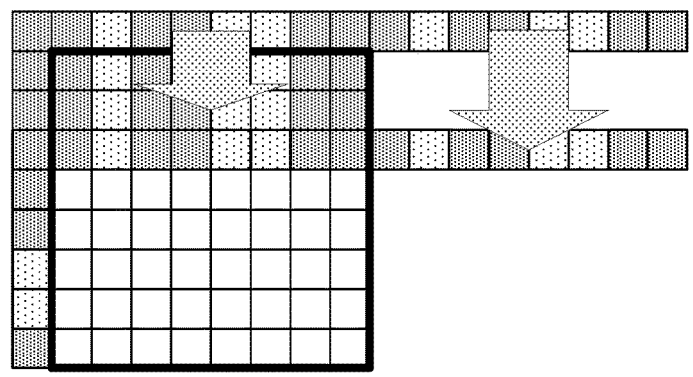
Fig. 14
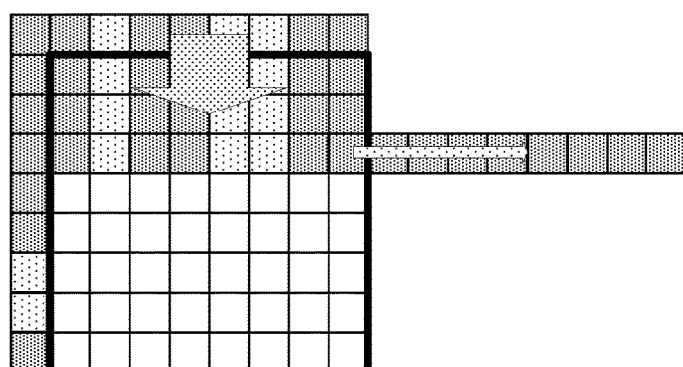
Fig. 15

Fig. 18

| | | | | | | | |
|---|---|---|---|---|---|---|---|
| (20,0,0) N | (20,0,0) N | (20,0,0) N | (20,0,0) N | (20,0,0) N | (18,0,0) N | (200,0,0) N | (200,0,0) N |
| (20,0,0) N | (21,0,0) N | (22,0,0) N | (23,0,0) N | (200,0,0) N | (200,0,0) N | (200,0,0) N | (200,0,0) N |
| (20,0,0) N | (21,0,0) N | (22,0,0) N | (20,0,0) N | (20,0,0) N | (18,0,0) N | (200,0,0) N | (200,0,0) N |
| (20,0,0) N | (21,0,0) N | (22,0,0) N | (20,0,0) N | (20,0,0) N | (18,0,0) N | (200,0,0) N | (200,0,0) N |
| (20,0,0) N | (21,0,0) N | (22,0,0) N | (20,0,0) N | (20,0,0) N | (18,0,0) N | (200,0,0) N | (200,0,0) N |
| (20,0,0) N | (21,0,0) N | (22,0,0) N | (20,0,0) N | (20,0,0) N | (18,0,0) N | (200,0,0) N | (200,0,0) N |
| (20,0,0) N | (21,0,0) N | (22,0,0) N | (20,0,0) N | (20,0,0) N | (18,0,0) N | (200,0,0) N | (200,0,0) N |
| (20,0,0) N | (21,0,0) N | (22,0,0) N | (20,0,0) N | (20,0,0) N | (18,0,0) N | (200,0,0) N | (200,0,0) N |
| (20,0,0) N | (21,0,0) N | (22,0,0) N | (20,0,0) N | (20,0,0) N | (18,0,0) N | (200,0,0) N | (200,0,0) N |

M rows outside the current CU (first two rows)

Fig. 19

| | | | | | | | |
|---|---|---|---|---|---|---|---|
| (20,0,0) N | (20,0,0) N | (20,0,0) N | (20,0,0) N | (20,0,0) N | (18,0,0) N | (200,0,0) N | (200,0,0) N |
| (20,0,0) N | (21,0,0) N | (22,0,0) N | (23,0,0) N | (20,0,0) N | (20,0,0) N | (200,0,0) N | (200,0,0) N |
| (20,0,0) N | (21,0,0) N | (22,0,0) N | (20,0,0) N | (20,0,0) N | (18,0,0) N | (200,0,0) N | (200,0,0) N |
| (20,0,0) N | (21,0,0) N | (22,0,0) N | (20,0,0) N | (20,0,0) N | (18,0,0) N | (200,0,0) N | (200,0,0) N |
| (20,0,0) N | (21,0,0) N | (22,0,0) N | (20,0,0) N | (20,0,0) N | (18,0,0) N | (200,0,0) N | (200,0,0) N |
| (20,0,0) N | (21,0,0) N | (22,0,0) N | (20,0,0) N | (20,0,0) N | (18,0,0) N | (200,0,0) N | (200,0,0) N |
| (80,0,0) 0 | (80,0,0) 0 | (80,0,0) 0 | (80,0,0) 0 | (80,0,0) 0 | (80,0,0) 0 | (80,0,0) 0 | (80,0,0) 0 |
| (80,0,0) 0 | (80,0,0) 0 | (80,0,0) 0 | (80,0,0) 0 | (80,0,0) 0 | (80,0,0) 0 | (80,0,0) 0 | (80,0,0) 0 |
| (80,0,0) 0 | (80,0,0) 0 | (80,0,0) 0 | (80,0,0) 0 | (80,0,0) 0 | (80,0,0) 0 | (80,0,0) 0 | (80,0,0) 0 |
| (80,0,0) 0 | (80,0,0) 0 | (80,0,0) 0 | (80,0,0) 0 | (80,0,0) 0 | (80,0,0) 0 | (80,0,0) 0 | (80,0,0) 0 |

The first two rows are labeled "M rows outside the current CU".

| Colour Index | Pixel Value |
|---|---|
| 0 | (80,0,0) |

Fig. 20

METHODS OF ESCAPE PIXEL CODING IN INDEX MAP CODING

CROSS REFERENCE TO RELATED APPLICATIONS

The present invention claims priority to U.S. Provisional Patent Application Ser. No. 62/078,595, filed on Nov. 12, 2014, U.S. Provisional Patent Application Ser. No. 62/087,454, filed on Dec. 4, 2014, U.S. Provisional Patent Application Ser. No. 62/119,950, filed on Feb. 24, 2015, U.S. Provisional Patent Application Ser. No. 62/145,578, filed on Apr. 10, 2015, U.S. Provisional Patent Application Ser. No. 62/162,313, filed on May 15, 2015 and U.S. Provisional Patent Application, Ser. No. 62/170,828, filed on Jun. 4, 2015. The U.S. Provisional Patent Applications are hereby incorporated by reference in their entireties.

TECHNICAL FIELD

The present invention relates to palette coding for video data. In particular, the present invention relates to various techniques to conserve system memory or increase system throughput by reusing transform coefficient buffer or grouping escape values, palette predictor initialization, palette predictor entry semantics, or palette entry semantics together.

BACKGROUND

High Efficiency Video Coding (HEVC) is a new coding standard that has been developed in recent years. In the High Efficiency Video Coding (HEVC) system, the fixed-size macroblock of H.264/AVC is replaced by a flexible block, named coding unit (CU). Pixels in the CU share the same coding parameters to improve coding efficiency. A CU may begin with a largest CU (LCU), which is also referred as coded tree unit (CTU) in HEVC. In addition to the concept of coding unit, the concept of prediction unit (PU) is also introduced in HEVC. Once the splitting of CU hierarchical tree is done, each leaf CU is further split into one or more prediction units (PUs) according to prediction type and PU partition. Several coding tools for screen content coding have been developed. These tools related to the present invention are briefly reviewed as follow.

Palette Coding

During the development of HEVC screen content coding (SCC), several proposals have been disclosed to address palette-based coding. For example, a palette prediction and sharing technique is disclosed in JCTVC-N0247 (Guo et al., "*RCE3: Results of Test 3.1 on Palette Mode for Screen Content Coding*", Joint Collaborative Team on Video Coding (JCT-VC) of ITU-T SG 16 WP 3 and ISO/IEC JTC 1/SC 29/WG 11, 14th Meeting: Vienna, AT, 25 Jul.-2 Aug. 2013 Document: JCTVC-N0247) and JCTVC-O0218 (Guo et al., "*Evaluation of Palette Mode Coding on HM-12.0+RExt-4.1*", Joint Collaborative Team on Video Coding (JCT-VC) of ITU-T SG 16 WP 3 and ISO/IEC JTC 1/SC 29/WG 11, 15th Meeting: Geneva, CH, 23 Oct.-1 Nov. 2013, Document: JCTVC-O0218). In JCTVC-N0247 and JCTVC-O0218, the palette of each color component is constructed and transmitted. The palette can be predicted (or shared) from its left neighboring CU to reduce the bitrate. All pixels within the given block are then coded using their palette indices. An example of encoding process according to JCTVC-N0247 is shown as follows.

Transmission of the palette: the color index table (also called palette table) size is first transmitted followed by the palette elements (i.e., color values).

Transmission of pixel palette index values (indices pointing to the colors in the palette): the index values for the pixels in the CU are encoded in a raster scan order. For each position, a flag is first transmitted to indicate whether the "run mode" or "copy above run mode" is being used.

a. "Run mode": In "run mode", a palette index is first signaled followed by "palette_run" (e.g., M). No further information needs to be transmitted for the current position and the following M positions as they have the same palette index as signaled. The palette index (e.g., i) is shared by all three color components, which means that the reconstructed pixel values are (Y, U, V)= (palette$_Y$[i], palette$_U$[i], palette$_V$[i]) (assuming the color space is YUV).

b. "Copy-above run mode": In "copy above run mode", a value "copy_run" (e.g., N) is transmitted to indicate that for the following N positions (including the current one), the palette indices are equal to the palette indices of the ones that are at the same positions in the row above.

Transmission of residue: the palette indices transmitted in Stage 2 are converted back to pixel values and used as the prediction. Residue information is transmitted using HEVC residual coding and is added to the prediction for the reconstruction.

In JCTVC-N0247, palette of each component is constructed and transmitted. The palette can be predicted (or shared) from its left neighboring CU to reduce the bitrate. In JCTVC-O0218, each element in the palette is a triplet, representing a specific combination of the three color components. The predictive coding of palette across CU is removed.

In JCTVC-O0182 (Guo et al., "AHG8. Major-color-based screen content coding", Joint Collaborative Team on Video Coding (JCT-VC) of ITU-T SG 16 WP 3 and ISO/IEC JTC 1/SC 29/WG 11, 15th Meeting: Geneva, CH, 23 Oct.-1 Nov. 2013, Document: JCTVC-O0182), another palette coding method is disclosed. Instead of predicting the entire palette table from the left CU, individual palette color entry in a palette can be predicted from the exact corresponding palette color entry in the above CU or left CU.

For transmission of pixel palette index values, a predictive coding method is applied on the indices according to JCTVC-O0182. An index line can be predicted by different modes. In specific, three kinds of line modes are used for an index line, i.e. horizontal mode, vertical mode and normal mode. In horizontal mode, all indices in the same line have the same value. If the value is the same as the first pixel of the above pixel line, only line mode signaling bits are transmitted. Otherwise, the index value is also transmitted. In vertical mode, the current index line is the same with the above index line. Therefore, only line mode signaling bits are transmitted. In normal mode, indices in a line are predicted individually. For each index position, the left or above neighbor is used as predictor, and the prediction symbol is transmitted to the decoder.

Furthermore, according to JCTVC-O0182, pixels are classified into major color pixels (with palette indices pointing to the palette colors) and escape pixel. For major color pixels, the decoder reconstructs the pixel value according to the major color index (I.e., palette index in JCTVC-N0247 and JCTVC-O0182) and palette table. For escape pixel, the encoder will further send the pixel value.

Signaling of Palette Table

In the reference software of Screen Content Coding (SCC) standard, SCM-2.0 (JCTVC-R1014: Joshi, et al., *Screen content coding test model* 2 (SCM 2), Joint Collaborative Team on Video Coding (JCT-VC) of ITU-T SG 16 WP 3 and ISO/IEC JTC 1/SC 29/WG 11, 18th Meeting: Sapporo, JP, 30 Jun.-9 Jul. 2014, Document: JCTVC-R1014), the palette table of last coded palette CU is used as a predictor for the current palette table coding. In palette table coding, a palette_share_flag is first signaled. If palette_share_flag is 1, all the palette colors in the last coded palette table are reused for the current CU. The current palette size is equal to the palette size of the last coded palette CU in this case. Otherwise (i.e., palette_share_flag is 0), the current palette table is signaled by indicating which palette colors in the last coded palette table can be reused, or by transmitting a new palette colors. The size of the current palette is set as the size of the predicted palette (i.e., numPredPreviousPalette) plus the size of the transmitted palette (i.e., num_signaled_palette_entries). The predicted palette is a palette derived from the previously reconstructed palette coded CUs. When coding the current CU as a palette mode, the palette colors are not predicted using the predicted palette are directly transmitted via the bitstream. For example, if current CU is coded as a palette mode with a palette size equal to six. If three of the six major colors are predicted from the palette predictor and three are directly transmitted through the bitstream. The following pseudo codes illustrate an example of transmitted three palette colors using the sample syntax mentioned above.

```
num_signaled_palette_entries = 3
for( cIdx = 0; cIdx < 3; cIdx++ ) // signal colors for different components
    for( i = 0; i < num_signaled_palette_entries; i++ )
        palette_entries[ cIdx ][ numPredPreviousPalette + i ]
```

Since the palette size is six in this example, the palette indices from 0 to 5 are used to indicate each palette coded pixel and each palette can be reconstructed as the major color in the palette color table.

In SCM-2.0, if the wavefront parallel processing (WPP) is not applied, the last coded palette table is initialized (i.e., reset) at the beginning of each slice or at the beginning of each tile. If the WPP is applied, the last coded palette table is not only initialized (reset) at the beginning of each slice or at the beginning of each tile, but also initialized (i.e., reset) at the beginning of each CTU row.

Palette Index Map Scan Order

In SCM-3.0 (JCTVC-S1014, Joshi, et al., "*Screen content coding test model* 3 (*SCM* 3)", Joint Collaborative Team on Video Coding (JCT-VC) of ITU-T SG 16 WP 3 and ISO/IEC JTC 1/SC 29/WG 11, 19th Meeting: Strasbourg, FR, 17-24 Oct. 2014, Document: JCTVC-S1014) palette mode coding, the traverse scan is used for index map coding as shown in FIG. 1. FIG. 1 illustrates an example of traverse scan for an 8×8 block. In traverse scan, the scan for the even rows is from left to right, and the scan for the odd rows is from right to left. The traverse scan is applied for all block sizes in palette mode.

Palette Index Map Coding in SCM-4.0

In SCM-4.0 (JCTVC-T1014: Joshi, et al., *Screen content coding test model* 4(SCM 4), Joint Collaborative Team on Video Coding (JCT-VC) of ITU-T SG 16 WP 3 and ISO/IEC JTC 1/SC 29/WG 11, 20th Meeting: Geneva, CH, 10-18 Feb. 2015, Document: JCTVC-T1014) palette mode coding, the palette indices are grouped and signaled in the front of the coded data for a corresponding block (i.e., before palette_run_mode and palette_run coding). On the other hand, the escape pixels are coded at the end of the coded data for the corresponding block. The syntax elements, palette_run_mode and palette_run are coded between palette indices and escape pixels. FIG. 2 illustrates an exemplary flowchart for index map syntax signaling according to SCM 4.0. The number of indices (210), last runtype flag (230) and grouped indices (220) are signaled. After signaling index information, a pair of run type (240) and number of runs (250) is repeatedly signalled. At last, a group of escape values (260) is signalled, if necessary.

Palette Predictor Initialization

In SCM-4.0, a global palette predictor set is signaled in PPS (picture parameter set). Instead of resetting all palette prediction states, including PredictorPaletteSize, PreviousPaletteSize and PredictorPaletteEntries, to 0, values obtained from the PPS are used instead.

Palette Syntax

For a run of indices in the index map, there are several elements that need to be signaled, including:

1) Run type: it is either a copy above run or a copy index run.
2) Palette index: it is used to signal which index is used for this run in a copy index run.
3) Run length: it represents the length of this run for both copy above and copy index type.
4) Escape pixel: if there are N (N>=1) escape pixels in the run, N pixel values need to be signaled for these N escape pixels.

In JCTVC-T0064 (JCTVC-S1014: Joshi, et al., *Screen content coding test model* 4 (*SCM* 4), Joint Collaborative Team on Video Coding (JCT-VC) of ITU-T SG 16 WP 3 and ISO/IEC JTC 1/SC 29/WG 11, 20th Meeting: Geneva, CH, 10-18 Feb. 2015, Document: JCTVC-T1014), all the palette indices are grouped together. The number of palette indices is signaled first, followed by the palette indices.

According to existing HEVC specification, while palette indices for each color component are grouped together, most other palette coding related data for different color components are interleaved in the bitstream. Furthermore, individual memory space for storing an Inter/Intra coded block and storing a palette coded block. It is desired to develop techniques to improve system throughput and/or reduce system implementation cost.

SUMMARY

A method of video coding with reduced implementation cost by reusing transform coefficient buffer palette for palette coding is disclosed. If the current prediction mode is an Intra prediction mode or the Inter prediction mode, information related to transform coefficients for prediction residual of the current block resulted from Intra prediction or Inter prediction is stored in the transform coefficient buffer. If the current prediction mode is the palette coding mode, information related to palette data associated with the current block is stored in the transform coefficient buffer. The current block is then encoded or decoded based on the information related to the transform coefficients if the current block is coded in the Intra prediction mode or the Inter prediction mode, or the information related to the palette data stored in the transform coefficient buffer if the current prediction mode is the palette coding mode.

If the current prediction mode is the palette coding mode, the palette data may correspond to palette run type, palette index, palette run, escape values, escape flags, palette table or any combination thereof associated with the current block. The information related to the palette data may correspond to the palette data, parsed palette data, or reconstructed palette data. For example, parsed palette indices for samples of the current block are reconstructed in a parsing stage, and reconstructed palette indices and reconstructed escape values are stored in the transform coefficient buffer at a decoder side. In another example, parsed palette indices for samples of the current block are reconstructed, reconstructed palette indices are further reconstructed into reconstructed pixel values using a palette table in a parsing stage, and the reconstructed pixel values and reconstructed escape values are stored in the transform coefficient buffer at a decoder side. Furthermore, one storage area can be designated to store the palette table during the parsing stage, and the storage area can be released from use by the palette table during reconstruction stage. Escape flags may also be stored in the transform coefficient buffer at the decoder side. In yet another example, escape flags are stored in a part of the transform coefficient buffer (for example, the most significant bit (MSB) part of transform coefficient buffer), and reconstructed pixel values or escape values are stored in another part of the transform coefficient buffer.

In another embodiment, if a current prediction mode is the palette coding mode, all escape values for a same color component grouped together are parsed from the video bitstream at a decoder side, or all escape values for the same color component are grouped together at an encoder side. Information including the escape values is then used for encoding or decoding of the current block. The grouped escape values for the same color component can be signaled at the end of coded palette data for the current block. The grouped escape values for different color components can be signaled separately for the current block. The grouped escape values for the same color component of the current block can be stored in a transform coefficient buffer. The grouped escape values for different color components can share the transform coefficient buffer by storing the grouped escape values for one color component in the transform coefficient buffer at a time.

In yet another embodiment, all initial palette predictor values for a same color component grouped together are parsed from sequence parameter set (SPS), picture parameter set (PPS), or a slice header of a video bitstream at a decoder side, or all initial palette predictor values for the same color component are grouped together at an encoder side. At least one palette coded block within a corresponding sequence, picture or slice is encoded or decoded using the initial palette predictor values.

In still yet another embodiment, all palette predictor entries or palette entries for a same color component grouped together for a current block are parsed from a video bitstream at a decoder side, or all palette predictor entries or palette entries for the same color component are grouped together at an encoder side. The current block is then encoded or decoded using a palette predictor consisting of all palette predictor entries or a palette table consisting of all palette entries.

BRIEF DESCRIPTION OF THE DRAWINGS

FIG. 3A illustrates an example index map flipping before the index coding.

In FIG. 5A, the line-filled blocks represent the flipped index map while the clear blocks in FIG. 5B represent the original index map.

FIGS. 6A-B illustrate another example of prediction from above CU with flipped index map according to an embodiment of the present invention, where the copy-above run coded pixels of the first row are predicted from the samples in their physical nearest positions. In FIG. 6A, the line-filled blocks represent the flipped index map while the clear blocks in FIG. 6B represent the original index map.

FIGS. 7A-B illustrate another example of prediction from above CU with flipped index map according to an embodiment of the present invention, where the copy-above run coded pixels of the last row are predicted from their physical pixel positions of the above neighboring CU. In FIG. 7A, the line-filled blocks represent the flipped index map while the clear blocks in FIG. 7B represent the original index map.

FIGS. 12A-B illustrate two different scan patterns with reverse scan according to an embodiment of the present invention for prediction across a CU.

FIG. 13 illustrates an example of extending the row-based copy pixel from neighboring CU to an 8×8 CU coded in the Inter mode.

FIG. 14 illustrates an example of changing the positions of the neighboring reference pixels according to an embodiment of the present invention, where the upper-right reference pixels are copied from the upper-right CU.

FIG. 15 illustrates another example of changing the positions of the neighboring reference pixels according to an embodiment of the present invention, where the upper-right reference pixels are copied from the right-most pixels of the third row.

FIG. 18 illustrates an example of using a special index for the neighboring constructed pixel (NCPs), denoted as N, across a CU boundary.

FIG. 19 illustrates an example of using a special index for the neighboring constructed pixel (NCPs) in the case that the maximal index value is 0.

FIG. 20 illustrates an example of using a special index for the neighboring constructed pixel (NCPs) in the case that the maximal index value is 1.

DETAILED DESCRIPTION

Figure 1:
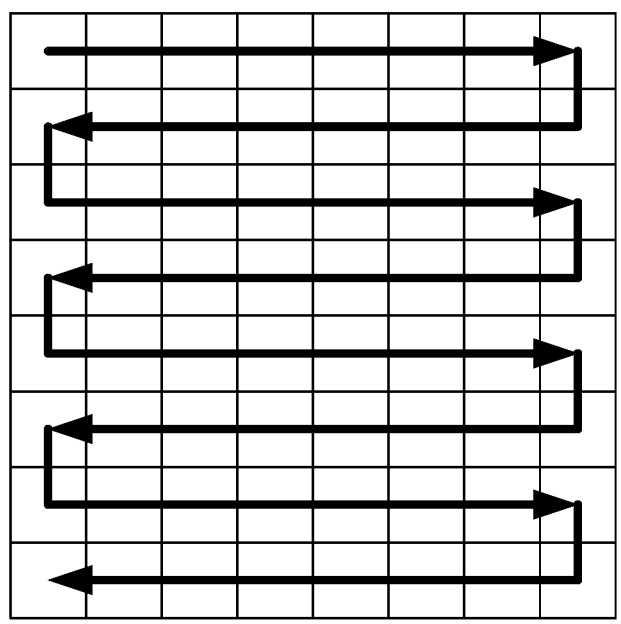
FIG. 1 illustrates an example of traverse scan for an 8×8 block.

The following description is of the best-contemplated mode of carrying out the invention. This description is made for the purpose of illustrating the general principles of the invention and should not be taken in a limiting sense. The scope of the invention is best determined by reference to the appended claims.

Reuse of HEVC Transform Coefficient Buffer for Palette Related Information

In HEVC, Inter prediction and Intra prediction are available coding modes in addition to palette coding. When Inter or Intra prediction is used, transform coding is often applied to the prediction residual resulted from Inter/Intra prediction. The transform coefficients are then quantized and entropy coded for inclusion in the coded bitstream. At the decoder side, the reverse operation is applied to the received bitstream. In other words, entropy decoding is applied to the bitstream to recover the coded symbols corresponding to quantized transform coefficients. The quantized transform coefficients are then dequantized and inverse-transformed to reconstruct the Inter/Intra prediction residual. A transform coefficient buffer is often used in the encoder side and the decoder side to store transform coefficients as required between the entropy coding and quantization/transform operations.

For color video data, multiple transform coefficient buffers may be needed. However, it is also possible to configure the system to process one color component at a time so that only one transform coefficient buffer is needed. When a block is palette coded, no transform is applied to the block and the transform coefficient buffer is not used. In order to save system implementation cost, an embodiment of present invention reuses the transform coefficient buffer to store palette coding related data. Accordingly, for an Inter/Intra coded block, the decoded coefficients of a TU are stored in the coefficient buffer during the coefficient parsing stage. However, for a SCC (screen content coding) coded block, there is no residual coding needed for the palette coded block. Therefore, according to one embodiment of the present invention, the transform coefficient buffer is used to store the palette coding related information, which may include the palette run type, palette index, palette run, escape values, escape flags, palette table or any combination thereof.

For example, the parsed palette indices for samples of a block are reconstructed in the parsing stage. The transform coefficient buffer is used to store the reconstructed palette indices and escape values.

In another example, the parsed palette indices for samples of a block are reconstructed in the parsing stage. The parsed indices are used to reconstruct pixel values for a corresponding color component using palette table lookup in the parsing stage. Therefore, the coefficient buffer is used to store the reconstructed pixel values and escape values, or is used to store the reconstructed pixel values, escape values and escape flags. In this case, the palette table only needs to be stored in the parsing stage. There is no need for storing and maintaining the palette table during the reconstruction stage.

The data depth required for transform coefficients may be much higher that that for the palette codign related data. For example, the transform coefficient may require a buffer with 16-bit depth. However, for palette coding, if the maximum palette index is 63, the storage for palette indices requires only 6-bit depth. Furthermore, the maximum bit-length for an escape value is equal to the bit-depth, which is 8 or 10 bits typically. Therefore, a portion of the 16 bits (i.e., 8 or 6 bits) are idle and can be used to store the information for the escape flag. For example, the six MSB (most significant bits) of the coefficient buffer can be used for storing the escape flags. The rest bits are used to store the reconstructed pixel values or escape values. In the reconstruction stage, the MSB can be used to reconstruct the escape values or the reconstructed pixel values directly.

In yet another example, the parsed palette indices of samples are reconstructed in the parsing stage and the reconstructed values of different color components are also reconstructed using palette table lookup in the parsing stage. The pixel values of the escape sample are also reconstructed by the escape values in the parsing stage. Therefore, the coefficient buffer is used to store the reconstructed pixel values. In this case, the palette table only needs to be stored in the parsing stage. The reconstruction stage doesn't need to store and maintain the palette table.

Grouping the Escape Values of the Same Color Component

In SCM-4.0 (JCTVC-T1014: Joshi, et al., *Screen content coding test model 4* (*SCM 4*), Joint Collaborative Team on Video Coding (JCT-VC) of ITU-T SG 16 WP 3 and ISO/IEC JTC 1/SC 29/WG 11, 20th Meeting: Geneva, CH, 10-18 Feb. 2015, Document: JCTVC-T1014), the escape values for three color components are grouped together. In other words, for each sample, the escape values of three components are coded sequentially. A syntax table of the escape value coding according to JCTVC-T1014 is shown in Table 1.

TABLE 1

| palette_coding( x0, y0, nCbS ) { | Note |
|---|---|
| .... | |
| if( palette_escape_val_present_flag ) { | |
|   sPos = 0 | |
|   while( sPos < nCbS * nCbS ) { | |
|     xC = x0 + travScan[ sPos ][ 0 ] | |
|     yC = y0 + travScan[ sPos ][ 1 ] | |
|     if( PaletteIndexMap[ xC ][ yC ] = = MaxPaletteIndex ) { | |
|       for( cIdx = 0; cIdx < numComps; cIdx++ ) | |
|         if( cIdx = = 0 \|\| | |
|           ( xR % 2 = = 0 && yR % 2 = = 0 && | |
|           ChromaArrayType = = 1) \|\| | |
|           ( xR % 2 = = 0 && ChromaArrayType = = 2) \|\| | |
|           ChromaArrayType = = 3 ) { | |
|           palette_escape_val | |
|           PaletteEscapeVal[ cIdx ][ xC ][ yC ] = | |
|           palette_escape_val | |
|         } | |
|       } | |
|     sPos++ | |
|   } | |
| } | |
| .... | |
| } | |

Since there is no residual coding for the palette mode, the coefficient buffer can be reused to store the palette index map information. In HEVC coefficient parsing, only the TU of one color component is parsed at a time. The syntax parser may only have one coefficient buffer for one color component and only one coefficient buffer of one color component can be accessed. However, in the palette coding, one palette index represents the pixel values of multiple color components. The palette mode can decode multiple color component values at a time. The palette index can be store in one coefficient buffer of one color component. However, in current SCM-4.0 syntax parsing order, the escape values might need three coefficient buffers for three color components.

Therefore, according to another embodiment, the syntax parsing order of the escape values is changed to overcome the issue related to the need for three coefficient buffers to stroe three color components. The escape values of the same color component are grouped together and signaled at the end of the palette syntax coding for the block. The escape values of the different color components are signaled separately. An exemplary syntax table for palette coding incorporating this embodiment is shown in Table 2.

TABLE 2

| palette_coding( x0, y0, nCbS ) { | Note |
|---|---|
| .... | |
| if( palette_escape_val_present_flag ) { | |
|   for( cIdx = 0; cIdx < numComps; cIdx++ ){ | (2-2) |
|     sPos = 0 | (2-3) |
|     while( sPos < nCbS * nCbS ) { | |
|       xC = x0 + travScan[ sPos ][ 0 ] | |
|       yC = y0 + travScan[ sPos ][ 1 ] | |
|       if( PaletteIndexMap[ xC ][ yC ] = = MaxPaletteIndex ) { | |
|         for( cIdx = 0; cIdx < numComps; cIdx++ ) | (2-1) |
|           if( cIdx = = 0 \|\| | |
|           ( xR % 2 = = 0 && yR % 2 = = 0 && | |
|           ChromaArrayType = = 1 ) \|\| | |
|           ( xR % 2 = = 0 && ChromaArrayType = = 2 ) \|\| | |
|           ChromaArrayType = = 3 ) { | |
|           palette_escape_val | |
|           PaletteEscapeVal[ cIdx ][ xC ][ yC ] = | |
|           palette_escape_val | |
|         } | |
|       } | |
|       sPos++ | |
|     } | |
| } | |
| .... | |
| } | |

In Table 2, the text in line-filled area indicates deletion. The do-loop statement over different color components (i.e., "for(cIdx=0; cIdx <numComps; cIdx++)") is moved up from the original location indicated by Note (2-1) to the new location indicated by Note (2-2). Accordingly, it can parse all the escape values of one color component for a CU. The palette indices and the escape values of the first color component (i.e., cIdx equal to 0) can be written out and then the parser can reuse the same buffer to parse the information of the second color component. With the syntax changes in Table 2, one coefficient buffer to store palette coding related data for one color component is enough for palette mode parsing. The implementation complexity and cost of SCC parser are not increased.

Grouping the Palette Predictor Initialization of the Same Color Component

In SCM 4.0, a set of PPS (Picture Parameter Set) syntax element is signaled to specify the palette predictor initializer. The existing syntax for PPS extension is shown in Table 3.

TABLE 3

| pps_scc_extension( ) { | Note |
|---|---|
| palette_predictor_initializer_present_flag | |
| if( palette_predictor_initializer_present_flag ) { | |
|   monochrome_palette_flag | |
|   luma_bit_depth_entry_minus8 | |
|   if( !monochrome_palette_flag ) | |
|     chroma_bit_depth_entry_minus8 | |
|   num_palette_predictor_initializer_minus1 | |
|   numComps = monochrome_palette_flag ? 1 : 3 | |
|   for( i = 0; i <= num_palette_predictor_initializer_minus1; i++ ) | |
|     for( comp = 0; comp < numComps; comp++ ) | |
|       palette_predictor_initializers[ i ][ comp ] | |
| } | |
| } | |

The palette predictor initialization process according to the existing SCM 4.0 is shown as follows:
  Outputs of this process are the initialized palette predictor variables PredictorPaletteSize and PredictorPaletteEntries.
  The PredictorPaletteSize is derived as follows:
    If palette_predictor_initializer_present_flag is equal to 1, PredictorPaletteSize is set equal to num_palette_predictor_initializer_minus1 plus 1.
    Otherwise (palette_predictor_initializer_present_flag is equal to 0), PredictorPaletteSize is set equal to 0.
  The array PredictorPaletteEntries is derived as follows:

- If palette_predictor_initializer_present_flag is equal to 1,
  for( i = 0; i < PredictorPaletteSize; i++ )
    for( comp = 0; comp < 3; comp++ )
      PredictorPaletteEntries[ i ][ comp ] = palette_predictor_initializers[ i ][ comp ]
- Otherwise (palette_predictor_initializer_present_flag is equal to 0), PredictorPaletteEntries is set equal to 0.

In one embodiment, the predictor initialization values can be grouped together for the Y component, Cb component, Cr component respectively. The syntax changes are as shown in Table 4. Compared to Table 3, the two do-loop statements are exchanged as indicated by Note (4-1) and Note (4-2) so as to group the palette predictor initialization of the same color component.

TABLE 4

| pps_scc_extension( ) { | Note |
|---|---|
| palette_predictor_initializer_present_flag | |
| if( palette_predictor_initializer_present_flag ) { | |
|   monochrome_palette_flag | |
|   luma_bit_depth_entry_minus8 | |
|   if( !monochrome_palette_flag ) | |
|     chroma_bit_depth_entry_minus8 | |
|   num_palette_predictor_initializer_minus1 | |
|   numComps = monochrome_palette_flag ? 1 : 3 | |
|   for( comp = 0; comp < numComps; comp++ ) | (4-1) |
|     for( i = 0; | (4-2) |
|     i <= num_palette_predictor_initializer_minus1; i++ ) | |
|       palette_predictor_initializers[ i ][ comp ] | |
| } | |
| } | |

An exemplary palette predictor initialization process corresponding to the above embodiment is shown as follows.
  Outputs of this process are the initialized palette predictor variables PredictorPaletteSize and PredictorPaletteEntries.
  The PredictorPaletteSize is derived as follows:
    If palette_predictor_initializer_present_flag is equal to 1, PredictorPaletteSize is set equal to num_palette_predictor_initializer_minus1 plus 1.
    Otherwise (palette_predictor_initializer_present_flag is equal to 0), PredictorPaletteSize is set equal to 0
  The array PredictorPaletteEntries is derived as follows:

- If palette_predictor_initializer_present_flag is equal to 1,
  for( comp = 0; comp < 3; comp++ )
    for( i = 0; i < PredictorPaletteSize; i++ )
      PredictorPaletteEntries[ i ][ comp ] = palette_predictor_initializers[ i ][ comp ]
- Otherwise (palette_predictor_initializer_present_flag is equal to 0), PredictorPaletteEntries is set equal to 0.

If the palette predictor initializer is signaled at SPS (sequence parameter set) or slice header, the same grouping method can be applied. In other words, all initialization values for the Y component are signaled together, all initialization values for Cb component are signaled together, and all initialization values for Cr component are signaled together.

Grouping the Palette Predictor Update Process of the Same Color Component

The existing palette predictor update process is as follows.

The variable numComps is derived as shown in equation (1):

$$numComps=(ChromaArrayType==0)?1:3 \qquad (1)$$

The variables PredictorPaletteSize and PredictorPaletteEntries are modified as shown by the pseudo codes in Table 5.

TABLE 5

| | Note |
|---|---|
| for( i = 0; i < CurrentPaletteSize; i++ ) | (5-1) |
|   for( cIdx = 0; cIdx < numComps; cIdx++ ) | (5-2) |
|     newPredictorPaletteEntries[ cIdx ][ i ] = CurrentPaletteEntries[ cIdx ][ i ] | |
| newPredictorPaletteSize = CurrentPaletteSize | (5-3) |
| for( i = 0; i < PredictorPaletteSize && newPredictorPaletteSize < PaletteMaxPredictorSize; i++ ) | |
|   if( PalettePredictorEntryReuseFlag[ i ] != 1 ) { | (5-4) |
|     for( cIdx = 0; cIdx < numComps; cIdx++ ) | |
|       newPredictorPaletteEntries[ cIdx ][ newPredictorPaletteSize ] = PredictorPaletteEntries[ cIdx ][ i ] | |
|     newPredictorPaletteSize ++ | |
|   } | (5-5) |
| for( cIdx = 0; cIdx < numComps; cIdx++ ) | (5-6) |
|   for( i = 0; i < newPredictorPaletteSize; i++ ) | |
|     PredictorPaletteEntries[ cIdx ][ i ] = newPredictorPaletteEntries[ cIdx ][ i ] | |
| PredictorPaletteSize = newPredictorPaletteSize | |

As shown in Table 5, the first part of newPredictorPaletteEntries update process is performed within the double do-loop indicated by Note (5-1) and Note (5-2), where the do-loop associated with the color component (i.e., cIdx) is in the inner do-loop. Therefore, for each palette entry, three color components are updated. The two do-loop statements for the rest newPredictorPaletteEntries update are indicated by Note (5-3) and Note (5-4), where the do-loop statement for different color components corresponds to the inner loop. Therefore, for each entry, three color components are updated. The two do-loop statements for PredictorPaletteEntries update are indicated by Note (5-5) and Note (5-6), where the do-loop statement for different color components corresponds to the outer loop. Therefore, the PredictorPaletteEntries values are updated for each color component.

In one embodiment, the palette predictors for the three respective components are grouped, and then updated. Exemplary modifications to the existing update process are shown as follows.

The derivation of variable numComps stays the same as equation (1). The variables PredictorPaletteSize and PredictorPaletteEntries are modified as shown by the following exemplary pseudo codes in Table 6.

TABLE 6

| | Note |
|---|---|
| for( cIdx = 0; cIdx < numComps; cIdx++ ) | (6-1) |
|    for( i = 0; i < CurrentPaletteSize; i++ ) ) | (6-2) |
|       newPredictorPaletteEntries[ cIdx ][ i ] = CurrentPaletteEntries[ cIdx ][ i ] | |
| newPredictorPaletteSize = CurrentPaletteSize | (6-3) |
| for(i = 0; i < PredictorPaletteSize && newPredictorPaletteSize < PaletteMaxPredictorSize; i++) | |
|    if( PalettePredictorEntryReuseFlag[ i ] != 1 ) { | (6-4) |
|       for( cIdx = 0; cIdx < numComps; cIdx++ ) | |
|          newPredictorPaletteEntries[ cIdx ] [ newPredictorPaletteSize ] = PredictorPaletteEntries [ cIdx ][ i ] | |
|       newPredictorPaletteSize ++ | |
|    } | (6-5) |
| for( cIdx = 0; cIdx < numComps; cIdx++ ) | (6-6) |
|    for( i = 0; i < newPredictorPaletteSize; i++ ) | |
|       PredictorPaletteEntries[ cIdx ][ i ] = newPredictorPaletteEntries[ cIdx ][ i ] | |
| PredictorPaletteSize = newPredictorPaletteSize | |

In the above example, the two do-loop statements for the first part newPredictorPaletteEntries update are indicated by Note (6-1) and Note (6-2), where the do-loop statement for different color components corresponds to the outer loop. Therefore, the rest newPredictorPaletteEntries values are updated for each color component. The newPredictorPaletteEntries update process as indicated by the double do-loop indicated by Note (6-3) and Note (6-4) stays the same as the existing update process in Table 5. The PredictorPaletteEntries update process as indicated by the double do-loop indicated by Note (6-5) and Note (6-6) stays the same as the existing update process in Table 5.

In another embodiment, the variables PredictorPaletteSize and PredictorPaletteEntries are modified as shown by the following exemplary pseudo codes in Table 7.

TABLE 7

| | Note |
|---|---|
| for( cIdx = 0; cIdx < numComps; cIdx++ ) | (7-1) |
|    for( i = 0; i < CurrentPaletteSize; i++ ) | (7-2) |
|       newPredictorPaletteEntries[ cIdx ][ i ] = CurrentPaletteEntries[ cIdx ][ i ] | |
| for( cIdx = 0; cIdx < numComps; cIdx++ ) | (7-3) |
| { | |
|    newPredictorPaletteSize = CurrentPaletteSize | |
|    for( i = 0; i < PredictorPaletteSize && newPredictorPaletteSize < PaletteMaxPredictorSize; i++ ) | (7-4) |
|       if( PalettePredictorEntryReuseFlag[ i ] != 1 ) { | |
|          newPredictorPaletteEntries[ cIdx ] [ newPredictorPaletteSize ]= PredictorPaletteEntries[ cIdx ][ i ] | |
|          newPredictorPaletteSize ++ | |
|       } | |
| } | (7-5) |

TABLE 7-continued

| | Note |
|---|---|
|    for( cIdx = 0; cIdx < numComps; cIdx++ ) | (7-6) |
|       for( i = 0; i < newPredictorPaletteSize; i++ ) | |
|          PredictorPaletteEntries[ cIdx ][ i ] = newPredictorPaletteEntries[ cIdx ][ i ] | |
| PredictorPaletteSize = newPredictorPaletteSize | |

In the above example, the two do-loop statements for the first part of newPredictorPaletteEntries update are indicated by Note (7-1) and Note (7-2), where the do-loop statement for different color components corresponds to the outer loop. Therefore, the rest newPredictorPaletteEntries values are updated for each color component. The newPredictorPaletteEntries update process as indicated by the double do-loop indicated by Note (7-3) and Note (7-4), where the do-loop statement for different components corresponds to the outer loop. Therefore, the newPredictorPaletteEntries values are updated for each color component. The PredictorPaletteEntries update process as indicated by the double do-loop indicated by Note (7-5) and Note (7-6) stays the same as the existing update process in Table 5.

In another embodiment, the variables PredictorPaletteSize and PredictorPaletteEntries are modified as shown by the following exemplary pseudo codes in Table 8.

TABLE 8

| | Note |
|---|---|
| for( cIdx = 0; cIdx < numComps; cIdx++ ) | (8-1) |
| { | |
|    newPredictorPaletteSize = CurrentPaletteSize | |
|    for( i = 0; i < CurrentPaletteSize; i++ ) | (8-2) |
|       newPredictorPaletteEntries[ cIdx ][ i ] = CurrentPaletteEntries[ cIdx ][ i ] | |
|    for( i = 0; i < PredictorPaletteSize && newPredictorPaletteSize < PaletteMaxPredictorSize; i++ ) | (8-3) |
|       if( PalettePredictorEntryReuseFlag[ i ] != 1 ) { | |
|       newPredictorPaletteEntries[ cIdx ] [ newPredictorPaletteSize ] = PredictorPaletteEntries[ cIdx ][ i ] | |
|       newPredictorPaletteSize ++ | |
|    } | |
|    for( i = 0; i < newPredictorPaletteSize; i++ ) | (8-4) |
|       PredictorPaletteEntries[ cIdx ][ i ] = newPredictorPaletteEntries[ cIdx ][ i ] | |
| PredictorPaletteSize = newPredictorPaletteSize | |
| } | |

In the above example, the two-loop statement for newPredictorPaletteEntries and PredictorPaletteEntries update process are indicated by Note (8-1), Note (8-2), Note (8-3) and Note (8-4), where the do-loop statement for different color components corresponds to the outer loop. Therefore, the newPredictorPaletteEntries values and PredictorPaletteEntries are updated for each color component.

Various examples of grouping the palette predictor of the same color component for the update process have been shown in Table 6 through Table 8, where HEVC syntax elements have been used to demonstrate the update process by grouping the palette predictor of the same color component according to embodiment of the present invention. However, the present invention is not limited to the specific syntax elements nor the specific pseudo codes listed in these examples. A skilled person in the field may practice the present invention without deviation from the spirit of the present invention.

Grouping the Palette Entry Semantics of the Same Color Component

In the current SCM4.0, syntax element palette_entry is used to specify the value of a component in a palette entry for the current palette. The variable PredictorPaletteEntries [cIdx][i] specifies the i-th element in the predictor palette for the color component cIdx. The variable numComps is derived as shown in equation (1). The variable CurrentPaletteEntries[cIdx][i] specifies the i-th element in the current palette for the color component cIdx and is derived as shown by the following exemplary pseudo codes in Table 9.

TABLE 9

|  | Note |
|---|---|
| numPredictedPaletteEntries = 0 | |
| for( i = 0; i < PredictorPaletteSize; i++ ) | (9-1) |
|   if( PalettePredictorEntryReuseFlag[ i ] = = 1 ) { | |
|     for( cIdx = 0; cIdx < numComps; cIdx++ ) | (9-2) |
|       CurrentPaletteEntries[ cIdx ] | |
|       [ numPredictedPaletteEntries ] = | |
|         PredictorPaletteEntries[ cIdx ][ i ] | |
|       numPredictedPaletteEntries++ | |
|   } | |
| for( cIdx = 0; cIdx < numComps; cIdx++ ) | (9-3) |
|   for( i = 0; i < num_signaled_palette_entries; i++ ) | (9-4) |
|     CurrentPaletteEntries[ cIdx ] | |
|     [ numPredictedPaletteEntries + i ] = palette_entry | |

As shown in Table 9, the CurrentPaletteEntries from the palette predictor are updated as indicated by Note (9-1) and Note (9-2), where the do-loop statement for different color components corresponds to the inner loop. Therefore, for each entry, three color components are updated. Also, the CurrentPaletteEntries from new palette entry are updated as indicated by Note (9-3) and Note (9-4), where the do-loop statement for different color components corresponds to the outer loop. Therefore, the CurrentPaletteEntries values are updated for each color component.

In one embodiment, the palette predictor values for each of the three components can be grouped together. Exemplary changes to the existing process are shown as follows.

The variable numComps is derived as shown in equation (1). The variable CurrentPaletteEntries[cIdx][i] specifies the i-th element in the current palette for the color component cIdx and is derived as shown by the following exemplary pseudo codes in Table 10.

TABLE 10

|  | Note |
|---|---|
| for( cIdx = 0; cIdx < numComps; cIdx++ ){ | (10-1) |
| numPredictedPaletteEntries = 0 | |
| for( i = 0; i < PredictorPaletteSize; i++ ) | (10-2) |
|   if( PalettePredictorEntryReuseFlag[ i ] = = 1 ) { | |
|     CurrentPaletteEntries[ cIdx ] | |
|       [ numPredictedPaletteEntries ] = | |
|         PredictorPaletteEntries[ cIdx ][ i ] | |
|     numPredictedPaletteEntries++ | |
|   } | |
| } | |
| for( cIdx = 0; cIdx < numComps; cIdx++ ) | (10-3) |
|   for( i = 0; i < num_signaled_palette_entries; i++ ) | (10-4) |
|     CurrentPaletteEntries[ cIdx ] | |
|     [ numPredictedPaletteEntries + i ] = palette_entry | |

As shown in Table 10, the CurrentPaletteEntries from the palette predictor are updated as indicated in Note (10-1) and Note (10-2), where the do-loop statement for different color components corresponds to the outer loop. Therefore, the CurrentPaletteEntries values are updated for each color component. The CurrentPaletteEntries from new palette entry are updated as indicated in Note (10-3) and Note (10-4) stays the same as Table 9.

In another embodiment, the three components can be grouped together. The changes are shown as follows.

The variable numComps is derived as shown in equation (1):

The variable CurrentPaletteEntries[cIdx][i] specifies the i-th element in the current palette for the color component cIdx and is derived as shown by the following exemplary pseudo codes in Table 11.

TABLE 11

|  | Note |
|---|---|
| for( cIdx = 0; cIdx < numComps; cIdx++ ){ | (11-1) |
| numPredictedPaletteEntries = 0 | |
| for( i = 0; i < PredictorPaletteSize; i++ ) | (11-2) |
|   if( PalettePredictorEntryReuseFlag[ i ] = = 1 ) { | |
|     CurrentPaletteEntries[ cIdx ] | |
|       [ numPredictedPaletteEntries ] = | |
|         PredictorPaletteEntries[ cIdx ][ i ] | |
|     numPredictedPaletteEntries++ | |
|   } | |
| } | |
| for( i = 0; i < num_signaled_palette_entries; i++ ) | (11-3) |
|   CurrentPaletteEntries[ cIdx ] | (11-4) |
|   [ numPredictedPaletteEntries + i ] = palette_entry | |
| } | |

As shown in Table 11, the CurrentPaletteEntries from the palette predictor and those from the new palette entry are updated as indicated in Note (11-1), Note (11-2), Note (11-3) and Note (11-4), where the do-loop statement for different color components corresponds to the outer loop. Therefore, the CurrentPaletteEntries values are updated for each color component.

Various examples of grouping the palette entry semantics of the same color component for the update process have been shown in Table 10 and Table 11, where HEVC syntax elements have been used to demonstrate the update process by grouping the palette entry semantics of the same color component according to embodiment of the present invention. However, the present invention is not limited to the specific syntax elements nor the specific pseudo codes listed in these examples. A skilled person in the field may practice the present invention without deviation from the spirit of the present invention.

Other Palette Syntax Grouping

In SCM-4.0, the palette indices are grouped at front and the escape values are group at the end. The palette indices and the escape values are coded with bypass bins. Grouping the escape values with the palette indices (i.e. grouping bypass coded bins) may increase the parsing throughput. In SCM-4.0, the number of escape values to be parsed depends on the palette run mode, palette index, and palette run. Therefore, the escape values can only be grouped at the end. In order to group the escape values with palette indices, several methods are disclosed as follows.

Method-1: Grouping the Escape Values in the Front with Palette Indices.

If the escape values are grouped in the front, the number of escape values to be parsed should be independent of the palette runs. For escape value parsing, in order to remove the data dependency on the palette runs, an embodiment of the present invention changes the copy-above run mode behavior when copying the escape samples from the above row. If the predictor is an escape sample, the escape sample is treated as a predefined color index in predictor copy mode.

In the copy-above run mode, a "palette run" value is transmitted or derived to indicate the number of following samples to be copied from the above row. The color indices are equal to the color indices in the above row. In one embodiment, if the above or left sample is an escape sample, the color index of the above sample is treated as a predefined color index (e.g. 0). The current index is set to the predefined index. No escape value is required in these predictor copy modes. In this method, the palette run can be signaled for the index run mode even if the signaled index is equal to the escape index. If the run for the escape index is larger than 0 (e.g. N, N>0), the first sample is reconstructed with the coded escape value. The index of the first sample can be set to the escape index or the predefined color index. The index of the remaining N samples is set to the predefined index (e.g. index 0) and the remaining N samples are reconstructed with the value of the predefined index (e.g. index 0). In one embodiment, the maximum codeword index in the run mode (e.g. adjustedIndexMax) is fixed (e.g. fixed to indexMax−1) except for the first sample of the index run mode. For the first sample in the CU, the adjustedIndexMax is equal to indexMax. The redundant index removal can still be applied. In this method, the number of escape values that need to be parsed depends on the number of parsed/reconstructed indices that are equal to the escape index. For example, if the palette indices are coded with a truncated binary code and the coded bins are all ones, the pared index is the escape index. The number of escape values that need to be parsed is independent of the palette runs. Therefore, the syntax of escape values can be brought in the front (i.e., before the palette runs) with palette indices.

Syntax Order Example 1

Number of copy_above_run or number of index_run-→last_run_mode→Run type group (context coded)→palette index group (bypass coded)→Escape value group (bypass coded)→run length group.

In this case, the last_run_mode indicates that the last run mode is copy_above_run or index_run. For example, during coding/decoding run type group, if the encoded/decoded index_run number equals to the number of index_run and the last_run_mode is index_run, the run type group will be terminated. If the encoded/decoded index_run number equals to the number of index_run and the last_run_mode is copy_above_run, the run type group will also be terminated and the copy_above_run is inserted at the end.

Syntax Order Example 2

Number of copy_above_run or number of index_run-→Run type group (context coded)→last_run_mode→palette index group (bypass coded)→Escape value group (bypass coded)→run length group.

In this case, the last_run_mode indicates that the last run mode is copy_above_run or index_run. For example, during coding/decoding run type group, if the encoded/decoded index_run number equals to the number of index_run, the run type group will be terminated and a last_run_mode is signaled. If the last_run_mode is copy_above_run, a copy_above_run is inserted at the end.

Syntax Order Example 3

Number of copy_above_run or number of index_run-→Run type group (context coded)→palette index group (bypass coded)→Escape value group (bypass coded)→last_run_mode→run length group.

In this case, the last_run_mode indicates that the last run mode is copy_above_run or index_run. For example, during coding/decoding run type group, if the encoded/decoded index_run number equals to the number of index_run, the run type group will be terminated. A last_run_mode is signaled. If the last_run_mode is copy_above_run, a copy_above_run is inserted at the end.

Syntax Order Example 4

Number of copy_above_run or number of index_run-→Run type group (context coded)→palette index group (bypasscoded)→last_run_mode→Escape value (bypass coded) group→run length group.

In this case, the last_run_mode indicates that the last run mode is copy_above_run or index_run. For example, during coding/decoding run type group, if the encoded/decoded index_run number equals to the number of index_run, the run type group will be terminated. A last_run_mode is signaled. If the last_run_mode is copy_above_run, a copy_above_run is inserted at the end.

Syntax Order Example 5

Number of copy_above_run or number of index_run-→palette index group→Escape value group→last_run_mode→Run type group→run length group.

In this case, the last_run_mode indicates the last run mode is copy_above_run or index_run. For example, during coding/decoding run type group, if the encoded/decoded index_run number equals to the number of index_run, the run type group will be terminated. If the last_run_mode is copy_above_run, a copy_above_run is inserted at the end without signaling. For the last palette run mode, the palette run is inferred to be at the end of the PU/CU.

Syntax Order Example 6

Number of copy_above_run or number of index_run-→palette index group→last_run_mode→Escape value group→Run type group→run length group.

In this case, the last_run_mode indicates that the last run mode is copy_above_run or index_run. For example, during coding/decoding run type group, if the encoded/decoded index_run number equals to the number of index_run, the run type group will be terminated. If the last_run_mode is copy_above_run, a copy_above_run is inserted at the end without signaling. For the last palette run mode, the palette run is inferred to be at the end of the PU/CU.

Syntax Order Example 7

Number of copy_above_run or number of index_run-→palette index group→Escape value group→last_run_mode→interleaved {palette run type, palette run length}.

In this case, the last_run_mode indicates that the last run mode is copy_above_run or index_run. For example, during coding/decoding run type group, if the encoded/decoded index_run number equals to the number of index_run, the run type group will be terminated. If the last_run_mode is copy_above_run, a copy_above_run is inserted at the end without signaling. For the last palette run mode, the palette run is inferred to be at the end of the PU/CU.

Various examples of syntax order of palette index map coding are shown as follows.

Syntax Order Example 1

Number of copy_above_run or number of index_run-→last_run_mode→Run type group (context coded)→run length group (do not depend on palette indices)→palette index group (bypass coded)→Escape value group (bypass coded).

In this case, the last_run_mode indicates that the last run mode is copy_above_run or index_run. For example, when coding/decoding run type group, if the encoded/decoded index_run number equals to the number of index_run and the last_run_mode is index_run, the run type group will be terminated. If the encoded/decoded index run number equals to the number of index_run and the last_run_mode is copy_above_run, the run type group will be also terminated and a copy_above_run is inserted at the end. For the last palette run mode, the palette run is inferred to be at the end of the PU/CU.

Syntax Order Example 2

Number of copy_above_run or number of index_run-→Run type group→last_run_mode→run length group-→palette index group→Escape value group.

In this case, the last_run_mode indicates that the last run mode is copy_above_run or index_run. For example, when coding/decoding run type group, if the encoded/decoded index_run number equals to the number of index_run, the run type group will be terminated and a last_run_mode is signaled. If the last_run_mode is copy_above_run, a copy_above_run is inserted at the end. For the last palette run mode, the palette run is inferred to be at the end of the PU/CU.

Syntax Order Example 3

Interleaved {palette run type, palette run length}, palette index group→Escape value group.

In examples 1 through 3 for the syntax order mentioned above, the "palette index group→Escape value group" can be "interleaved {palette index, escape values}". The palette index and the escape values can be coded in an interleaved manner. If the parsed index is equal to the escape index, the escape values can be parsed right away.

In examples 1 through 3 for the syntax order mentioned above, the "last_run_mode" can be signaled anywhere before signaling the last palette run.

In examples 1 and 2 for the syntax order mentioned above, the palette run group can be decoded before palette run group. Therefore, for the palette run signaling, the maximum possible run can be further subtracted by the number of rest index run modes, the number of rest copy above run modes, or the number of rest index run modes+ number of rest copy above run modes. For example, maxPaletteRun=nCbS*nCbS-scanPos-1-number of rest COPY_INDEX_MODE, or maxPaletteRun=nCbS*nCbS-scanPos-1-number of rest COPY_ABOVE_MODE, or maxPaletteRun=nCbS*nCbS-scanPos-1-number of rest COPY_ABOVE_MODE-number of rest COPY_INDEX_MODE.

In examples 1 and 2 for the syntax order mentioned above, for the last palette run mode, the palette run is inferred to be at the end of the PU/CU.

Syntax Order Example 8

Number of copy_above_run or number of index_run-→palette index group→last_run_mode→Escape value group→interleaved {palette run type, palette run length}.

In this case, the last_run_mode indicates that the last run mode is copy_above_run or index_run. For example, during coding/decoding run type group, if the encoded/decoded index_run number equals to the number of index_run, the run type group will be terminated. If the last_run_mode is copy_above_run, a copy_above_run is inserted at the end without signaling. For the last palette run mode, the palette run is inferred to be at the end of the PU/CU.

In the above examples, copy_above_run corresponds to an exemplary syntax element for the "copy-above run mode" mentioned above. Also, index_run corresponds to an exemplary syntax element for the "run mode".

In examples 1, 2, 3 and 5 for the syntax order mentioned above, the "palette index group (bypass coded)→Escape (by pass coded) value group" can be "interleaved {palette index, escape values}". The palette index and the escape values can be coded in an interleaved manner. If the parsed index is equal to the escape index, the escape values can be parsed right away.

In examples 2 through 7 for the syntax order mentioned above, the "last_run_mode" can be signaled after "Number of copy_above_run or number of index_run".

In examples 1 through 8 for the syntax order mentioned above, the "last_run_mode" can be signaled anywhere before signaling the last palette run.

In examples 1 through 4 for the syntax order mentioned above, the palette run group is decoded before palette run group. Therefore, for the palette run signaling, the maximum possible run can be further subtracted by the number of rest index run modes, the number of remaining copy above run modes, or the number of remaining index run modes+ number of remaining copy above run modes. For example, maxPaletteRun=nCbS*nCbS -scanPos-1-number of rest COPY_INDEX_MODE, or maxPaletteRun=nCbS*nCbS -scanPos-1-number of rest COPY_ABOVE_MODE, or maxPaletteRun=nCbS*nCbS-scanPos-1-number of rest COPY_ABOVE_MODE-number of rest COPY_INDEX_MODE. In the above examples, maxPaletteRun corresponds to an exemplary syntax element for the maximum palette run, nCbS corresponds to an exemplary syntax element for the size of the current luma coding block and scanPos corresponds to the scan position of a current pixel.

In examples 1 through 7 for the syntax order mentioned above, for the last palette run mode, the palette run is inferred to be at the end of the PU/CU.

Method-2: Grouping the Palette Indices at the End with Escape Values.

In SCM-4.0, the context formation of palette run depends on the palette index. Therefore, the palette index can only be coded before the palette run. In order to group the palette index at the end, the context formation of palette run should be independent of the palette index.

Therefore, the context formation of palette run needs to be changed so that the context formation of palette run will only depend on the current palette run mode, the previous palette run mode, the previous palette run, the palette run mode of the above sample, the palette run of the above sample, or the combination of the above information. Alternatively, the palette runs can be coded with bypass bins.

The present invention also addresses various aspects related palette coding as disclosed below.

Removal of Line Buffer in Palette Index Map Parsing

In SCM-3.0, four palette index map syntax elements (i.e., palette run mode, palette index, palette run, and escape values) are coded in an interleaved manner. Although the context formation of palette run mode is modified to become independent of the palette run mode of the above sample in SCM-4.0, the index map parsing requires the information of the above row. For example, when the copy-above run mode is used, the number of escape values to be parsed depends on the number of escape pixels to be copied from the above rows. When previous coding mode is the copy-above run mode, the index reconstruction also depends on the palette index of the above sample. In order to save the line buffer in palette index map parsing, several methods to remove the data dependency from the above sample are disclosed.

Method-1: Direct Copying the Escape Value in the Predictor Copy Mode if the Predictor is an Escape Sample.

In order to remove the dependency during calculating the number of escape pixels to be parsed in the copy-above run mode, the copy-above run mode behavior is modified according to an embodiment of the present invention for copying the escape samples from above row.

In the copy-above run mode, a "palette run" value is transmitted or derived to indicate the number of following samples to be copied from the above row. The color indices are equal to the color indices in the above row. According to one embodiment, if the predictor (i.e., the position above) is an escape sample, the current sample not only copies the index (the escape index) but also copies the escape values from the above row. No escape value is required to be parsed in these samples. In this method, the run can be signaled for the index run mode even if the signaled index is equal to the escape index. If the run for escape index is larger than 0 (e.g. N and N>0), the decoder will fill the reconstruction value (or the escape values) from the first sample for the following N samples. The escape values can be signaled after the run syntax.

To remove the data dependency for the index parsing and reconstruction of the index run mode when the previous mode is copy-above run mode, the redundant index removal is disabled when the previous mode is the copy-above run mode as described in JCTVC-T0078 (JCTVC-T00784: Kim, et al., *CE1-related: simplification for index map coding in palette mode*, Joint Collaborative Team on Video Coding (JCT-VC) of ITU-T SG 16 WP 3 and ISO/IEC JTC 1/SC 29/WG 11, 20th Meeting: Geneva, CH, 10-18 Feb. 2015, Document: JCTVC-T0078).

Based on method-1, the index map parsing does not depend on the information of the above row. The entropy decoder can parse all the palette index map syntaxes by just using dependency on the previous coded palette run mode and palette index.

In one embodiment, in the copy index run mode, a "palette run" value is transmitted or derived to indicate the number of following samples to be coded in the bitstream. The color index of the current position is coded. However, if the sample at current location is an escape sample, not only the index (the escape index) of the current sample is coded, but also the escape values are coded. In this method, the run can be signaled for the index run mode even if the signaled index is equal to the escape index. If the run for the escape index is larger than 0 (e.g. N, N>0), the decoder will fill the reconstruction value (or the escape values) from the first sample for following N samples. The escape values can be signaled after the run syntax.

To remove the data dependency for the index parsing and reconstruction of the copy index run mode when the previous mode is the copy index run mode, the redundant index removal is disabled when the previous mode is the copy index run mode.

With the above method, the index map parsing does not depend on the information of the previous index. The entropy decoder can parse all the palette index map syntaxes by just using the dependency on the previous coded palette run mode and palette index.

Method-2: Treating the Escape Sample as a Predefined Color Index in the Predictor Copy Mode if the Predictor is Escape Sample.

In the copy-above run mode, a "palette run" value is transmitted or derived to indicate the number of following samples to be copied from the above row. The color indices are equal to the color indices in the above row. According to one embodiment, if the above or left sample is escape sample, the color index of the above sample is treated as a predefined color index (e.g. 0). The current index is set to the predefined index. No escape value is required in these predictor copy modes. According to one embodiment, the palette run can be signaled for the index run mode even if the signaled index is equal to the escape index. The escape values can be signaled after the run syntax. If the run for escape index is larger than 0, (e.g. N, N>0), the first sample is reconstructed with the coded escape value. The index of the first sample can be set to the escape index or the predefined color index. The indices of the remaining N samples are set to the predefined index (e.g. index 0). The rest N samples are reconstructed with the value of predefined index (e.g. index 0). In another example, if the run for escape index is larger than 0 (e.g. N, N>0), the first sample is reconstructed with the escape value, and the escape values the following N samples also need to be signaled. The remaining samples are reconstructed with the signaled escape values respectively. The indices of the first sample and the remaining N samples can be set to the predefined index (e.g. index 0).

According to Method-2, the maximum codeword index in the run mode (i.e., adjustedIndexMax) is fixed (e.g. fixed to indexMax−1) except for the first sample of the index run mode. For the first sample in the CU, the adjustedIndexMax is equal to indexMax. The redundant index removal can be still applied.

According to Method-2, while the index map reconstruction still needs the index values of the above samples, the entropy decoder can parse all the palette index map syntaxes by just using the dependency on the previous coded palette run mode and palette index.

According to JCTVC-T0078, in order to remove the data dependency for the index reconstruction of the index run mode when the previous mode is the copy-above run mode, the redundant index removal will be disabled when the previous mode is the copy-above run mode.

Copy-Above Mode Under Index Map Flipping

Figure 3B:
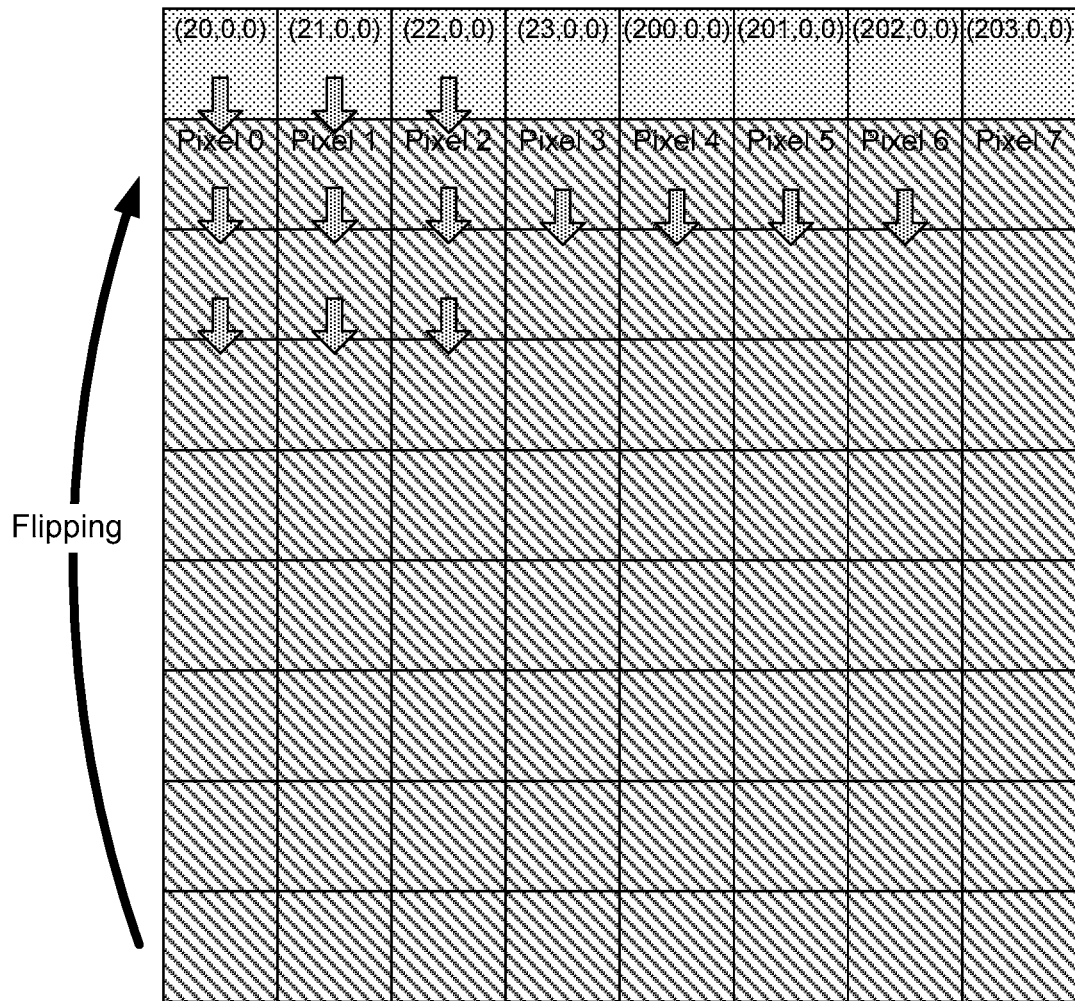
FIG. 3B illustrates an example of flipped index map corresponding to the index map in FIG. 3A.

The present invention also addresses the issue related to the index map flipping before index map coding. After the decoder flips the index map, the prediction source in the copy-above run mode is not the same physical above pixels as before. FIG. 3A illustrates an example index map flipping before the index coding. FIG. 3B illustrates an example of flipped index map.

FIG. 3A shows an example of original coding unit. After index map flipping, the pixels in the latest row (i.e., Pixel 0 through Pixel 7) will be flipped to the first row as shown in FIG. 3B. The now first row pixels are predicted by the above neighboring constructed pixels (NCP) if the prediction can be across a CU. In FIG. 3B, the line-filled blocks indicate the flipped index map while the clear blocks in FIG. 3A indicate the original index map. For pixels in other rows after flipping, the prediction in the copy-above run mode becomes the prediction by the physical below pixel positions before the flipping. In this method, the index reconstruction does not need a second pass.

Figure 4:
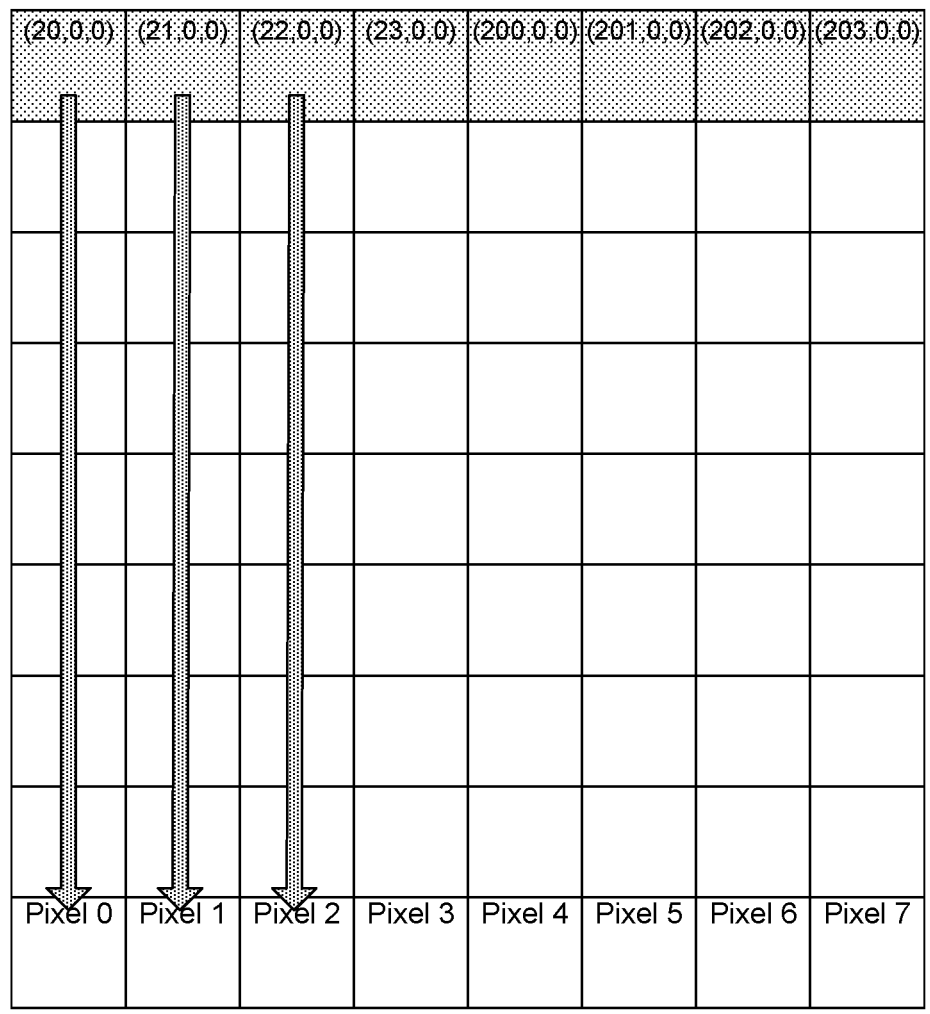
FIG. 4 illustrates an example of flipping the index map before index map coding, where the use of the above neighboring constructed pixels to predict the pixels in the last row in physical position is inefficient.

However, flipping the index map before index map coding implies to use the above NCP to predict the pixels in the last row in physical position as illustrated in FIG. 4. This prediction process is inefficient because the distance between predictor and the underlying index to be predicted is large.

Accordingly, methods to improve the coding efficiency related to index map flipping are disclosed as follows.

Figure 5A:
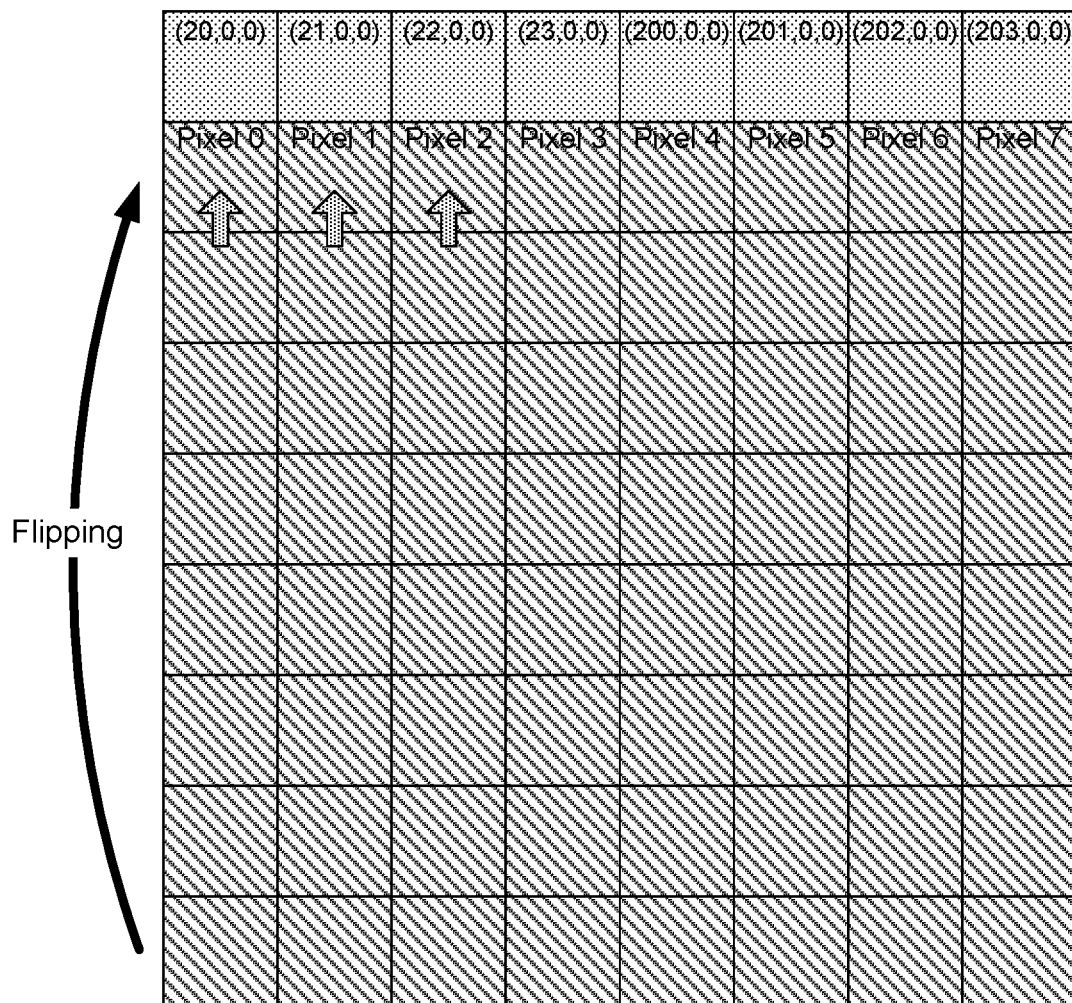
FIGS. 5A-B illustrate an example of prediction from above CU with flipped index map according to an embodiment of the present invention, where indices in the copy-above run mode are always predicted from their physical above positions regardless whether the index map is flipped.
Figure 5B:

Method 1: Whether the index map is flipped, indices in the copy-above run mode are predicted from its physical above position (or left position if transpose flag is on) as shown in FIG. 5A and FIG. 5B. In FIG. 5A, the line-filled blocks represent the flipped index map while the clear blocks in FIG. 5B represent the original index map.

Method 2: Signaling different run scan starting position. This method is similar to method 1, where the indices in the copy-above run mode are predicted from pixels in the physical above positions. Additional information can be signaled to indicate the "Run Scan Starting Position" or "Scan Pattern". The "Run Scan Starting Position" can be top-left, top-right, bottom-left or bottom-right. "Scan Pattern" can be the horizontal scan, vertical scan, horizontal traverse scan or vertical traverse scan.

Figure 6A:
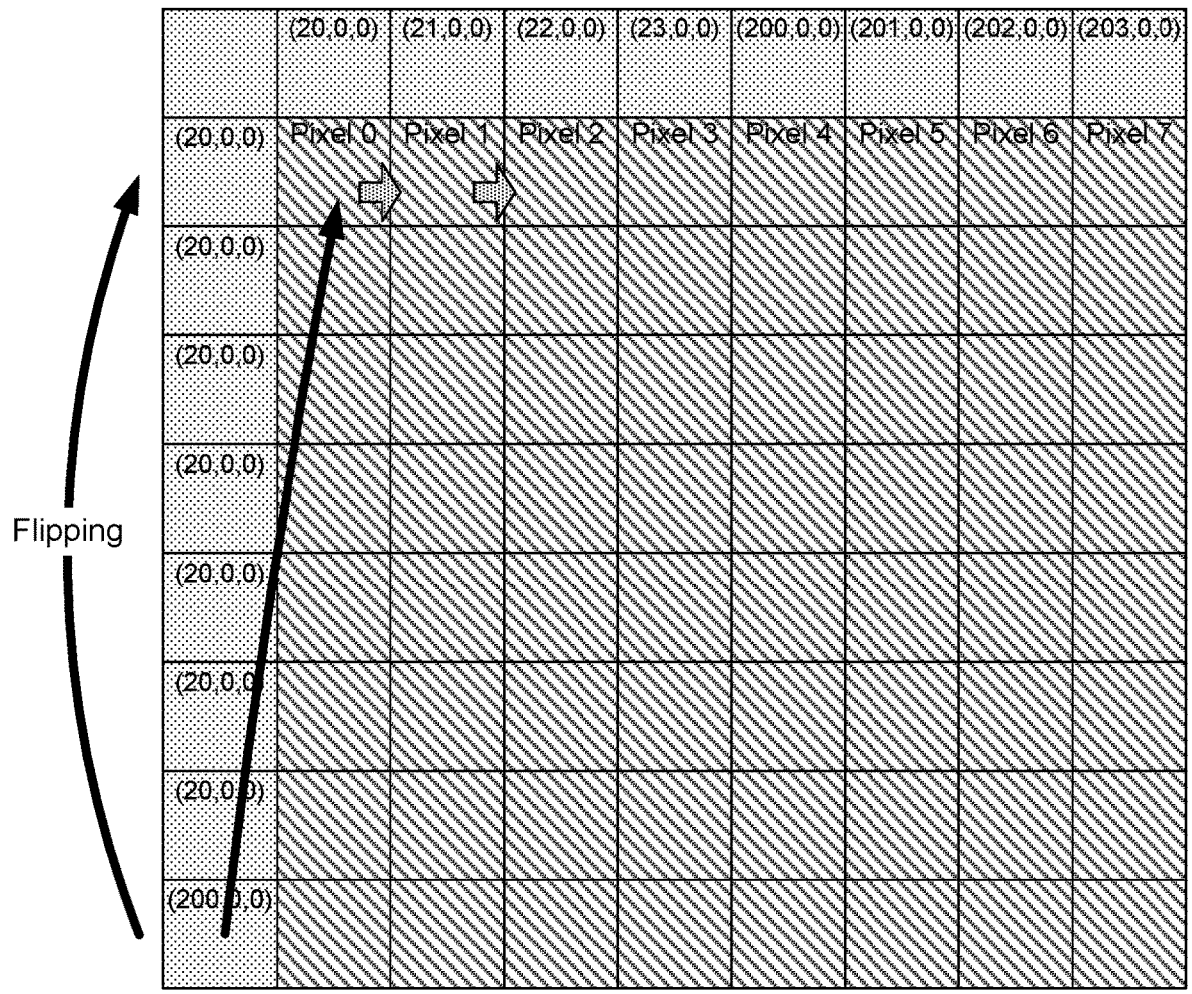

Method 3: If the index map is flipped, the copy-above run coded pixels of the first row are predicted from the samples in their physical nearest positions as shown in FIG. 6A and FIG. 6B. FIG. 6A shows the flipped samples as indicated by line-filled blocks and FIG. 6B shows the samples in the original physical positions. If the transpose flag is off, the copy-above run coded pixels of the last row in the physical position are predicted from the samples in their physical nearest positions.

Figure 7A:
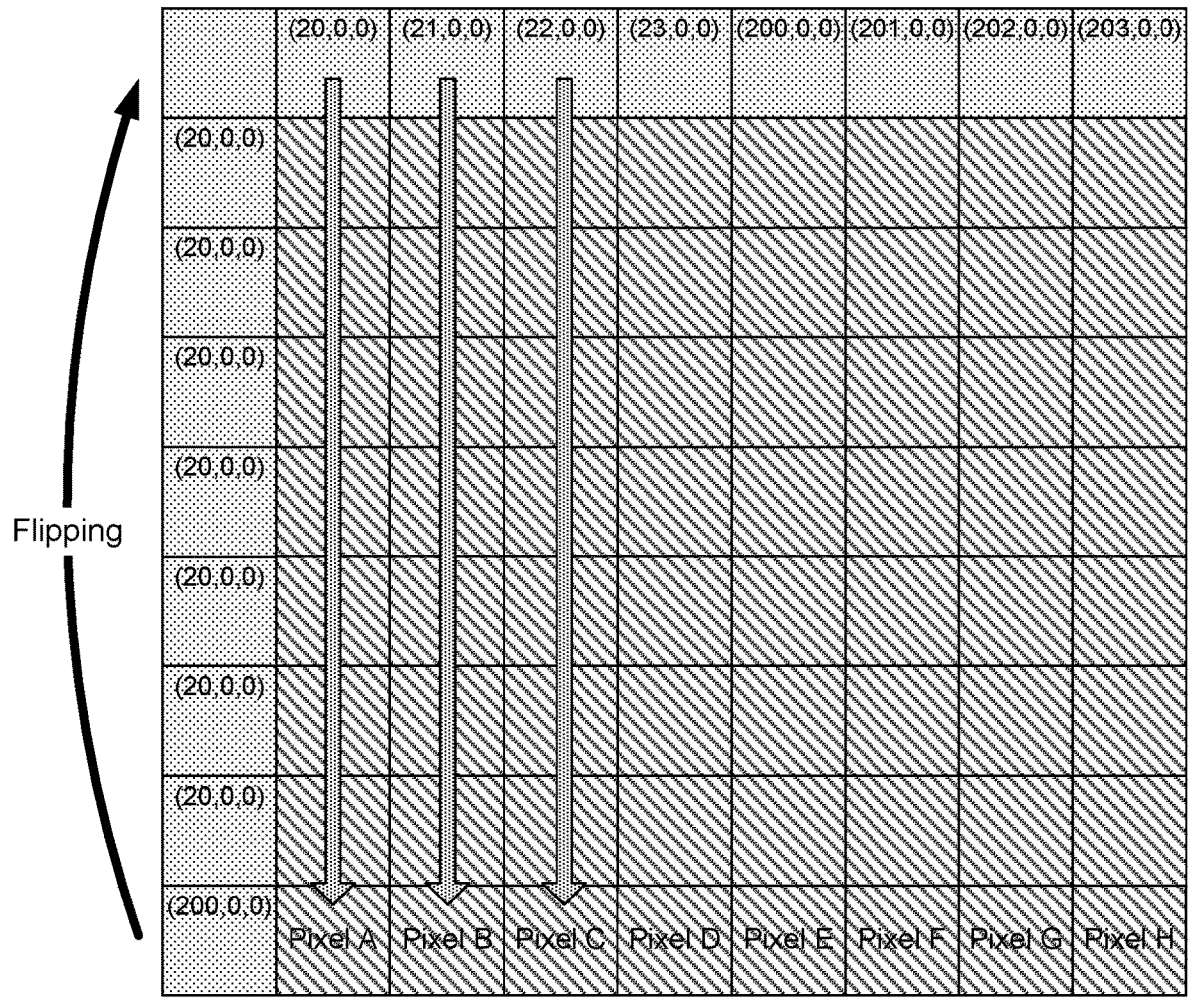

Method 4: If the index map is flipped, the copy-above run coded pixels of the last row are predicted from their physical pixel positions of the above neighboring CU as shown in FIG. 7A and FIG. 7B. FIG. 7A shows the flipped pixels as indicated by line-filled blocks and FIG. 7B shows the samples in the original physical positions. If the transpose flag is off, the first row (or first M rows) in the physical position can be predicted from their physical pixel positions of the above neighboring CU. M can be 1, 2, or 3. M can also depend on the CU size. M can be signaled so that a decoder can decode accordingly.

Prediction Across a CU

In order to further improve coding efficiency, a special run is disclosed. This special run extends the copy-above run that starts from the first sample of a palette coded CU. The special run can be signaled once. The samples in the extended copy-above run mode are predicted from the reconstructed pixels in the neighboring CU. The remaining samples in this CU are coded using the palette syntax specified in SCM-4.0 or SCM-3.0, except that the total palette coded samples in a PU/CU are reduced.

Method 1: A syntax element (e.g. line num represented by L) is first signaled to indicate that the first L lines of samples are predicted from the reconstructed pixels in the neighboring CU, where L is a positive integer. The remaining samples are coded using the palette syntax in SCM-4.0 or SCM-3.0, except that the total palette coded samples in a PU/CU are reduced. For the first L lines of samples, their pixel values are predicted from the reconstructed pixels in the neighboring CU. For example, if palette_transpose_flag is 0, the reconstructed pixels in the above CUs are used. The pixel values of the first L lines of samples are the reconstructed pixel values of the last row of the above CUs. It is similar to applying the Intra vertical prediction to the first L lines of samples, while the remaining lines are coded with normal palette mode.

Figure 8A:
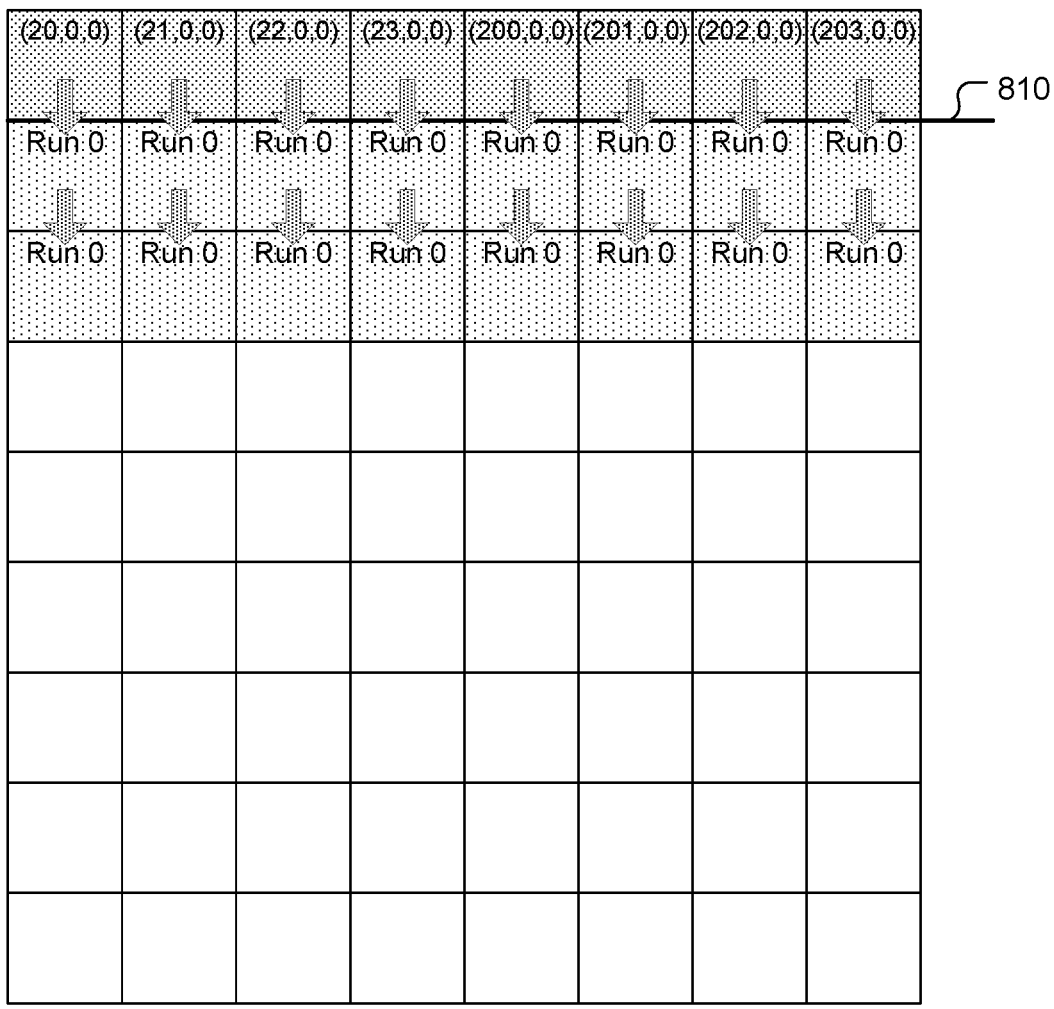
FIG. 8A illustrates an example of extended copy-above run mode, where two lines of pixels (i.e., L=2) are copied from an above line that is located above the CU boundary.

FIG. 8A illustrates an example of extended copy-above run mode, where two lines of pixels (i.e., L=2) are copied from an above line that is located above the CU boundary 810.

Figure 8B:
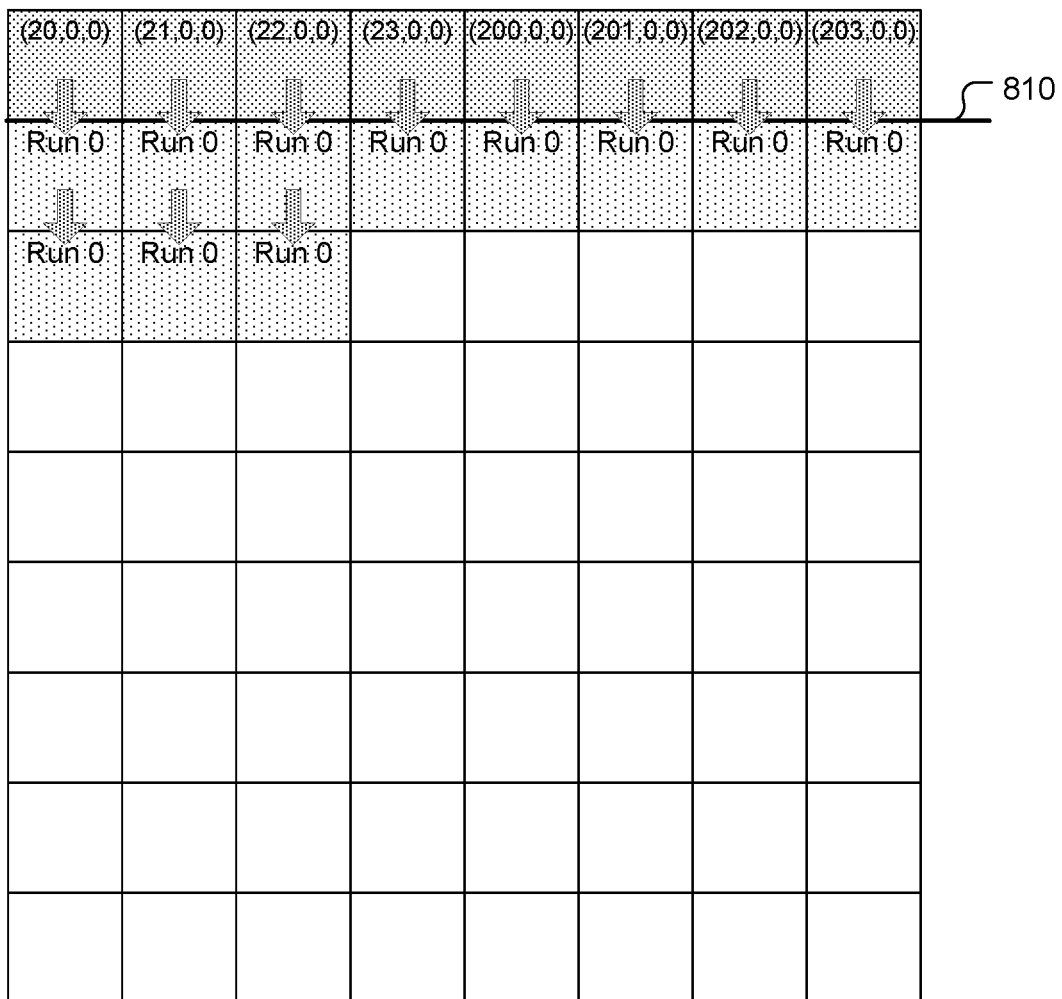
FIG. 8B illustrates an example of prediction across a CU by signaling a syntax element, pixel_num (M) to indicate that the first M (i.e., M=11) samples are predicted from the reconstructed pixels.

Method 2: A syntax element (e.g. pixel_num represented M) is first signaled to indicate that the first M samples are predicted from the reconstructed pixels in the neighboring CU, where M is a positive integer. The remaining samples are coded using the palette syntax in SCM-4.0 or SCM-3.0, except that the total palette coded samples in a PU/CU are reduced. For example, if palette_transpose_flag is 0, the reconstructed pixels in the above CUs are used. The pixel values of the first M samples are the reconstructed pixel values of the last row of the above CUs. It is similar to applying the Intra vertical prediction to the first M samples. If the width of CU is CU_width, the first CU_width samples starting from the first sample at (M+1) through the (M+CU_width)-th sample in the CU cannot be coded in the copy-above run mode according to the syntax in SCM-4.0. In other words, the samples with the scan position equal to M through (M+CU_width−1) cannot be coded in the copy-above run mode according to the syntax in SCM-4.0. FIG. 8B illustrates an example of prediction across a CU by signaling a syntax element, pixel_num (M) to indicate that the first M (i.e., M=11) samples are predicted from the reconstructed pixels.

For example, the syntax table for palette_coding in SCM-3.0 can be modified as shown in Table 12.

TABLE 12

| palette_coding( x0, y0, nCbS ) { | Note |
|---|---|
| ... | |
| if( indexMax > 0) | |
|   palette_transpose_flag | |
| pixel_num | (12-1) |
|   scanPos = pixel_num | (12-2) |
|   while( scanPos < nCbS * nCbS ) { | |
|     xC = x0 + travScan[ scanPos ][ 0 ] | |
|     yC = y0 + travScan[ scanPos ][ 1 ] | |
|     if( scanPos > pixel_num) { | (12-3) |
|       xcPrev = x0 + travScan[ scanPos − 1 ][ 0 ] | |
|       ycPrev = y0 + travScan[ scanPos − 1 ][ 1 ] | |
|     } | |
|     } | |
|     if( indexMax > 0 && scanPos > = nCbS + pixel_num && palette_run_type_flag[ xcPrev ][ ycPrev ] ! = COPY_ABOVE_MODE ) { | (12-4) |
|       palette_run_type_flag[ xC ][ yC ] | |
|     } | |
|   ... | |
|     scanPos++ | |
|   } | |
|   } | |
| } | |

As shown in Table 12, syntax element pixel_num is incorporated as indicated by Note (12-1), where the pixel_num is signaled before the palette index map coding. The rest palette samples are coded from the scan position starting from pixel_num as indicated by Note (12-2). The previous palette sample position is derived according to Note (12-3).

The copy-above mode is not allowed for the first sample row after the first pixel_num samples as indicated by Note (12-4).

The variable adjustedIndexMax representing the adjusted maximum index is derived as follows:

```
adjustedIndexMax = indexMax
if( scanPos > pixel_num )
    adjustedIndexMax − = 1
```

The variable adjustedRefIndexMax representing the adjusted maximum reference index is derived as follows:

```
adjustedRefIndex = indexMax + 1
if( scanPos > pixel_num ) {
    if( palette_run_type_flag[xcPrev][ycPrev] !=
    COPY_ABOVE_MODE )
        adjustedRefIndex = PaletteIndexMap[xcPrev][ycPrev]
    else
        adjustedRefIndex = PaletteIndexMap[xC][yC − 1]
```

In Method 1 and Method 2 mentioned above, a syntax element, copy_from_neighboring_CU_flag can be signaled first. If the copy_from_neighboring_CU_flag is 0, the line_num and pixel_num are not signaled and inferred as 0. If the copy_from_neighboring_CU_flag is 1, the line_num and pixel_num are signaled. The actual line_num and pixel_num equal to the parsed line_num and pixel_num increased by 1.

Method 3: In this method, the neighboring pixels are used to predict the current pixel coded in the palette mode. Num_copy_pixel_line is first signaled to indicate that the first num_copy_pixel_line lines of samples are predicted from the reconstructed pixels in the neighboring CU. The remaining samples are coded by the normal palette index map coding, except that the start point is changed and total palette coded samples in a PU/CU are reduced.

Figure 9A:
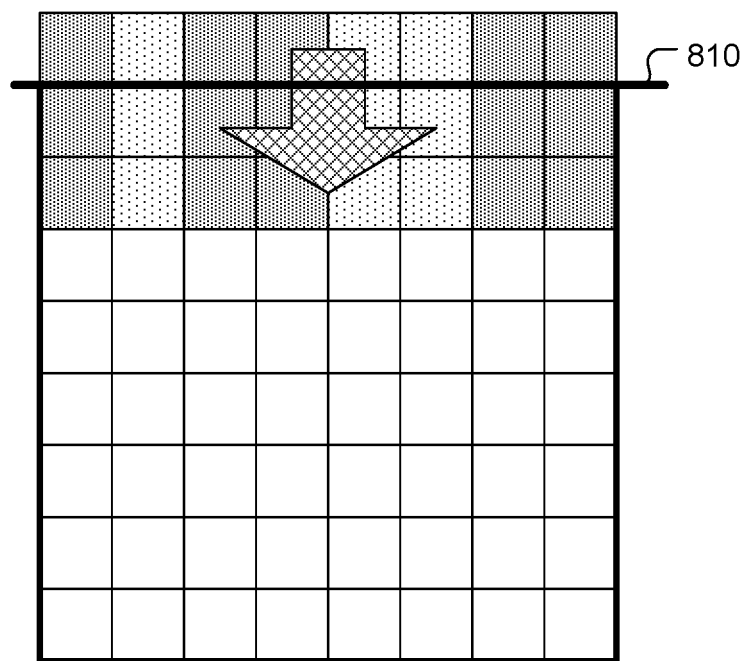
FIG. 9A illustrates an example of the pixel values of the first two lines of samples are predicted by the reconstructed pixel values of the last row of the above CU.
Figure 9B:
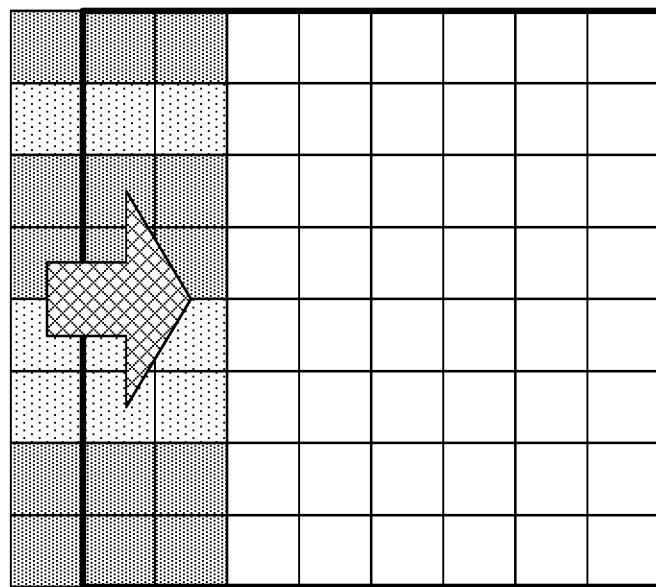
FIG. 9B illustrates an example of the pixel values of the first two columns of samples are predicted by the reconstructed pixel values of the right-most column of the left CU.

For the first num_copy_pixel_line lines of samples, their pixel values are predicted from the reconstructed pixels in the neighboring CU, where the syntax element, num_copy_pixel_line corresponds to the number of pixel lines to be copied. For example, if palette_transpose_flag is 0, the reconstructed pixels in the above CUs are used, as shown in FIG. 9A. The pixel values of the first num_copy_pixel_line (e.g. K) lines of samples are predicted by the reconstructed pixel values of the last row of the above CU. It is similar to applying the Intra vertical prediction to the first K lines of samples, while the remaining lines are coded with normal palette mode. If palette_transpose_flag is 1, the reconstructed pixels in the left CUs are used, as shown in FIG. 9B.

The syntax of num_copy_pixel_line can be signaled after the palette mode flag and before the palette table coding. If num_copy_pixel_line is equal to the CU width or CU height, a palette_transpose_flag is signaled to indicate that the whole CU is predicted from the above pixels or the left pixels. The syntaxes of palette table coding and index map coding are skipped since all the samples in the current CU are predicted.

If num_copy_pixel_line is smaller than the CU width or CU height, normal palette table coding and palette index map coding are applied. In SCM-4.0, the palette_transpose_flag is inferred as 0 if the MaxPaletteIndex is equal to 0. However, according to the current method, if the MaxPaletteIndex is equal to 0 and num_copy_pixel_line is not equal to 0, palette_transpose_flag still needs to be signaled to indicate the first num_copy_pixel_line rows or columns of samples to be predicted from the reconstructed pixels in the above CU or the left CU. For index map coding, the starting sample position is set to num_copy_pixel_line*CU width. For the samples with sample positions between num_copy_pixel_line*CU width and (num_copy_pixel_line+1)*CU width−1, the copy-above run mode cannot be selected. In other words, the samples with sample positions smaller than CU_width*(num_copy_pixel_line+1) cannot be signaled as the copy-above run mode.

Table 13 illustrates an exemplary syntax table of palette coding according to an embodiment of the method disclosed above.

TABLE 13

| palette_coding( x0, y0, nCbS ) { | Note |
|---|---|
| num_copy_pixel_line | (13-1) |
| if(num_copy_pixel_line = = nCbS) { | |
| palette_transpose_flag | (13-2) |
|   PaletteScanPos = 0 | |
|   while( PaletteScanPos < nCbS * nCbS ) { | |
|     xC = x0 + travScan[ PaletteScanPos ][ 0 ] | |
|     yC = y0 + travScan[ PaletteScanPos ][ 1 ] | |
|     PaletteIndexMap[ xC ][ yC ] = −1 | (13-3) |
|   } | |
| } else { | |
|   palettePredictionFinished = 0 | |
|   NumPredictedPaletteEntries = 0 | |
|   for( i = 0; i < PredictorPaletteSize && | |
|   !palettePredictionFinished && | |
|   NumPredictedPaletteEntries < | |
|   palette_max_size; i++ ) { | |
|     palette_predictor_run | |
|     .... | |
|   } | |
|   if( NumPredictedPaletteEntries < palette_max_size ) | |
|     num_signaled_palette_entries | |
|   numComps = ( ChromaArrayType = = 0 ) ? 1 : 3 | |
|   for( cIdx = 0; cIdx < numComps; cIdx++ ) | |
|     for( i = 0; i < num_signaled_palette_entries; i++ ) | |
|       palette_entry | |
|   if( CurrentPaletteSize != 0 ) | |
|     palette_escape_val_present_flag | |
|     .... | |
| } | |
|   .... | |
| if( MaxPaletteIndex > 0) { | |
|   ... | |
|   last_palette_run_type_flag | |
| } else if (num_copy_pixel_line ! = 0) | |
|   palette_transpose_flag | (13-4) |
| CurrNumIndices = 0 | |
| PaletteScanPos = 0 | |
| while( PaletteScanPos < num_copy_pixel_line * nCbS ) { | |
|   xC = x0 + travScan[ PaletteScanPos ][ 0 ] | |
|   yC = y0 + travScan[ PaletteScanPos ][ 1 ] | |
|   PaletteIndexMap[ xC ][ yC ] = −1 | (13-5) |
| } | |
| PaletteScanPos = num_copy_pixel_line * nCbS | |
|   .... | |
|   PaletteRun = nCbS * nCbS − PaletteScanPos − 1 | |
|   if( MaxPaletteIndex > 0 && CurrNumIndices < | |
|   NumPaletteIndices ) { | |
|     if( PaletteScanPos >= nCbS * (num_copy_pixel_line + | (13-6) |
|     1) && palette_run_type_flag[ xcPrev ][ ycPrev ] != | |
| COPY_ABOVE_MODE && | |
|     PaletteScanPos < nCbS * nCbS − 1) { | |
|       palette_run_type_flag[ xC ][ yC ] | |
|     } | |
|     .... | |
|     CurrNumIndices + = readIndex | |
|   } | |
|   runPos = 0 | |
|   .... | |
| } | |

TABLE 13-continued

| palette_coding( x0, y0, nCbS ) { | Note |
|---|---|
|   if( palette_escape_val_present_flag ) { | |
|     .... | |
|   } | |
|   } | |
| }// if(num_copy_pixel_line = = nCbS) | |
| } | |

In Table 13, the syntax element, num_copy_pixel_line is incorporated in front of all syntaxes as indicated by Note (13-1). If num_copy_pixel_line is equal to the nCbS (i.e., CU width or CU height), the syntax palette_transpose_flag is incorporated as indicated by Note (13-2). The palette indices of the whole CU are assigned as −1 as indicated by Note (13-3), which indicates the pixel values are copied from the neighboring CU. If the num_copy_pixel_line is not equal to 0 and the MaxPaletteIndex is not larger than 0 (e.g. MaxPaletteIndex is equal to 0), the syntax element, palette_transpose_flag is incorporated as indicated by Note (13-4). The palette indices of the samples within num_copy_pixel_line lines are assigned as −1 as indicated by Note (13-5). The copy-above mode is not allowed for the first sample row after the first nCbS*num_copy_pixel_line as indicated by Note (13-6).

The variable AdjustedMaxPaletteIndex is derived as follows:

```
AdjustedMaxPaletteIndex = MaxPaletteIndex
if( PaletteScanPos > num_copy_pixel_line* nCbS )
    AdjustedMaxPaletteIndex − = 1
```

The variable adjustedRefPaletteIndex is derived as follows:

```
adjustedRefPaletteIndex = MaxPaletteIndex + 1
if( PaletteScanPos > num_copy_pixel_line* nCbS ) {
    xcPrev = x0 + travScan[PaletteScanPos − 1][0]
    ycPrev = y0 + travScan[PaletteScanPos − 1][1]
    if( palette_run_type_flag[xcPrev][ycPrev] !=
    COPY_ABOVE_MODE ) {
        adjustedRefPaletteIndex =
        PaletteIndexMap[xcPrev][ycPrev](7-80)
    }
    else
        adjustedRefPaletteIndex = PaletteIndexMap[xC][yC − 1]
}
```

If PaletteIndexMap[xC][yC] is equal to −1, the corresponding pixel value is the same as its neighboring pixel. According to this method, if the above or left pixels are not available, (e.g. samples at a frame boundary or Inter coded samples when constraint Intra prediction being applied), the color with palette index equal to 0 is used instead. If the palette table of the current CU is not coded (e.g. num_copy_pixel_line is equal to CU_width), the first palette in palette predictor table is used instead.

In another example, if the above or left pixels are not available, the HEVC Intra prediction boundary pixel filling method can be used to generate the replacement neighboring pixels.

Number of lines that use the copy-above pixel line mode can be derived according to the syntax element, num_copy_pixel_line_indication instead being signaled directly as num_copy_pixel_line. If num_copy_pixel_line_indication is 0, num_copy_pixel_line is derived as 0. If num_copy_pixel_line_indication is 1, num_copy_pixel_line is derived as N, which is a predefined number. If num_copy_pixel_line_indication is k, num_copy_pixel_line is derived as k*N.

Method 4: In this method, the num_copy_pixel_line syntax is signaled before the palette_transpose_flag syntax. Table 14 illustrates an exemplary palette coding syntax table according to an embodiment of this method.

TABLE 14

| palette_coding( x0, y0, nCbS ) { | Note |
|---|---|
|   palettePredictionFinished = 0 | |
|   NumPredictedPaletteEntries = 0 | |
|     .... | |
|   } | |
|   if( CurrentPaletteSize != 0 ) | |
|     palette_escape_val_present_flag | |
|     .... | |
|   } | |
|   num_copy_pixel_line | (14-1) |
|   if( MaxPaletteIndex > 0) { | |
|     palette_transpose_flag | |
|     num_palette_indices_idc | |
|     for( i=0; i < NumPaletteIndices; i++ ) { | |
|       palette_index_idc | |
|       PaletteIndexIdc[ i ] = palette_index_idc | |
|     } | |
|     last_palette_run_type_flag | |
|   } else if(num_copy_pixel_line ! = 0) | |
|     palette_transpose_flag | (14-2) |
|   CurrNumIndices = 0 | |
|   PaletteScanPos = 0 | |
|   while( PaletteScanPos < num_copy_pixel_line * nCbS ) { | |
|     xC = x0 + travScan[ PaletteScanPos ][ 0 ] | |
|     yC = y0 + travScan[ PaletteScanPos ][ 1 ] | |
|     PaletteIndexMap[ xC ][ yC ] = −1 | (14-3) |
|   } | |
|   .... | |
|   PaletteRun = nCbS * nCbS − PaletteScanPos − 1 | |
|   if( MaxPaletteIndex > 0 && CurrNumIndices < | |
|   NumPaletteIndices ) { | |
|     if( PaletteScanPos >= nCbS * (num_copy_pixel_line + | (14-4) |
|     1) && palette_run_type_flag[ xcPrev ][ ycPrev ] != | |
|   COPY_ABOVE_MODE && | |
|     PaletteScanPos < nCbS * nCbS − 1) { | |
|       palette_run_type_flag[ xC ][ yC ] | |
|     } | |
|     readIndex = 0 | |
|     .... | |
|   } | |
|   runPos = 0 | |
|   while ( runPos <= paletteRun ) { | |
|     xR = x0 + travScan[ PaletteScanPos ][ 0 ] | |
|     yR = y0 + travScan[ PaletteScanPos ][ 1 ] | |
|     if(palette_run_type_flag[ xC ][ yC ] = = | |
|     COPY_INDEX_MODE ) { | |
|       PaletteSampleMode[ xR ][ yR ] = | |
|       COPY_INDEX_MODE | |
|       PaletteIndexMap[ xR ][ yR ] = CurrPaletteIndex | |
|     } else { | |
|       PaletteSampleMode[ xR ][ yR ] = | |
|       COPY_ABOVE_MODE | |
|       PaletteIndexMap[ xR ][ yR ] = PaletteIndexMap[ xR ] | |
|       [ yR − 1 ] | |
|     } | |
|     runPos++ | |
|     PaletteScanPos++ | |
|   } | |
|   } | |
|   .... | |
| } | |

In Table 14, syntax element num_copy_pixel_line is incorporated after the palette_escape_val_present_flag syntax signaling as indicated by Note (14-1). If the num_copy_pixel_line is not equal to 0 and the MaxPaletteIndex is not larger than 0 (e.g. MaxPaletteIndex is equal to 0), the syntax, palette_transpose_flag is incorporated as indicated by Note (14-2). The palette indices of the samples within num_copy_pixel_line lines are assigned as −1 as indicated by Note (14-3). The copy-above mode is not allowed for the first sample row after the first nCbS*num_copy_pixel_line as indicated by Note (14-4).

The syntax element, num_copy_pixel_line can be signaled in front of the syntax element, palette_escape_val_present_flag. Table 15 illustrates an exemplary syntax table for palette coding according to this method.

TABLE 15

| palette_coding( x0, y0, nCbS ) { | Note |
|---|---|
| palettePredictionFinished = 0 | |
| NumPredictedPaletteEntries = 0 | |
| .... | |
| if( NumPredictedPaletteEntries < palette_max_size ) | |
|   num_signaled_palette_entries | |
| numComps = ( ChromaArrayType = = 0 ) ? 1 : 3 | |
| for( cIdx = 0; cIdx < numComps; cIdx++ ) | |
|   for( i = 0; i < num_signaled_palette_entries; i++ ) | |
|     palette_entry | |
| num_copy_pixel_line | (15-1) |
| if( CurrentPaletteSize != 0 ) | |
|   palette_escape_val_present_flag | |
|   .... | |
| } | |
| if( MaxPaletteIndex > 0 ) { | |
|   palette_transpose_flag | |
|   num_palette_indices_idc | |
|   for( i = 0; i < NumPaletteIndices; i++ ) { | |
|     palette_index_idc | |
|     PaletteIndexIdc[ i ] = palette_index_idc | |
|   } | |
|   last_palette_run_type_flag | |
| } else if(num_copy_pixel_line ! = 0) | |
|   palette_transpose_flag | (15-2) |
| CurrNumIndices = 0 | |
| PaletteScanPos = 0 | |
| while( PaletteScanPos < num_copy_pixel_line * nCbS ) { | |
|   xC = x0 + travScan[ PaletteScanPos ][ 0 ] | |
|   yC = y0 + travScan[ PaletteScanPos ][ 1 ] | |
|   PaletteIndexMap[ xC ][ yC ] = −1 | (15-3) |
| } | |
| while( PaletteScanPos < nCbS * nCbS ) { | |
|   xC = x0 + travScan[ PaletteScanPos ][ 0 ] | |
|   yC = y0 + travScan[ PaletteScanPos ][ 1 ] | |
|   if( PaletteScanPos > 0 ) { | |
|     xcPrev = x0 + travScan[ PaletteScanPos − 1 ][ 0 ] | |
|     ycPrev = y0 + travScan[ PaletteScanPos − 1 ][ 1 ] | |
|   } | |
|   PaletteRun = nCbS * nCbS − PaletteScanPos − 1 | |
|   if( MaxPaletteIndex > 0 && CurrNumIndices < NumPaletteIndices ) { | |
|     if( PaletteScanPos >= nCbS * (num_copy_pixel_line + 1) && palette_run_type_flag[ xcPrev ][ ycPrev ] != COPY_ABOVE_MODE && PaletteScanPos < nCbS * nCbS − 1) { | (15-4) |
|       palette_run_type_flag[ xC ][ yC ] | |
|     } | |
|     readIndex = 0 | |
|     .... | |
|   } | |
|   .... | |
| } | |
| .... | |
| } | |

In Table 15, the syntax element, num_copy_pixel_line is incorporated before the palette_escape_val_present_flag syntax signaling as indicated by Note (15-1). If the num_copy_pixel_line is not equal to 0 and the MaxPaletteIndex is not larger than 0 (e.g. MaxPaletteIndex is equal to 0), the syntax palette_transpose_flag is incorporated as indicated by Note (15-2). The palette indices of the samples within num_copy_pixel_line lines are assigned as −1 as indicated by Note (15-3). The copy-above mode is not allowed for the first sample row after the first nCbS*num_copy_pixel_line as indicated by Note (15-4).

In this embodiment, if the syntax element, num_copy_pixel_line is equal to CU width, syntax elements, NumPredictedPaletteEntries and num_signaled_palette_entries should be both 0. The first coded syntax element, palette_predictor_run should be 1.

In the syntax design of signaling num_copy_pixel_line before palette_escape_val_present_flag (e.g. Table 15), NumPredictedPaletteEntries and num_signaled_palette_entries should be both 0, the first coded palette_predictor_run should be 1, and the palette_escape_val_present_flag is inferred as 0.

Method 5: According to this method, num_copy_pixel_line is signaled after palette_transpose_flag. In this syntax design, the syntax element, palette_transpose_flag need to be signaled even when the MaxPaletteIndex is equal to 0. Table 16 illustrates an exemplary syntax table for palette coding according to an embodiment of this method.

TABLE 16

| palette_coding( x0, y0, nCbS ) { | Note |
|---|---|
| ... | |
|   palette_transpose_flag | (16-1) |
| if( MaxPaletteIndex > 0 ) { | |
|   ~~palette_transpose_flag~~ | (16-2) |
|   num_palette_indices_idc | |
|   for( i = 0; i < NumPaletteIndices; i++ ) { | |
|     palette_index_idc | |
|     PaletteIndexIdc[ i ] = palette_index_idc | |
|   } | |
|   last_palette_run_type_flag | |
| } | |
| num_copy_pixel_line | (16-3) |
| CurrNumIndices = 0 | |
| PaletteScanPos = 0 | |
| while( PaletteScanPos < num_copy_pixel_line * nCbS ) { | |
|   xC = x0 + trayScan[ PaletteScanPos ][ 0 ] | |
|   yC = y0 + trayScan[ PaletteScanPos ][ 1 ] | |
|   PaletteIndexMap[ xC ][ yC ] = −1 | (16-4) |
| } | |
| while( PaletteScanPos < nCbS * nCbS ) { | |
|   ... | |
| } | |

Since the syntax element, palette_transpose_flag needs to be signaled even when the MaxPaletteIndex is equal to 0, the syntax is incorporated (as shown in Note (16-1)) outside the test "if(MaxPaletteIndex>0)". At the same time, the syntax element, palette_transpose_flag inside the test "if(MaxPaletteIndex>0)" is deleted as indicated by line-filled text in Note (16-2). Syntax element num_copy_pixel_line is incorporated as indicated by Note (16-3). The palette indices of the samples within num_copy_pixel_line lines are assigned as −1 as indicated by Note (16-4).

Figure 10A:
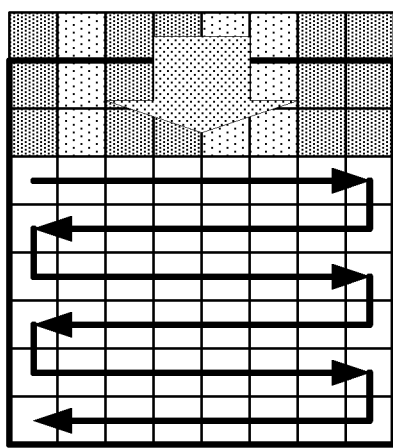
FIGS. 10A-C illustrate three different scan patterns according to an embodiment of the present invention for prediction across a CU.

If num_copy_pixel_line is an even number, it is natural to use the left-to-right scan for the first normal line, as shown in FIG. 10A. However, if the num_copy_pixel_line is an odd number, there are two types of scans to choose. One is the left-to-right scan for the first normal line as shown in FIG. 10B and the other is the right-to-left scan for the first normal line as shown in FIG. 10C.

Figure 10B:
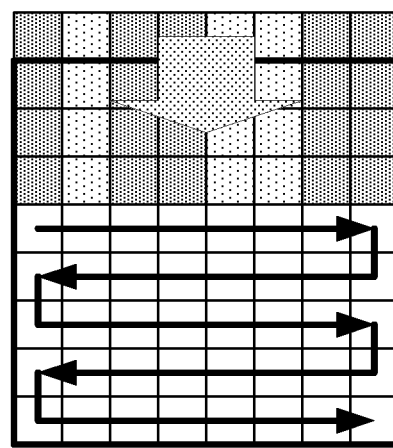
Figure 10C:
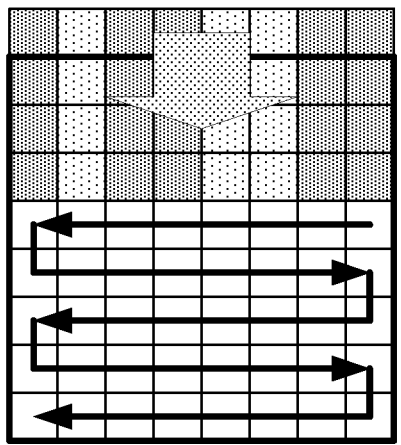

In FIG. 10B, it is like to move the traverse scan downward or to use the traverse from the first normal line. In FIG. 10C, it is like to use the traverse scan from the first sample in the current CU and skip the scan for first num_copy_pixel_line lines. In Tables 13 through 16, the scan in FIG. 10C is used. The syntax table can be modified accordingly for the scan in FIG. 10B.

Method 6: Table 17 illustrates an exemplary syntax table for palette coding for the scan in FIG. 10B.

TABLE 17

| palette_coding( x0, y0, nCbS ) { | Note |
|---|---|
| num_copy_pixel_line | (17-1) |
| if(num_copy_pixel_line = = nCbS) { | |
|   palette_transpose_flag | (17-2) |
|   PaletteScanPos = 0 | |
|   while( PaletteScanPos < num_copy_pixel_line * nCbS ) { | |
|     xC = x0 + travScan[ PaletteScanPos ][ 0 ] | |
|     yC = y0 + travScan[ PaletteScanPos ][ 1 ] | |
|     PaletteIndexMap[ xC ][ yC ] = −1 | (17-3) |
|   } | |
| } else { | |
|   .... | |
| } | |
| if( MaxPaletteIndex > 0) { | |
|   palette_transpose_flag | |
|   .... | |
| } else if(num_copy_pixel_line ! = 0) | |
|   palette_transpose_flag | (17-4) |
| CurrNumIndices = 0 | |
| PaletteScanPos = 0 | |
| while( PaletteScanPos < nCbS * nCbS ) { | |
|   xC = x0 + travScan[ PaletteScanPos ][ 0 ] | |
|   yC = y0 + travScan[ PaletteScanPos ][ 1 ] | |
|   PaletteIndexMap[ xR ][ yR ] = −1 | (17-5) |
| } | |
| PaletteScanPos = 0 | (17-6) |
| while( PaletteScanPos < nCbS * nCbS − num_copy_pixel_line * nCbS ) { | (17-7) |
|   xC = x0 + travScan[ PaletteScanPos ][ 0 ] | |
|   yC = y0 + travScan[ PaletteScanPos ][ 1 ]+ num_copy_pixel_line | (17-8) |
|   if( PaletteScanPos > 0) { | |
|     xcPrev = x0 + travScan[ PaletteScanPos − 1 ][ 0 ] | |
|     ycPrev = y0 + travScan[ PaletteScanPos − 1 ][ 1 ] + num_copy_pixel_line | (17-9) |
|   } | |
|   PaletteRun = nCbS * nCbS − PaletteScanPos − 1− num_copy_pixel_line * nCbS | (17-10) |
|   if( MaxPaletteIndex > 0 && CurrNumIndices < NumPaletteIndices ) { | |
|     if( PaletteScanPos >= nCbS && | (17-11) |
|     palette_run_type_flag[ xcPrev ][ ycPrev ] != COPY_ABOVE_MODE && | |
|     PaletteScanPos < nCbS * nCbS − 1− num_copy_pixel_line * nCbS ) { | |
|       palette_run_type_flag[ xC ][ yC ] | |
|     } | |
|     readIndex = 0 | |
|     if( palette_run_type_flag[ xC ][ yC ] = = COPY_INDEX_MODE && | |
|     AdjustedMaxPaletteIndex > 0) | |
|     readIndex = 1 | |
|   maxPaletteRun = nCbS * nCbS − PaletteScanPos − 1 − num_copy_pixel_line * nCbS | (17-12) |
|   if( AdjustedMaxPaletteIndex > 0 && | |
|     ( ( CurrNumIndices + readIndex ) < NumPaletteIndices \|\| | |
|     palette_run_type_flag[ xC ][ yC ] != last_palette_run_type_flag ) ) | |
|     if( maxPaletteRun > 0 ) { | |
|       palette_run_msb_id_plus1 | |
|       if( palette_run_msb_id_plus1 > 1 ) | |
|         palette_run_refinement_bits | |
|     } | |
|   CurrNumIndices + = readIndex | |
| } | |
| runPos = 0 | |
| while ( runPos < = paletteRun ) { | |
|   xR = x0 + travScan[ PaletteScanPos ][ 0 ] | |
|   yR = y0 + travScan[ PaletteScanPos ][ 1 ] + num_copy_pixel_line | (17-13) |
|   .... | |
| } | |
| } | |
| if( palette_escape_val_present_flag ) { | |
|   sPos = 0 | |
|   while( sPos < nCbS * nCbS − num_copy_pixel_line * nCbS) { | |
|     xC = x0 + travScan[ sPos ][ 0 ] | |
|     yC = y0 + travScan[ sPos ][ 1 ] + num_copy_pixel_line | |
|     if( PaletteIndexMap[ xC ][ yC ] = = MaxPaletteIndex ) { | |
|       for( cIdx = 0; cIdx < numComps; cIdx++ ) | |
|         if( cIdx = = 0 \|\| | |
|         ( xR % 2 = = 0 && yR % 2 = = 0 && ChromaArrayType = = 1 ) \|\| | |
|         ( xR % 2 = = 0 && ChromaArrayType = = 2 ) \|\| | |
|         ChromaArrayType = = 3 ) { | |
|           palette_escape_val | |
|           PaletteEscapeVal[ cIdx ][ xC ] [ yC ] = palette_escape_val | |

TABLE 17-continued

| palette_coding( x0, y0, nCbS ) { | Note |
|---|---|

```
            }
          }
        sPos++
      }
    }
  }// if(num_copy_pixel_line = = nCbS)
}
```

In Table 17, the syntax element, num_copy_pixel_line is incorporated in front of all syntaxes as indicated by Note (17-1). If the num_copy_pixel_line is equal to the nCbS (i.e., CU width or CU height), the syntax palette_transpose_flag is incorporated as indicated by Note (17-2). The palette indices of the whole CU are assigned to −1 as indicated by Note (17-3), which indicates the pixel values are copied from the neighboring CU. If the num_copy_pixel_line is not equal to 0 and the MaxPaletteIndex is not larger than 0 (e.g. MaxPaletteIndex is equal to 0), the syntax palette_transpose_flag is incorporated as indicated by Note (17-4). The palette indices of the samples within num_copy_pixel_line lines are assigned to −1 as indicated by Note (17-5). The PaletteScanPos is reset to 0 as indicated by Note (17-6). Since the PaletteScanPos is reset, the actual sample indices need to be increased by num_copy_pixel_line*nCbS as indicated by Note (17-7 and 17-10 through 17-12). The vertical position needs to be increased by num_copy_pixel_line as indicated by Note (17-8, 17-9 and 17-13).

The variable AdjustedMaxPaletteIndex is derived as follows:

```
AdjustedMaxPaletteIndex = MaxPaletteIndex
if( PaletteScanPos > 0 )
    AdjustedMaxPaletteIndex − = 1
```

The variable adjustedRefPaletteIndex is derived as follows:

```
adjustedRefPaletteIndex = MaxPaletteIndex + 1
if( PaletteScanPos > 0 ) {
    if( palette_run_type_flag[xcPrev][ycPrev] !=
      COPY_ABOVE_MODE ) {
        xcPrev = x0 + travScan[PaletteScanPos − 1][0]
        ycPrev = y0 + travScan[PaletteScanPos − 1][1] +
          num_copy_pixel_line
        adjustedRefPaletteIndex =
          PaletteIndexMap[xcPrev][ycPrev](7-80)
    }
    else
        adjustedRefPaletteIndex = PaletteIndexMap[xC][yC − 1]
}
```

Note that, in Method 3 through Method 6 mentioned above, the signaling of num_copy_pixel_line can also be structured by using the palette_run syntax elements and context in the existing HEVC SCC Specification. For example, it can be signaled as shown in Table 18.

TABLE 18

| zero_copy_pixel_line_flag | Note |
|---|---|
| if (palette_run_type_flag) <br>     copy_pixel_line_msb_id_plus1 | |

TABLE 18-continued

| zero_copy_pixel_line_flag | Note |
|---|---|
|   if( palette_run_msb_id_plus1 > 1 ) <br>     copy_pixel_line_refinement_bits <br> } | |

In Table 18, with the above syntax, the decoded copy_pixel_line_length can be semantically the number of copy pixel lines. The maximum value of this coded element is block height−1.

The decoded copy_pixel_line length can also be the actually number of samples using the copy pixel mode, and the number of copy pixel lines is derived as copy_pixel_line length/block_width. Note that in this method, a conformance constraint is imposed on the copy_pixel_line length such that it has to be multiple of block_width.

Method 7: In this method, the indication of whether the block begins with the copy pixel mode from outside the current CU, and the number of lines (number of samples) using the copy pixel mode is signaled using the current syntax structure with modified decoding process. For example, this can be achieved by the following:

Allowing the copy-above run mode for the first sample in the block. This is indicated by using the syntax element palette_run_type_flag[0][0]. If palette_run_type_flag[0][0] is 1, the following lines use copy pixel to fill the samples with the number of lines signaled. If palette_run_type_flag[0][0] is 0, the remaining syntax signaling stays the same as the current syntax structure.

When palette_run_type_flag[0][0] is 1, the number of lines using copy pixel is signaled using the same syntax elements for signaling palette run length. There are two ways to signal the number of lines using the palette run length syntax.

The decoded palette run length R for the copy pixel mode semantically means the number of lines (not number of samples). Therefore, the actual run of copy pixel is the decoded value R*block_width for the horizontal scan, or R*block_height for the vertical scan. The maximum value of this decoded R should be the block height (or width).

The other method is that the decoded palette run length R is the actual copy pixel run. This method does not require changing the semantic and decoding process for the run of copy pixel.

Note that, for this method, a conformance constraint has to be imposed on the decoded value R, such that it must be multiple of block_width.

When palette_run_type_flag[0][0] is 1, and after the copy pixel lines, the next line of samples cannot use the copy-above run mode. The parsing criterion is modified according to this condition to not parsing run_type flag for this line.

When palette_run_type_flag[0][0] is 0, the remaining samples in the first line cannot use the copy-above run mode. The parsing criterion is modified according to this condition to not parsing run_type flag for these samples.

Table 19 illustrates an exemplary syntax table for palette coding according to this method. The coding of "palette run length R" for the copy pixel mode semantically means the number of lines (not number of samples).

TABLE 19

| palette_coding( x0, y0, nCbS ) { | Note |
|---|---|
| palettePredictionFinished = 0 | |
| NumPredictedPaletteEntries = 0 | |
| .... | |
| if( NumPredictedPaletteEntries < palette_max_size ) | |
|     num_signaled_palette_entries | |
| numComps = ( ChromaArrayType = = 0 ) ? 1 : 3 | |
| for( cIdx = 0; cIdx < numComps; cIdx++ ) | |
|     for( i = 0; i < num_signaled_palette_entries; i++ ) | |
|         palette_entry | |
| if( CurrentPaletteSize != 0 ) | |
|     palette_escape_val_present_flag | |
| .... | |
| } | |
|     palette_transpose_flag | (19-1) |
| if( MaxPaletteIndex > 0 ) { | |
|     ~~palette_transpose_flag~~ | (19-2) |
|     num_palette_indices_idc | |
|     for( i=0; i < NumPaletteIndices; i++ ) { | |
|         palette_index_idc | |
|         PaletteIndexIdc[ i ] = palette_index_idc | |
|     } | |
|     last_palette_run_type_flag | |
| } | |
| CurrNumIndices = 0 | |
| PaletteScanPos = 0 | |
| while( PaletteScanPos < nCbS * nCbS ) { | |
|     xC = x0 + travScan[ PaletteScanPos ][ 0 ] | |
|     yC = y0 + travScan[ PaletteScanPos ][ 1 ] | |
|     PaletteIndexMap[ xC ][ yC ] = −1 | (19-3) |
| } | |
| PaletteScanPos = 0 | |
| num_copy_pixel_line = −1 | |
| while( PaletteScanPos < nCbS * nCbS ) { | |
|     xC = x0 + travScan[ PaletteScanPos ][ 0 ] | |
|     yC = y0 + travScan[ PaletteScanPos ][ 1 ] | |
|     if( PaletteScanPos > 0 ) { | |
|         xcPrev = x0 + travScan[ PaletteScanPos − 1 ][ 0 ] | |
|         ycPrev = y0 + travScan[ PaletteScanPos − 1 ][ 1 ] | |
|     } | |
|     PaletteRun = nCbS * nCbS − PaletteScanPos − 1 | |
|     if( MaxPaletteIndex > 0 && CurrNumIndices < NumPaletteIndices ) { | |
|         if( PaletteScanPos >= nCbS * (num_copy_pixel_line + 1) && palette_run_type_flag[ xcPrev ][ ycPrev ] != COPY_ABOVE_MODE && PaletteScanPos < nCbS * nCbS − 1 ) { | |
|             palette_run_type_flag[ xC ][ yC ] | |
|         } | |
|         readIndex = 0 | |
|         if( palette_run_type_flag[ xC ][ yC ] = = COPY_INDEX_MODE && AdjustedMaxPaletteIndex > 0) | |
|             readIndex = 1 | |
|         if (PaletteScanPos == 0 && palette_run_type_flag[ xC ][ yC ] = = COPY_ABOVE_MODE ) | |
|             maxPaletteRun = nCbS − 1 | (19-4) |
|         else | |
|             maxPaletteRun = nCbS * nCbS − PaletteScanPos − 1 | |
|         .... | |
|         CurrNumIndices += readIndex | |
|     } | |
|     if ( PaletteScanPos == 0) { | (19-5) |
|         if (palette_run_type_flag[ xC ][ yC ] = = COPY_ABOVE_MODE ) { | |
|             num_copy_pixel_line = paletteRun | |

TABLE 19-continued

| palette_coding( x0, y0, nCbS ) { | Note |
|---|---|
|         paletteRun = paletteRun * nCbS | |
|     } | |
|     else | |
|         num_copy_pixel_line = 0 | |
| } | |
| runPos = 0 | |
| .... | |
| } | |
| .... | |
| } | |

In Table 19, since the syntax element, palette_transpose_flag needs to be signaled even when the MaxPaletteIndex is equal to 0, the syntax is incorporated (as shown in Note (19-1)) outside the test "if(MaxPaletteIndex>0)". At the same time, the syntax element, palette_transpose_flag inside the test "if(MaxPaletteIndex>0)" is deleted as indicated by line-filled text in Note (19-2). The palette indices of the whole CU is first reset to −1 as indicated by Note (19-3), which indicates that the pixel values are copied from the neighboring CU. Palette_run_type_flag and paletteRun for the first sample (PaletteScanPos==0) are used to indicate the num_copy_pixel_line. As indicated by Note (19-5), for the first sample, if the palette_run_type_flag is equal to COPY_ABOVE_MODE, the maxPaletteRun is set equal to nCbS−1 as indicated by Note (19-4), and the num_copy_pixel_line is equal to the decoded paletteRun. Otherwise, the num_copy_pixel_line is set to 0.

Table 20 illustrates another exemplary syntax table for palette coding according to this method. The coding of "palette run length R" for the copy pixel mode is the actual run length, and conformance constraint is imposed so that R must be multiple of CU_width.

TABLE 20

| palette_coding( x0, y0, nCbS ) { | Note |
|---|---|
| palettePredictionFinished = 0 | |
| NumPredictedPaletteEntries = 0 | |
| .... | |
| .... | |
| } | |
|     palette_transpose_flag | (20-1) |
| if( MaxPaletteIndex > 0 ) { | |
|     palette_transpose_flag | (20-2) |
|     num_palette_indices_idc | |
|     for( i=0; i < NumPaletteIndices; i++ ) { | |
|         palette_index_idc | |
|         PaletteIndexIdc[ i ] = palette_index_idc | |
|     } | |
|     last_palette_run_type_flag | |
| } | |
| CurrNumIndices = 0 | |
| PaletteScanPos = 0 | |
| while( PaletteScanPos < nCbS * nCbS ) { | |
|     xC = x0 + travScan[ PaletteScanPos ][ 0 ] | |
|     yC = y0 + travScan[ PaletteScanPos ][ 1 ] | |
|     PaletteIndexMap[ xC ][ yC ] = −1 | (20-3) |
| } | |
| PaletteScanPos = 0 | |
| num_copy_pixel_line = −1 | |
| .... | |
| PaletteRun = nCbS * nCbS − PaletteScanPos − 1 | |
| if( MaxPaletteIndex > 0 && CurrNumIndices < NumPaletteIndices ) { | |
|     if( PaletteScanPos >= nCbS * (num_copy_pixel_line + 1) && palette_run_type_flag[ xcPrev ][ ycPrev ] != COPY_ABOVE_MODE && PaletteScanPos < nCbS * nCbS − 1 ) { | |
|         palette_run_type_flag[ xC ][ yC ] | |

TABLE 20-continued

| palette_coding( x0, y0, nCbS ) { | Note |
|---|---|
|     } | |
|     .... | |
|     .... | |
|   } | |
|   if ( PaletteScanPos == 0) { | (20-4) |
|     if (palette_run_type_flag[ xC ][ yC ] == | |
|     COPY_ABOVE_MODE ) { | |
|       [constraint that paletteRun is multiple of nCbS] | |
|       num_copy_pixel_line = paletteRun / nCbS | |
|     } | |
|     else | |
|       num_copy_pixel_line = 0 | |
|   } | |
|   runPos = 0 | |
|   .... | |
|   } | |
| } | |
| .... | |
| } | |

In Table 20, since the syntax element, palette_transpose_flag needs to be signaled even when the MaxPaletteIndex is equal to 0, the syntax is incorporated (as shown in Note (20-1)) outside the test "if(MaxPaletteIndex>0)". At the same time, the syntax element, palette_transpose_flag inside the test "if(MaxPaletteIndex>0)" is deleted as indicated by line-filled text in Note (20-2). The palette indices of the whole CU are first reset to −1 as indicated by Note (20-3), which indicates that the pixel values are copied from the neighboring CU. The palette_run_type_flag and paletteRun for the first sample (PaletteScanPos 0) are used to indicate the num_copy_pixel_line. As indicated by Note (20-4), for the first sample, if the palette_run_type_flag is equal to COPY_ABOVE_MODE, the num_copy_pixel_line is equal to the decoded paletteRun/nCbs. Note that in this situation, a conformance constraint is imposed on the paletteRun such that it has to be multiple of nCbs. Otherwise (i.e., the palette_run_type_flag is not equal to COPY_ABOVE_MODE), the num_copy_pixel_line is set to 0.

Method 8: According to this method, only num_copy_pixel_line=0 or CU width is tested. A short cut in the palette mode is provided by introducing a new syntax element, pred_from_neighboring_pixels. If pred_from_neighboring_pixels is 1, palette_transpose_flag is signaled.

If pred_from_neighboring_pixels is 1, and the palette_transpose_flag is 0, all samples are predicted from the pixels of the above CU. If pred_from_neighboring_pixels is 1, and the palette_transpose_flag is 1, all samples are predicted from the pixels of the left CU. If the neighboring pixels are unavailable, there are two ways to generate the replacement pixels. According to the first approach, the Intra prediction boundary pixel generation method can be used. It is like horizontal or vertical Intra prediction without residual coding. According to the second approach, the color with the palette index equal to 0 is used instead. If the palette table of the current CU is not coded (e.g. num_copy_pixel_line equal to CU_width), the first palette in the palette predictor table is used instead.

Table 21 illustrates an exemplary syntax table for palette coding according to this method.

TABLE 21

| palette_coding( x0, y0, nCbS ) { | Note |
|---|---|
|   pred_from_neighboring_pixels | (21-1) |
|   if(pred_from_neighboring_pixels) { | |
|     palette_transpose_flag | (21-2) |
|     PaletteScanPos = 0 | |
|     while( PaletteScanPos < nCbS * nCbS ) { | |
|       xC = x0 + travScan[ PaletteScanPos ][ 0 ] | |
|       yC = y0 + travScan[ PaletteScanPos ][ 1 ] | |
|       PaletteIndexMap[ xC ][ yC ] = −1 | |
|     } | |
|   } else { | |
|     palettePredictionFinished = 0 | |
|     NumPredictedPaletteEntries = 0 | |
|     .... | |
|   }// if(pred_from_neighboring_pixels) | |
| } | |

In Table 21, the syntax element, pred_from_neighboring_pixels syntax is incorporated as indicated by Note (21-1). If the pred_from_neighboring_pixels is true, palette_transpose_flag is incorporated and the palette indices of the whole CU are set to −1, as indicated by Note (21-2).

In Method 3 through Method 8, only signal one palette_transpose_flag is signaled. If palette_transpose_flag is equal to 0, the vertical copy pixel mode is used first and then the index horizontal scan is used. Otherwise, the horizontal copy pixel is used first and then index vertical scan is used.

Alternatively, two transpose flags, such as palette_copy_pixel_transpose_flag and palette_scan_transpose_flag can be signaled. Palette_copy_pixel_transpose_flag indicates the direction of the copy pixel mode from the neighboring CU. Palette_scan_transpose_flag indicates the direction of palette scan. For example, palette_copy_pixel_transpose_flag equal to 0 means the copy pixel from the above CU and palette_copy_pixel_transpose_flag equal to 1 means the copy pixel mode from the left CU. Palette_scan_transpose_flag equal to 0 means the horizontal scan is used and 1 means the vertical scan is used.

Figure 11A:
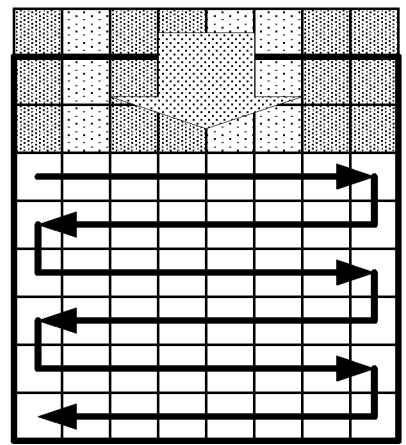
FIGS. 11A-C illustrate three different scan patterns according to another embodiment of the present invention for prediction across a CU.
Figure 11B:
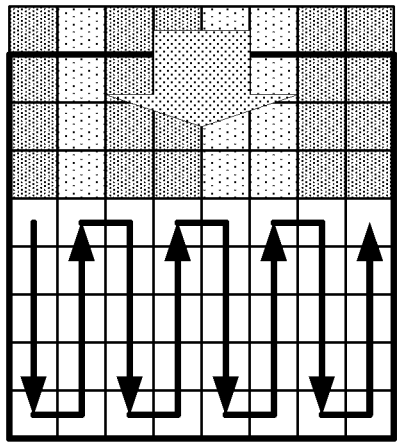
Figure 11C:
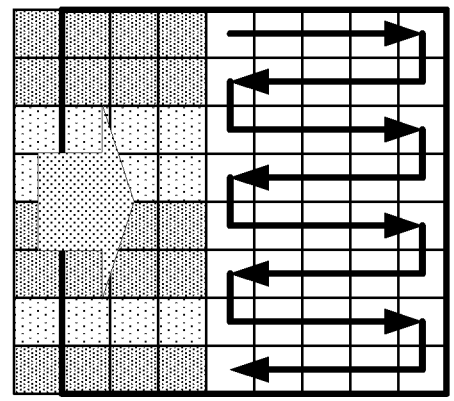

For example, in FIG. 11A, palette_copy_pixel_transpose_flag is 0 and palette_scan_transpose_flag is 0. In FIG. 11B, palette_copy_pixel_transpose_flag is 0 and palette_scan_transpose_flag is 1. In FIG. 11C, palette_copy_pixel_transpose_flag is 1 and palette_scan_transpose_flag is 0.

Prediction Across a CU with Reversed Traverse Scan and Rotated Traverse Scan

According to one embodiment, prediction across a CU can be applied with the reversed traverse scan and rotated traverse scan. FIG. 12A illustrates an example of prediction across a CU with a reversed traverse scan, and FIG. 12B illustrates an example of prediction across a CU with a rotated traverse scan. The scan position of the normal index map coding for both scans starts from 0 and ends at nCbS*nCbS−num_copy_pixel_line*nCbS−1. For the remaining samples with sample positions equal to or larger than nCbS*nCbS−num_copy_pixel_line*nCbS, the PaletteIndexMap[xC][yC] is set equal to −1, which means that their pixel value is the same as the neighboring pixels.

Context Formation and Binarization for Num_Copy_Pixel_Line

The syntax element, num_copy_pixel_line can be binarized using Exponential-Golomb code with order-K (EG-K code), truncated Exponential-Golomb code with order-K (truncated EG-K code), N-bit Truncated Unary code+EG-K code, or the same binarization method used in palette run (binarized to palette_run_msb_id_plus1 and palette_run_refinement_bits).

The context bins can be used for coding num_copy_pixel_line. For example, we can use the same binarization method used in palette run for num_copy_pixel_line. The first N bits of palette_run_msb_id_plus1 can use context coded bins. For example, N can be 3. The remaining bins are coded in bypass bins. The contexts can be shared with palette run coding. For example, the contexts can be shared with the extended copy-above run mode.

Since the probabilities of num_copy_pixel_line being equal to CU_width and 0 are larger than the probability of num_copy_pixel_line being other numbers, the code binarization is modified in order to reduce the codeword of num_copy_pixel_line being equal to CU_width. For example, the value of CU_width can be inserted before a number P (e.g. 1) in the codeword table for binarization. The value of num_copy_pixel_line that is equal to or larger than P will be increased by 1 in the encoder side. In the decoder side, if the parsed codeword is P, it means the num_copy_pixel_line is equal to CU_width. If the parsed codeword is smaller than P, the num_copy_pixel_line is equal to the parsed codeword. If the parsed codeword is larger than P, the num_copy_pixel_line is equal to the parsed codeword minus 1.

In another embodiment, two additional bits are used to indicate whether num_copy_pixel_line is equal to 0, CU_width, or other number. For example, "0" means num_copy_pixel_line is equal to 0, "10" means num_copy_pixel_line is equal to CU_width, and "11+codeword-L" means num_copy_pixel_line is equal to L+1.

In yet another embodiment, two additional bits are used to indicate whether the num_copy_pixel_line is equal to 0, CU_width, or other number. For example, "0" means num_copy_pixel_line is equal to CU_width, "10" means num_copy_pixel_line is equal to 0, and "11+codeword-L" means num_copy_pixel_line is equal to L+1.

For Method 4 through Method 7 mentioned in the Prediction across a CU section, the num_copy_pixel_line is signaled after the palette table coding. The binarization of num_copy_pixel_line can be modified according to the decoded information of the palette table coding. For example, if NumPredictedPaletteEntries and num_signaled_palette_entries are all 0, it means at least one row/column of samples is coded with normal palette mode. Therefore, num_copy_pixel_line should not be equal to CU_width. Accordingly, the codeword range of num_copy_pixel_line is limited to be from 0 to (CU_width−1). For example, if the truncated Exponential-Golomb code with order-K (truncated EG-K code), N-bit Truncated Unary code+EG-K code, or the same binarization method used in the palette run is used for coding the num_copy_pixel_line, the cMax, MaxPaletteRun, or max possible value is set to be CU_width−1. The binarization method used for the palette run will binarized the palette run to palette_run_msb_id_plus1 and palette_run_refinement_bits.

Searching Method to Determine Num_Copy_Pixel_Line

In another embodiment, the search method to determine the number of copy-pixel lines (i.e., num_copy_pixel_line) is disclosed.

Method 1: In the encoder side, the value of num_copy_pixel_line is determined. The first num_copy_pixel_line columns/rows are predicted from the neighboring pixels. The remaining samples are used to derive the palettes for the rest samples and the index map.

Method 2: In the encoder side, the samples of the whole CU are used to derive the palettes first. According to this palette table, a rate-distortion-optimization (RDO) process can be used to determine the best value of num_copy_pixel_line. The interpolation can be used to estimate the bit cost of different num_copy_pixel_line. For example, if the bit cost for num_copy_pixel_line=0 is R0 and the CU_width is 16, the bit cost for num_copy_pixel_line=3 is equal to R0*(CU_width−3)/CU_width (i.e., 13/16*R0).

After the num_copy_pixel_line is determined, the first num_copy_pixel_line columns/rows are predicted from the neighboring pixels. The remaining samples are used to re-derive the palettes for the remaining samples and the index map.

Line-Based Copy Pixels from Neighboring CU

In the previous section, a row-based copy pixel from neighboring CU is disclosed for palette mode coding. A syntax element, num_copy_pixel_row representing the number of copy pixel rows is first signaled to indicate the first num_copy_pixel_row lines of samples to be predicted from the reconstructed pixels in the neighboring CU. The similar concept can be applied to other modes, such as Inter mode, Intra mode, and IntraBC mode.

In one embodiment, the row-based copy pixel from neighboring CU is applied to the Inter mode and/or Intra mode PU or CU. A syntax element, num_copy_pixel_row is first signaled. If the num_copy_pixel_row is not equal to 0, a syntax element, copy_pixel_row_direction_flag is signaled to indicate the direction of copy pixel rows. If copy_pixel_row_direction_flag is 0, num_copy_pixel_row indicates the first num_copy_pixel_row rows of samples to be predicted from the reconstructed pixels in the above CUs. If copy_pixel_row_direction_flag is 1, the num_copy_pixel_ row indicates the first num_copy_pixel_row columns of samples to be predicted from the reconstructed pixels in the left CUs. For example, FIG. 13 illustrates an example of an 8×8 CU coded in the Inter mode. The value of num_copy_pixel_row of this CU is 3 and copy_pixel_row_direction_ flag of this CU is 0. The predictors in the upper three rows are replaced by the reconstructed pixel values of the last row of the above CUs. The rest pixels are predicted by the original Inter mode. It is similar to performing the Inter mode prediction for the whole CU/PU, and then replacing the first num_copy_pixel_row rows or columns by the neighboring pixels.

The Intra prediction neighboring pixel construction can be used to generate the neighboring reference pixels. If the neighboring pixel is not available (e.g. outside the picture boundary), the reference pixel filling method in Intra prediction can be applied to generate the neighboring reference pixels. The smoothing filter in Intra prediction can be applied or turn-off.

The syntax elements, num_copy_pixel_row and copy_pixel_row_direction_flag can be signaled at CU-level or PU-level. Num_copy_pixel_row and copy_pixel_row_direction_flag can be signaled in front of the CU or PU, or can be signaled in the middle of the CU or PU, or can be signaled at the end of the CU or PU. For example, if num_copy_pixel_row and copy_pixel_row_direction_flag are signaled at CU-level and signaled in front of the CU, num_copy_pixel_row and copy_pixel_row_direction_flag can be signaled before part_mode. The codeword of part_mode can be adaptively changed according to the value of the num_copy_pixel_row and the copy_pixel_row_direction_flag. For example, if the copy_pixel_row_direction_flag is 0 and the num_copy_pixel_row is equal to or larger than CU_height/2, the PART_2N×N and PART_2N×nU are not valid. The codeword binarization of part_mode is modified. For example, if the PART_2N×N and PART_2N×nU are removed, the binarization of part_mode is shown in Table 22.

TABLE 22

| CuPredMode [xCb][yCb] | part_mode | PartMode | Bin string | | | |
|---|---|---|---|---|---|---|
| | | | log2CbSize > MinCbLog2SizeY | | log2CbSize == MinCbLog2SizeY | |
| | | | !amp_enabled_flag | amp_enabled_flag | log2CbSize == 3 | log2CbSize > 3 |
| MODE_INTRA | 0 | PART_2Nx2N | — | — | 1 | 1 |
| | 1 | PART_NxN | — | — | 0 | 0 |
| MODE_INTER | 0 | PART_2Nx2N | 1 | 1 | 1 | 1 |
| | 1 | PART_2NxN | — | — | — | — |
| | 2 | PART_Nx2N | 0 | 001 | 0 | 01 |
| | 3 | PART_NxN | — | — | — | 00 |
| | 4 | PART_2NxnU | — | — | — | — |
| | 5 | PART_2NxnD | — | 01 | — | — |
| | 6 | PART_nLx2N | — | 0000 | — | — |
| | 7 | PART_nRx2N | — | 0001 | — | — |

In Table 22, the texts with line-filled background correspond to deleted texts. In another example, if num_copy_pixel_row and copy_pixel_row_direction_flag are signaled at CU-level and signaled at the end of the CU or in the middle of the CU, num_copy_pixel_row and copy_pixel_row_direction_flag can be signaled after part_mode. After the part_mode is received, the value of num_copy_pixel_row and copy_pixel_row_direction_flag can be restricted. For example, if the part_mode is PART_2N×N and the copy_pixel_row_direction_flag is 0, the value of num_copy_ pixel_row is restricted to the range from 0 to CU_height/2.

Intra Boundary Reference Pixels

In Intra mode, if num_copy_pixel_row is not 0, the neighboring reference pixels can be the same as the pixels derived from HEVC. It is the same as performing the Intra prediction for the PU, and then replacing the first several rows or columns by the pixels of the neighboring CU.

In another embodiment, if num_copy_pixel_row is not 0, the positions of the neighboring reference pixels are changed. FIG. 14 and FIG. 15 illustrate examples of changing the positions of the neighboring reference pixels according to to this embodiment. In FIG. 14 and FIG. 15, num_copy_pixel_row is 3 and copy_pixel_row_direction_flag is 0. The upper reference pixels and upper-left reference pixels are shifted to the third row. In FIG. 14, the upper-right reference pixels are copied from the upper-right CU. In FIG. 15, the upper-right reference pixels are copied from the right-most pixels of the third row.

Residual Coding for the Area Predicted From a Neighboring CU

According to one embodiment, if num_copy_pixel_row is N and copy_pixel_row_direction_flag is 0, the upper N rows are predicted from the neighboring CU. The residual of the upper N rows can be restricted to be 0. According to another embodiment, the residual of the upper N rows can be signaled. For Inter mode, the HEVC residual quad-tree is applied.

Context Formation and Binarization for Num_Copy_Pixel_Row

The num_copy_pixel_row can be binarized using Exponential-Golomb code with order-K (EG-K code), truncated Exponential-Golomb code with order-K (truncated EG-K code), N-bit Truncated Unary code+EG-K code, or the same binarization method used in palette run (i.e., being binarized to palette_run_msb_id_plus1 and palette_run_refinement_bits).

The context bins can be used for coding num_copy_pixel_row. For example, the same binarization method as that for num_copy_pixel_row in palette run coding can be used. The first N bits of palette_run_msb_id_plus1 can use context coded bins. For example, N can be 3. The rest bins are coded in bypass bins. The contexts can be shared with palette run coding. For example, the contexts can be shared with the extended copy-above run mode.

Since the probabilities of num_copy_pixel_row being equal to CU_width and 0 are higher than the probability of num_copy_pixel_row being other numbers, the code binarization can be modified to reduce the codeword of num_copy_pixel_row being equal to CU_width. For example, the value for CU_width can be inserted before a number M (e.g. 1) in the codeword table. The value of num_copy_pixel_row that is equal to or larger than M will be increased by 1 in the encoder side. In the decoder side, if the parsed codeword is M, it means num_copy_pixel_row is equal to CU_width. If the parsed codeword is smaller than M, the num_copy_pixel_row is equal to the parsed codeword. If the parsed codeword is larger than M, num_copy_pixel_row is equal to the parsed codeword minus 1.

According to another embodiment, two additional bits are used to indicate whether num_copy_pixel_row is equal to 0, CU_width, or other number. For example, "0" means num_copy_pixel_row is equal to 0, "10" means num_copy_pixel_row is equal to CU_width, and "11+codeword-L" means num_copy_pixel_row is equal to L+1. In another example, "0" means num_copy_pixel_row is equal to CU_width, "10" means num_copy_pixel_row is equal to 0, "11+codeword-L" means num_copy_pixel_row is equal to L+1.

For Method 4 through Method 7 mentioned in the Prediction across a CU section, num_copy_pixel_row can be signaled after the palette table coding. The binarization of num_copy_pixel_row can be modified according to the decoded information of the palette table coding. For example, if NumPredictedPaletteEntries and num_signaled_palette_entries are all 0, it means that at least one row/column of samples are coded with normal palette mode. The num_copy_pixel_row should not be equal to CU_width. Therefore, the codeword range of num_copy_pixel_row is limited to be from 0 to (CU_width−1). For example, if the truncated Exponential-Golomb code with order-K (truncated EG-K code), N-bit Truncated Unary code+EG-K code, or the same binarization method used in palette run (i.e., being binarized to palette_run_msb_id_plus1 and palette_run_refinement_bits) is used for coding the num_copy_pixel_row, the cMax, MaxPaletteRun, or max possible value is set to be CU_width−1.

In this section, the CU_width mentioned above can be replaced by CU_height, PU width, or PU_height for CU-level or PU-level row-based copy pixel from neighboring method.

Number of Indices Coding

In SCM-4.0 palette index map coding, the number of indices is first signaled. To signal the the number of indices, a variable "number of indices−palette size" is first derived. A mapping process is then performed to map the "number of indices −palette size" to a "mapped value". The mapped value is binarized with the same binarization method as for "coeff_abs_level_remaining" and is signaled. The prefix part is represented by Tunrated Rice code. The suffix part is represented by Exp-Golomb code. This binarization process can be considered to have an input cParam and the cParam is set to (2+indexMax/6). However, the indexMax/6 requires a division or a lookup table operation. Therefore, according to an embodiment of the present invention, the cParam is set to (2+indexMax/M) and M is a power-of-2 integer (e.g. $2^n$ and n is an integer). Therefore, indexMax/M can be implemented by right-shifting indexMax by n bits. For example, cParam is set to be (2+indexMax/4) or (2+indexMax/8), which can be implemented by right-shifting indexMax by 2 or 3 bits respectively.

Grouping all Escape Colors Before Encoding/Parsing the Palette Index Map

In the current HEVC SCC specification or previous versions, values of the escape pixels in palette coding are either signaled in an interleaved fashion with other regular indices during the coding of index map, or the pixels values are grouped together after the coding of index map is completed. According to one embodiment of the present invention, all the escape pixel values are grouped in front of index map coding.

Assume that there are N escape pixels in different locations within the current coding block, where N is a positive integer. In one embodiment, all color values of these escape pixels are encoded/decoded together before encoding/decoding the palette index map of this coding block. In this way, when an index is decoded as the escape index, its corresponding pixel value no longer needs to be decoded. Note that some of escape pixels may have the same color value. In one embodiment, the pixel value of each escape pixel occurrence is still written into bitstream.

Figure 16:
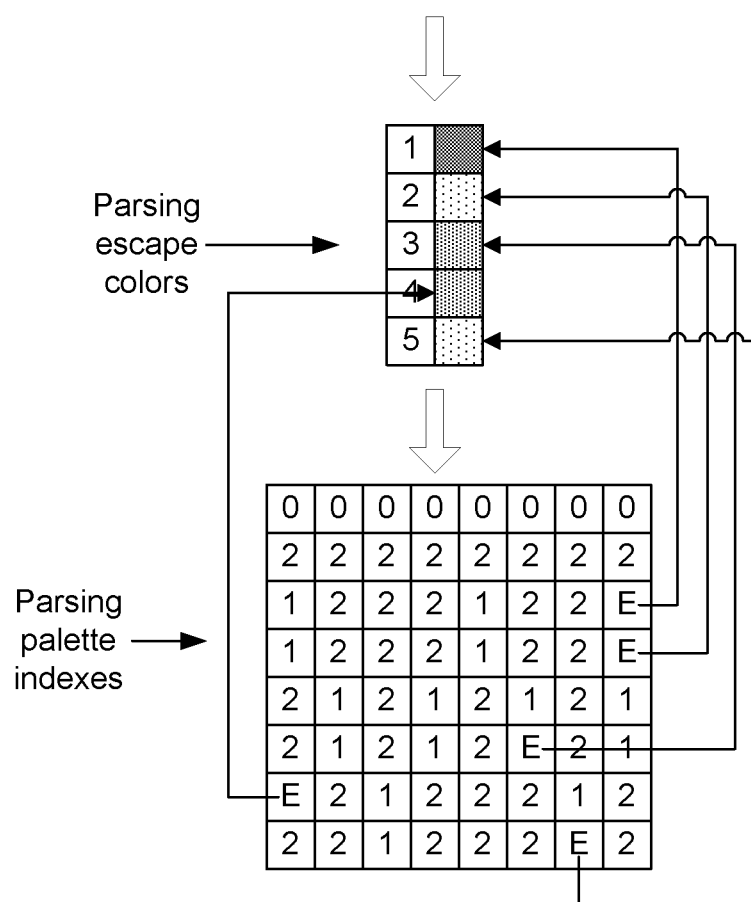
FIG. 16 illustrates an example of decoding escape colors according to an embodiment with N escape pixels in different locations within the current coding block (N=5), where the pixel value of each escape pixel occurrence is still written into bitstream and the horizontal traverse scan is used.

In FIG. 16, an example of decoding escape colors according to an embodiment of this method with N=5, where the pixel value of each escape pixel occurrence is still written into bitstream. In this example, horizontal traverse scan is used. Each escape pixel can find its corresponding color in the decoded table, according to the decoding order.

In another embodiment, only non-duplicated color values are written into bitstream, and an index of those written colors is signaled for each escape pixel occurrence.

Figure 17:
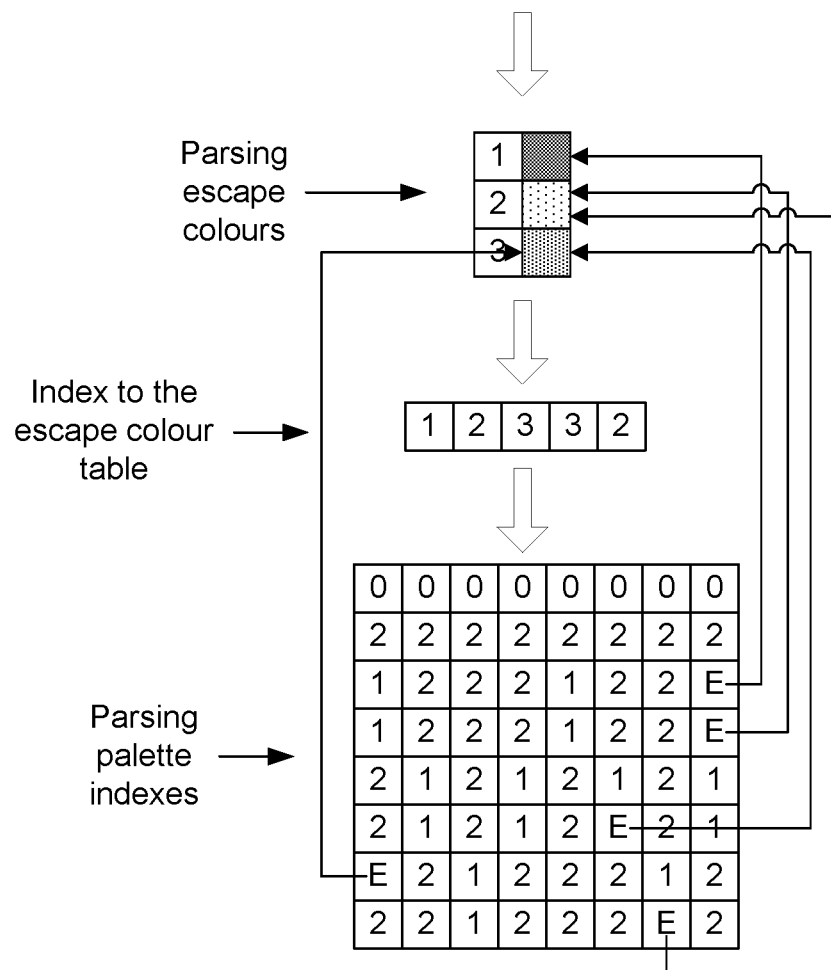
FIG. 17 illustrates an example of decoding escape colors according to another embodiment with N escape pixels in different locations within the current coding block (N=5), where only non-duplicated colors are decoded.

FIG. 17 illustrates an example of decoding escape colors according to an embodiment of this method with N=5, where only non-duplicated color values are written into bitstream. In this example, horizontal traverse scan is used. Only non-duplicated colors are decoded (e.g. M=3), and an index in this color table for each escape pixel occurrence is signaled (e.g. N=5). Each escape pixel can find its corresponding color in the decoded table, according to the decoding order.

End of Escape Color Signaling

In one embodiment, the number of escape colors encoded/decoded is signaled. For example, after each escape color is encoded or decoded, a 1-bit flag "end_of_escape_color_flag" is used to signal if this is the last color to be coded or decoded. When decoded end_of_escape_color_flag is 1, no more escape colors need to be decoded. Assuming there are N escape colors in the current coding block, the last M pixels have the same color value, where M and N are integers and M<=N. In another embodiment, only one color value of these M pixels needs to be sent, and end_of_escape_color_flag is set to 1. The last (M−1) escape pixels are inferred to share the last decoded escape color value. An example of this method is shown in Table 23 for N=5 and M=3.

TABLE 23

| order of escape pixel | Decoded escape color value | end_of_escape_color_flag | Actual escape pixel values | Note |
|---|---|---|---|---|
| 0 | (R1, G1, B1) | 0 | (R1, G1, B1) | Decoded |
| 1 | (R2, G2, B2) | 0 | (R2, G2, B2) | Decoded |
| 2 | (R3, G3, B3) | 1 | (R3, G3, B3) | Decoded |
| 3 | | | (R3, G3, B3) | Inferred |
| 4 | | | (R3, G3, B3) | Inferred |

In another embodiment, the total number of escape colors is explicitly signaled, before encoding/decoding the color values. Furthermore, end_of_escape_color_flag can be either by-pass coded or context coded.

Constraint on the Total Number of Escape Colors Allowed in a Coding Block

The total number of decoded escape colors can be constrained, by setting a maximum allowed number at a high level header such as in sequence level, picture level or slice level.

If this maximum number is reached, the remaining escape pixels are inferred to share the value of last decoded escape color according to one embodiment. In another embodiment, the remaining escape pixels are inferred to share a value of specific decoded escape color, such as the most frequently used color.

Copy Pixels from Outside a CU

In SCM 3.0, the color index value range depends on palette size and escape flag. If escape flag is off, the maximal index value is equal to palette size. If escape flag is on, the maximal index value is equal to (palette size+1). If the maximal index value is equal to N, the possible index value range is from 0 to (N−1). In SCM 3.0, the maximal index value equal to 0 is forbidden. If the maximal index value is equal to 1, all color indices in a CU will be inferred as 0. It assumes all color indices should be 0 if there is only one possible index value.

Figure 18:
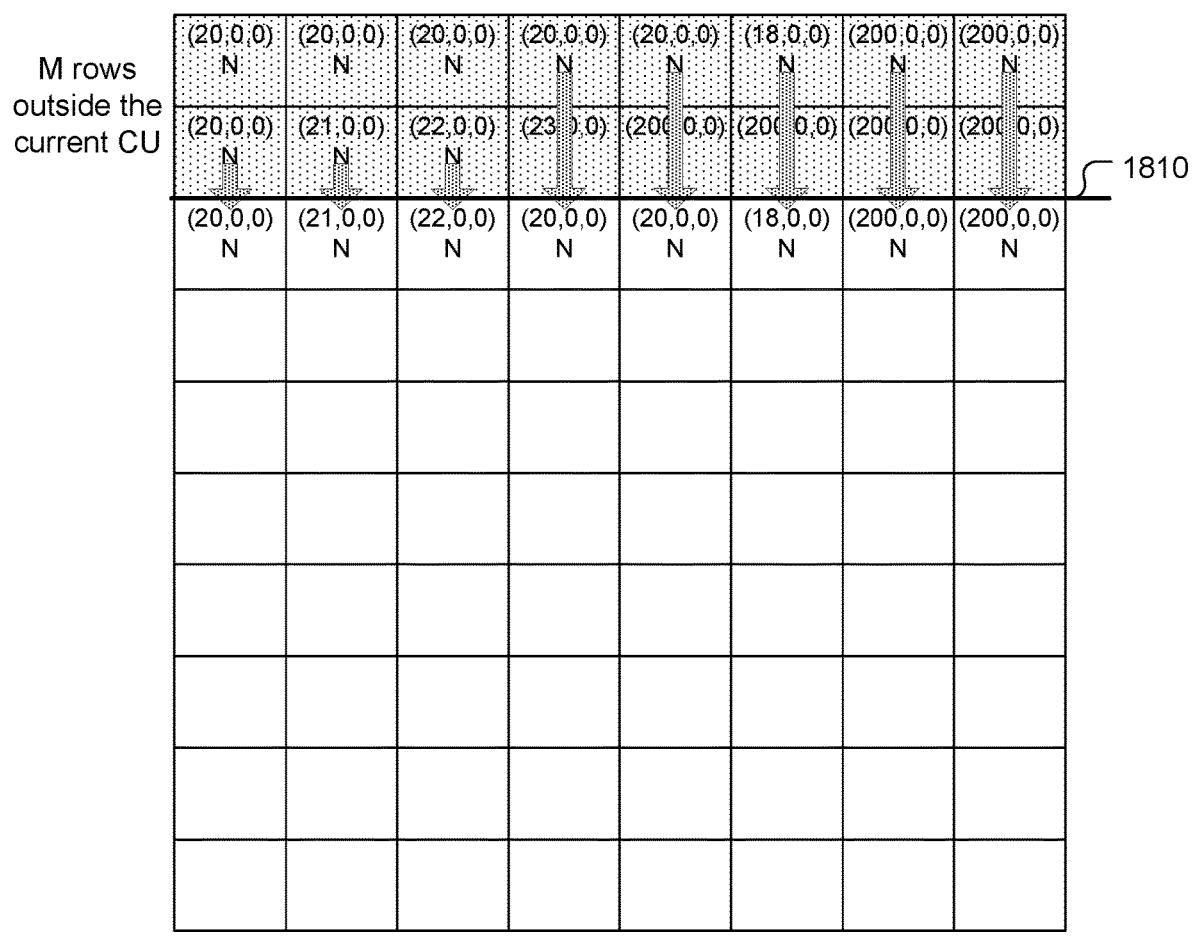

According to prior disclosure, a pixel can be signaled by a COPY_ABOVE. In this case, it will copy not only the pixel indices of the above pixels but also the pixel values of the above pixels. The decoder can reconstruct the pixel in a COPY_ABOVE from the copied pixel value without referring the palette. If the above pixel is across a CU boundary, according to prior disclosure, a special index for the neighboring constructed pixel (NCPs) of a neighboring CU, denoted as N is assigned according to prior disclosure. When a pixel is signaled by a COPY_ABOVE, it will copy not only the pixel index (N) of the above pixel but also the pixel value of the above pixel indicated by dot-filled area in FIG. 18, where the CU boundary (1810) is shown.

Based on the method that copies NCPs' pixel value, the assumption of handling palette-coded-CU with zero/one index value is not true. For the case that the maximal index value is equal to 0, all pixel in a CU can be predicted from NCPs, as shown in FIG. 19.

If the maximal index value is equal to 1, not all color indices may be 0. Part of pixels may be 0 and part of pixels may be predicted from NCP, as shown in FIG. 20.

In the examples shown in FIG. 19 and FIG. 20, there is no corresponding syntax that cannot be signaled in SCM3.0. Accordingly, new syntax to signal these cases is disclosed as follows.

Syntax Elements for Index Prediction Across a CU

In SCM3.0, a palette coded CU contains following syntax:

Palette_share_flag equal to 1 specifies that the palette size is equal to previous previousPaletteEntries and the entire palette entries are the same as the previous palette entries.

Palette_transpose_flag equal to 1 specifies the transpose process is applied to the associated palette indices of the current CU. Palette_transpose_flag equal to 0 specifies the transpose process is not applied to the associated palette indices of the current CU.

Palette_escape_val_present_flag specifies the escape coded sample value.

Palette_prediction_run[i] specifies the difference between indices of the current reused and the next reused palette entries from the previous palette previousPaletteEntries with the following exceptions: palette_prediction_run equal to 0 indicates that the difference between the indices of the current and next reused entries is 1, and palette_prediction_run equals to 1 indicates that no more entries from the previous palette previousPaletteEntries are reused.

Num_signaled_palette_entries specifies the number of entries in the palette that are explicitly signaled for the current coding unit.

Palette_entries specifies the i-th element in the palette for the color component cIdx.

Palette_run_coding( ) specifies run coding pattern of index map.

In order to provide syntax for index prediction across a CU, the following syntax examples are disclosed according to an embodiment of the present invention:

Syntax Example 1

A new flag all_pixel_from_NCP_flag is added. If all_pixel_from_NCP_flag is off, other syntax is the same as SCM3.0. In the first row, the copy run mode can be signaled to allow prediction across a CU. If all_pixel_from_NCP_flag is on, all pixels are implied to be predicted from NCPs. Palette_transpose_flag can be signaled to imply prediction from left NCPs or above NCPs. Other prediction direction can be also signaled. If all_pixel_from_NCP_flag is on, signaling palette_share_flag, palette_escape_val_present_flag, palette_prediction_run, num_signaled_palette_entries, palette_entries, or palette_run_coding( ) can be skipped.

Figure 21:
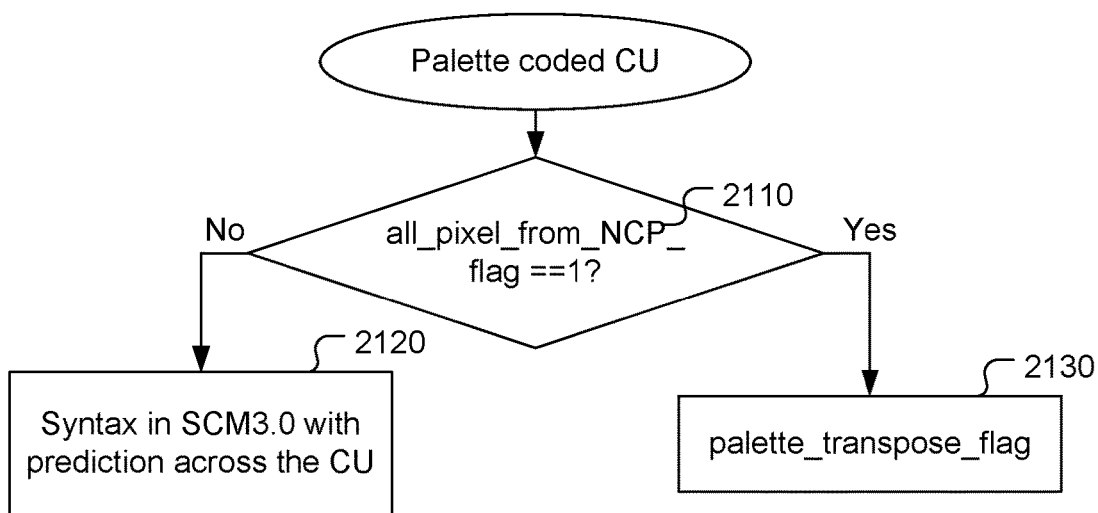
FIG. 21 illustrates an exemplary flow chart of signaling to support index prediction across a CU, where a new flag all_pixel_from_NCP_flag is added and syntax according to SCM3.0 is used for index prediction across a CU.

FIG. 21 illustrates an exemplary flow chart of signaling to support index prediction across a CU according to the above example. In step 2110, whether all_pixel_from_NCP_flag is equal to 1 is tested. If the result is "yes", step 2130 is performed. If the result is "no", step 2120 is performed. In step 2130, palette_transpose_flag is signaled to imply prediction from left NCPs or above NCPs. In step 2120, syntax based on SCM3.0 is used for index prediction across a CU.

Syntax Example 2

A new flag any_pixel_from_NCP_flag is added. If any_pixel_from_NCP_flag is off, the other syntax is the same as SCM3.0. In the first row, the copy run mode is not signaled (no prediction across CU). If any_pixel_from_NCP_flag is on, parts of pixels are implied to be predicted from NCPs. The encoder can signal palette_share_flag, palette_prediction_run, num_signaled_palette_entries, palette_escape_val_present_flag, and the decoder can calculate the maximal index value based on the information. If the maximal index value is equal to 0, all pixels are predicted from NCPs, and palette_run_coding( ) can be skipped. If the maximal index value is larger than 0, part of pixels are predicted from NCPs, and palette_run_coding( ) can be signaled.

Figure 22:
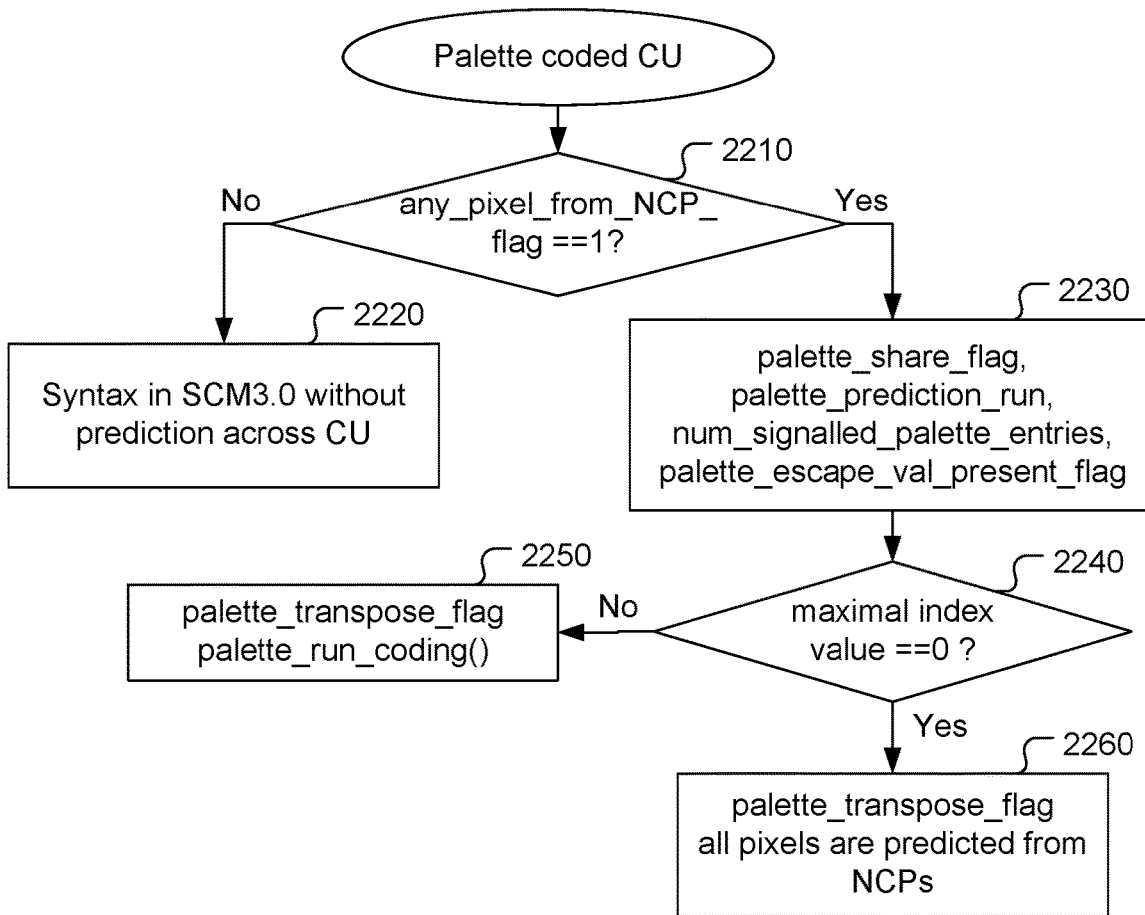
FIG. 22 illustrates an exemplary flow chart of signaling to support index prediction across a CU, where a new flag all_pixel_from_NCP_flag is added and syntax according to SCM3.0 is used without index prediction across a CU when all_pixel_from_NCP_flag is off.

FIG. 22 illustrates an exemplary flow chart of signaling to support index prediction across a CU according to the above example. As shown in step 2210, whether any_pixel_from_NCP_flag is equal to 1 is tested. If the result is "yes", step 2230 is performed. If the result is "no", step 2220 is performed. In step 2220, syntax based on SCM3.0 is used for index prediction without prediction across a CU. In step 2230, various syntax elements including palette_share_flag, palette_prediction_run, num_signaled_palette_entries, and palette_escape_val_present_flag are signaled. The decoder calculates the maximal index value based on the information and checks if the maximal index value is equal to 0 in step 2240. If the result is "yes", step 2260 is performed. If the result is "no", step 2250 is performed. In step 2250, palette_transpose_flag and palette_run_coding( ) are signaled. In step 2260, palette_transpose_flag is signaled and palette_run_coding( ) is skipped (i.e., all pixels predicted from NCPs).

Syntax Example 3

Figure 2:
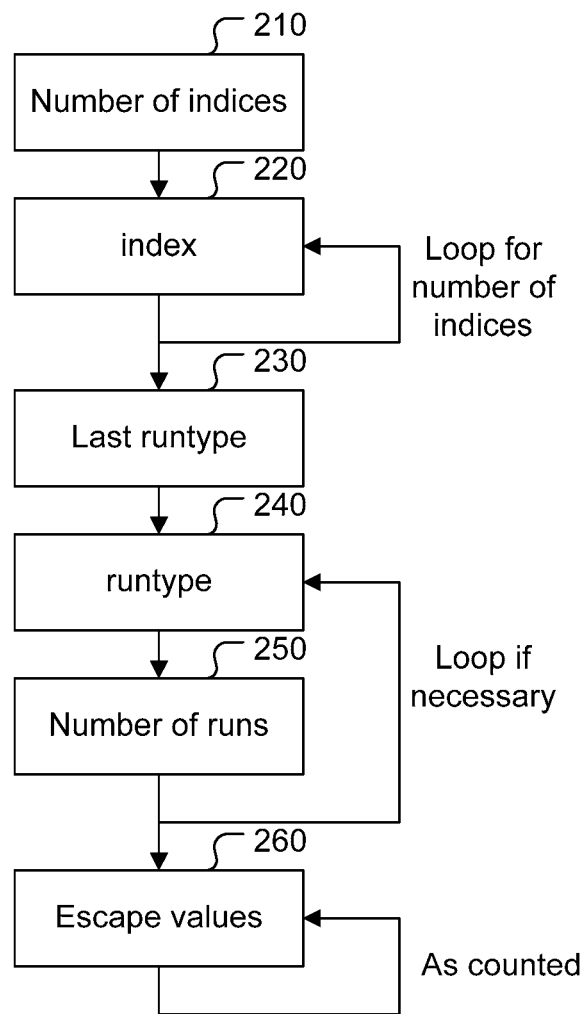
FIG. 2 illustrates an exemplary palette index map syntax signaling according to screen content coding test module version 4 (SCM-4.0).

A new flag any_pixel_from_NCP_flag is added. If any_pixel_from_NCP_flag is off, the other syntax is the same to SCM3.0. In the first row, the copy run mode is not signaled (no prediction across CU). If any_pixel_from_NCP_flag is on, parts of pixels are implied to be predicted from NCPs. The encoder can signal palette_share_flag, palette_prediction_run, num_signaled_palette_entries, palette_escape_val_present_flag, and the decoder can calculate the maximal index value based on the information. If the maximal index value is equal to 0, all pixels are predicted from NCPs, and palette_run_coding( ) can be skipped, as FIG. 2. Otherwise, the other syntax is the same to SCM3.0. In the first row, the copy run mode is signaled (prediction across CU). Note that, If the maximal index value is equal to 1, palette_run_coding( ) and palette_transpose_flag can be skipped.

Figure 23:
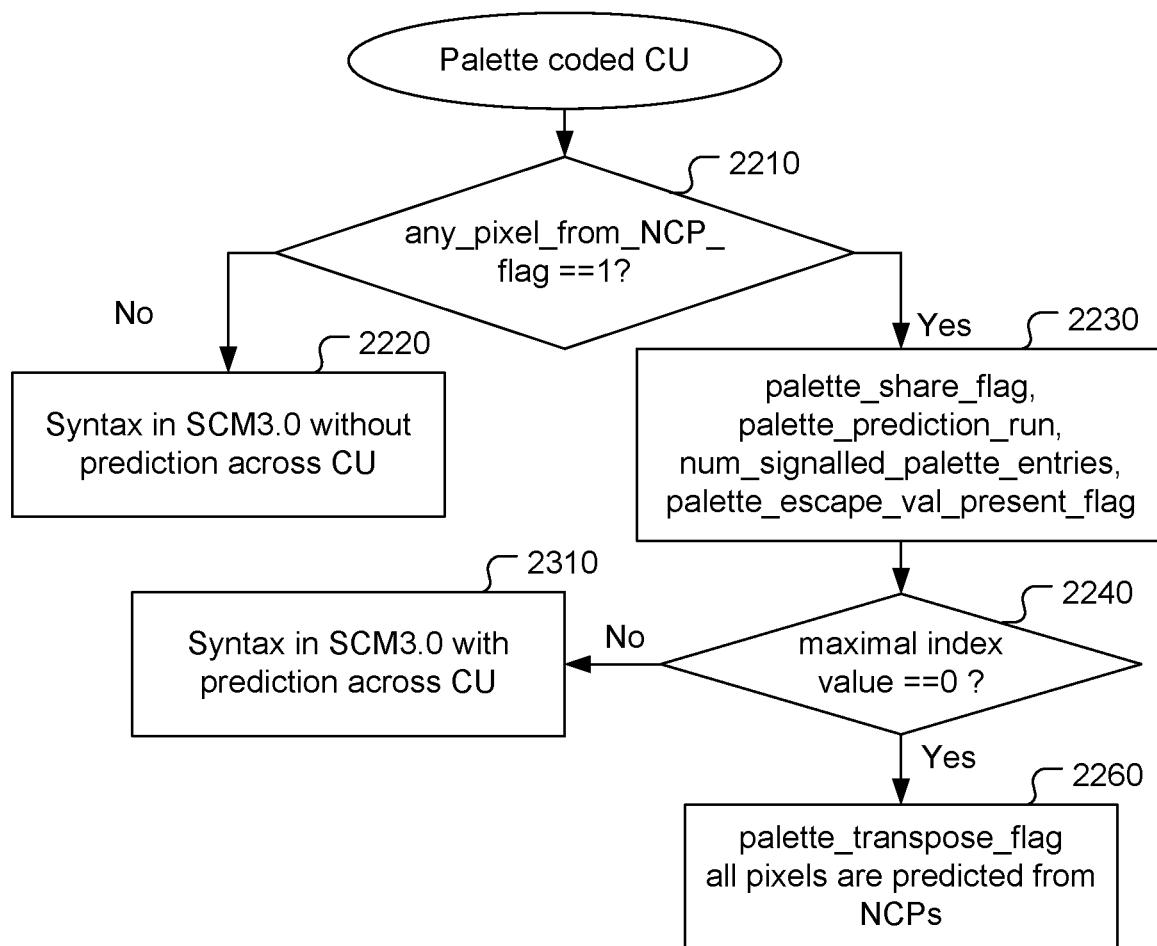
FIG. 23 illustrates another exemplary flow chart similar to that of FIG. 22. However, syntax according to SCM3.0 is used for index prediction across a CU when the maximal index value is not 0.

FIG. 23 illustrates an exemplary flow chart of signaling to support index prediction across a CU according to the above example. The flowchart is substantially the same as that in FIG. 22 except for the case when the maximal index is not 0 (i.e., the "no" path from step 2240). In this case, syntax according to SCM3.0 is used for prediction across CU as shown in step 2310.

Syntax Example 4

"all_pixel_from_NCP_flag" in Syntax Example 1 and "any_pixel_from_NCP_flag" in Syntax Example 2 or 3 can be combined into palette_prediction_run. In SCM3.0, palette_prediction_run are Run-length coding. If the first run (i.e., palette_prediction_run[0]) is equal to a fixed or derived value, all_pixel_from_NCP_flag or any_pixel_from_NCP_flag is inferred as on. The value can be 0 or 1.

Syntax Example 5

Figure 24:
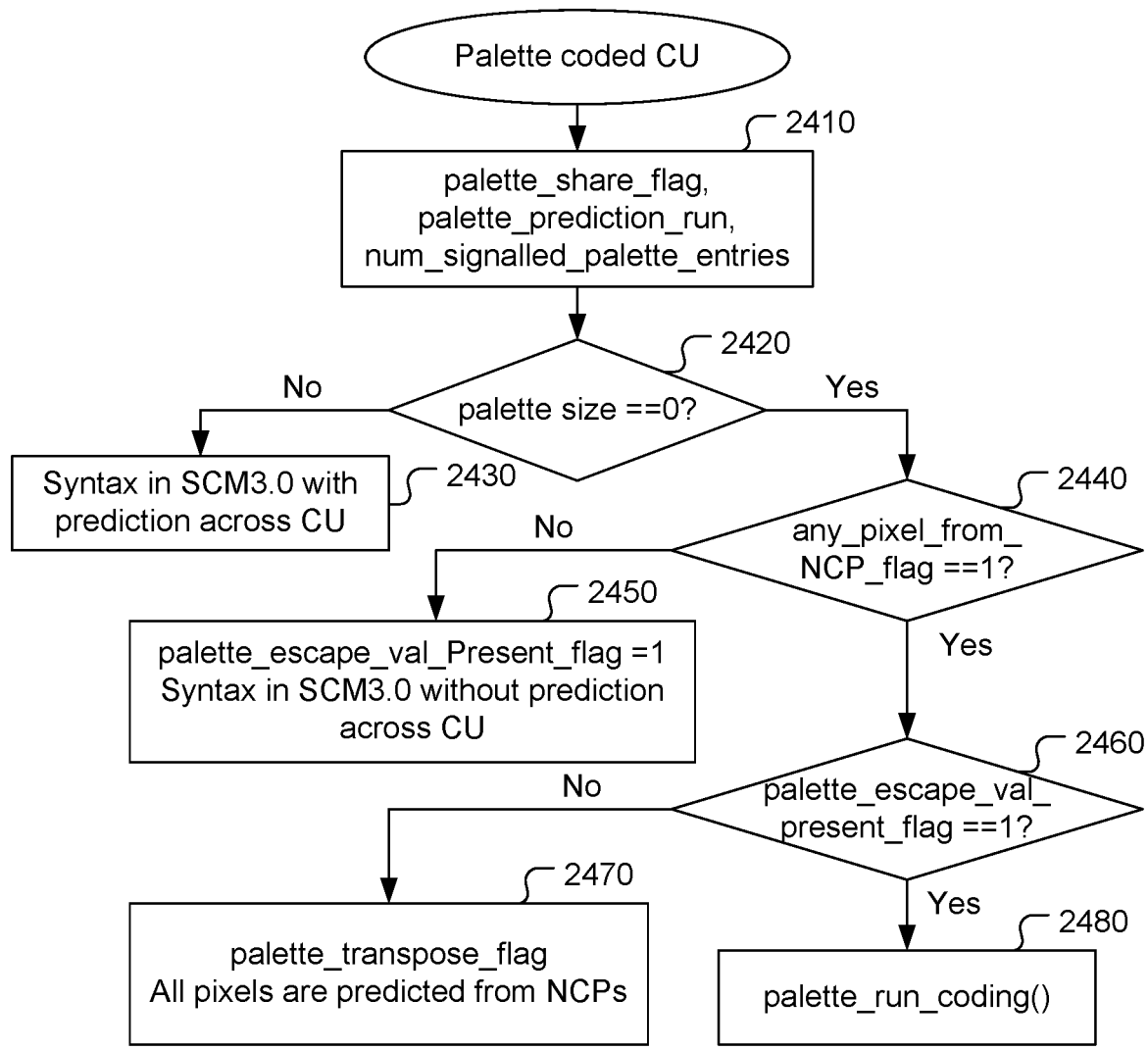
FIG. 24 illustrates an exemplary flow chart of signaling to support index prediction across a CU according to an embodiment of the present invention.

The encoder can signal palette_share_flag, palette_prediction_run, and num_signaled_palette_entries as shown in step 2410 of FIG. 24. Then, the palette size can be derived according to the information.

The palette size is checked to determine whether it is equal to 0 as shown in step 2420. If the palette size is larger than 0 (i.e., the "no" path from step 2420), other syntax is the same as SCM3.0 as shown in step 2430. In the first row, the copy run mode can be signaled or not depending on whether prediction is across CU or not.

If the palette size is equal to 0 (i.e., the "yes" path from step 2420), any_pixel_from_NCP_flag is signaled. Whether any_pixel_from_NCP_flag is on is checked in step 2440. If any_pixel_from_NCP_flag is off (i.e., the "no" path from step 2440), palette_escape_val_present_flag is inferred as on as shown in step 2450 and syntax based on SCM3.0 is used for index prediction without prediction across a CU. If any_pixel_from_NCP_flag is on, palette_escape_val_present_flag is signaled. If any_pixel_from_NCP_flag is on (i.e., the "yes" path from step 2440) and palette_escape_val_present_flag is off (i.e., the "no" path from step 2460), all pixels are predicted from NCPs and palette_run_coding( ) can be skipped as shown in step 2470. If any_pixel_from_NCP_flag is on (i.e., the "yes" path from step 2440) and palette_escape_val_present_flag is on, part of pixels are predicted from NCPs, and palette_run_coding( ) can be signaled as shown in step 2480.

Syntax Example 6

Figure 25:
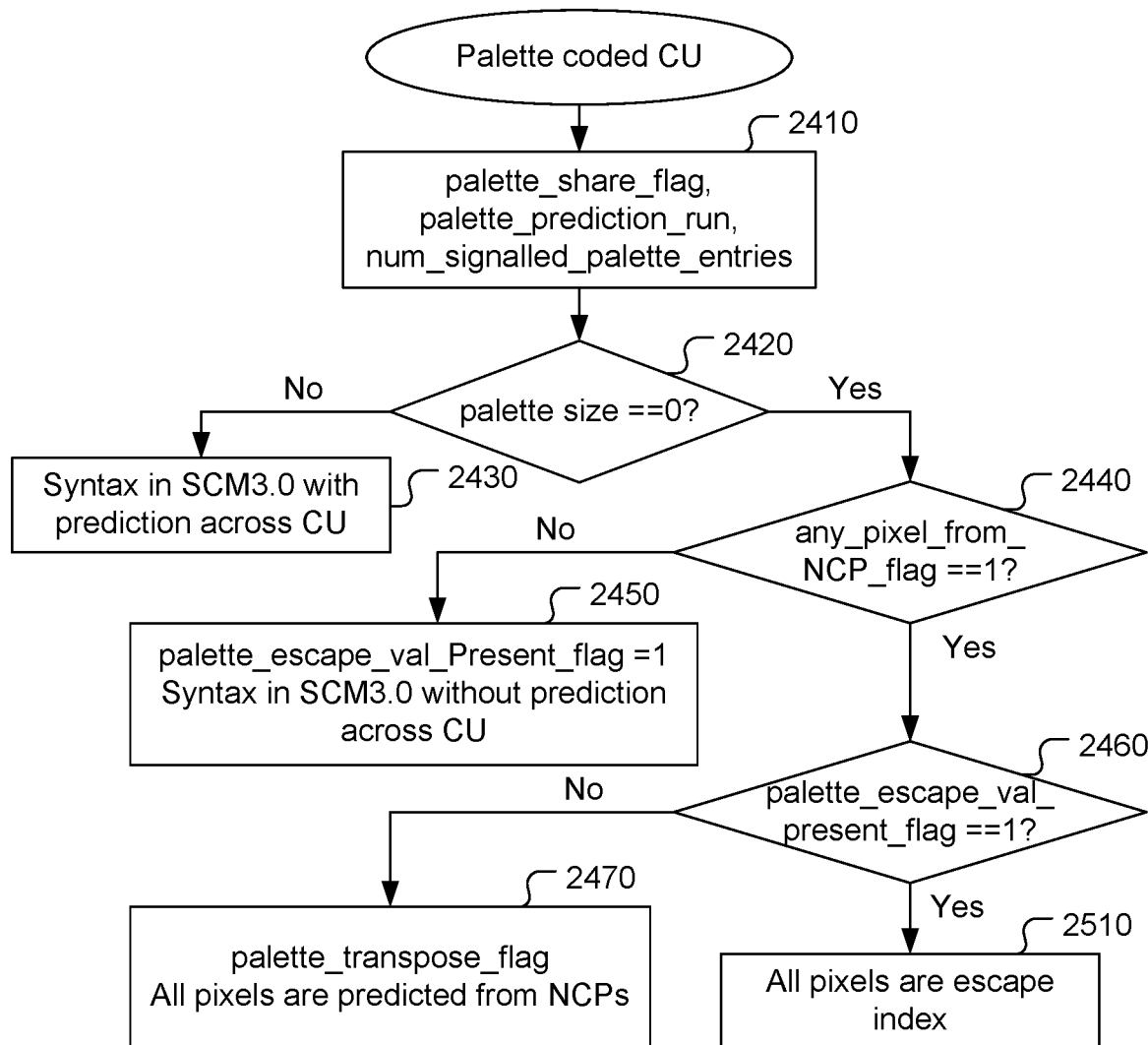
FIG. 25 illustrates an exemplary flow chart of signaling to support index prediction across a CU according to another embodiment of the present invention.

This example is substantially the same as Syntax Example 5 except for the case that any_pixel_from_NCP_flag is on (i.e., the "yes" path from step 2440) and palette_escape_val_present_flag is on (i.e., the "yes" path from step 2460). In this case, all pixels are escape index as shown in step 2510 of FIG. 25.

Syntax Example 7

Figure 26:
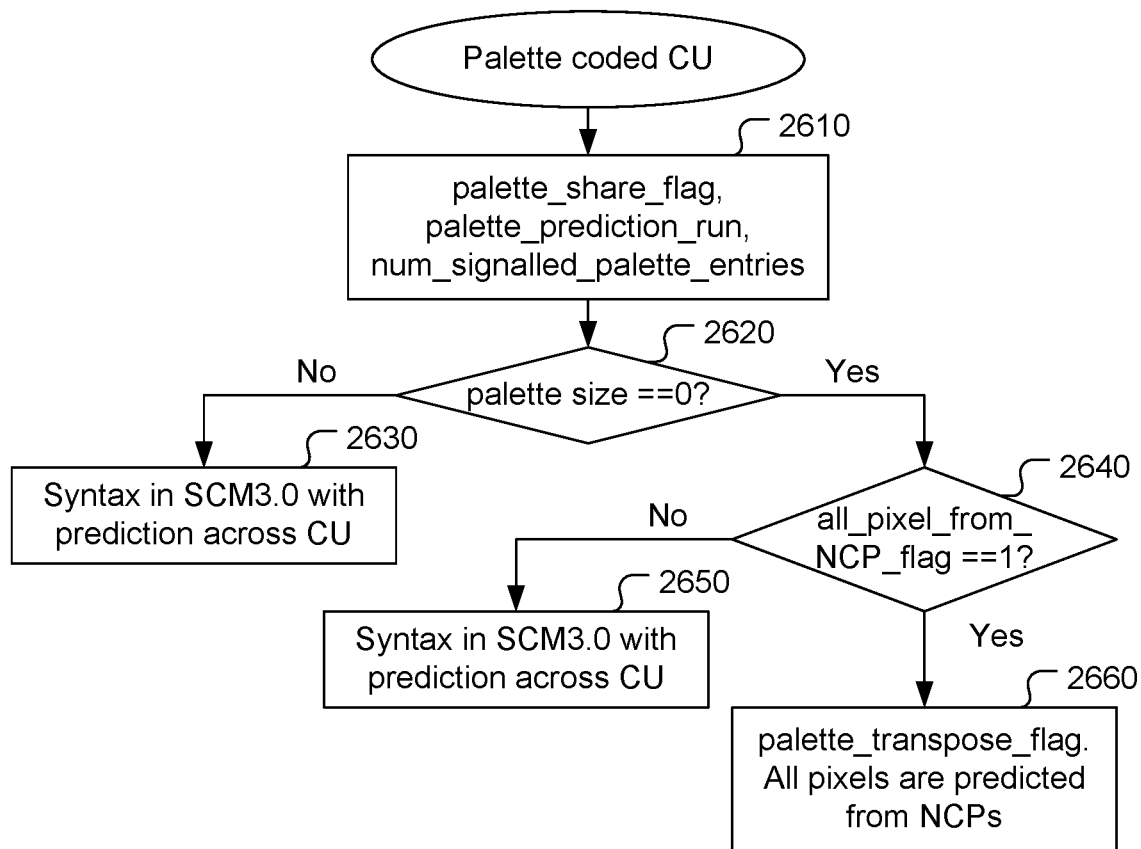
FIG. 26 illustrates an exemplary flow chart of signaling to support index prediction across a CU according to yet another embodiment of the present invention.

The encoder can signal palette_share_flag, palette_prediction_run, num_signaled_palette_entries as shown in step 2610 of FIG. 26. Then, the palette size can be derived according the information.

The palette size is checked in step 2620 to determine whether it is equal to 0. If the palette size is equal to 0 (i.e., the "yes" from step 2620), all_pixel_from_NCP_flag is signaled and whether all_pixel_from_NCP_flag is on is checked at step 2640. If all_pixel_from_NCP_flag is on (i.e., the "yes" path from step 2640), all pixels are implied to be predicted from NCPs as shown in step 2660. In this case, palette_transpose_flag can be signaled to imply prediction from the left NCPs or above NCPs. Other prediction direction can be also signaled. Otherwise, the syntax is the same to SCM3.0 as shown in step 2650. In the first row, the copy run mode can be signaled (i.e., prediction across CU).

Syntax Example 8

Figure 27:
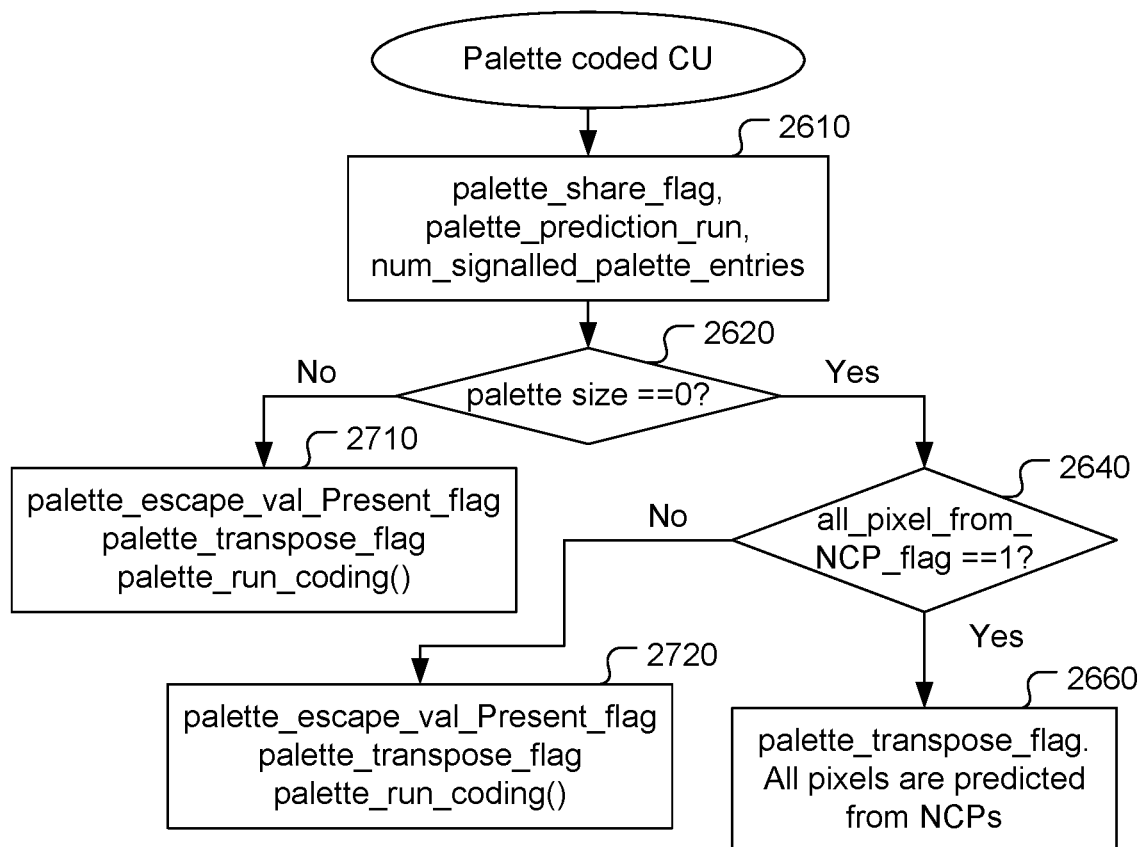
FIG. 27 illustrates an exemplary flow chart of signaling to support index prediction across a CU according to yet another embodiment of the present invention.

In syntax example 8, the run coding can be signaled to indicate case in FIG. 27. The flowchart in FIG. 27 is similar to that in FIG. 26. However, step 2630 and step 2650 in FIG. 26 are replaced by step 2710 and step 2720 (i.e., signaling palette_escape_val_Present_flag, palette_transcope_flag and palette_run_coding( ).

Syntax Example 9

Figure 28A:
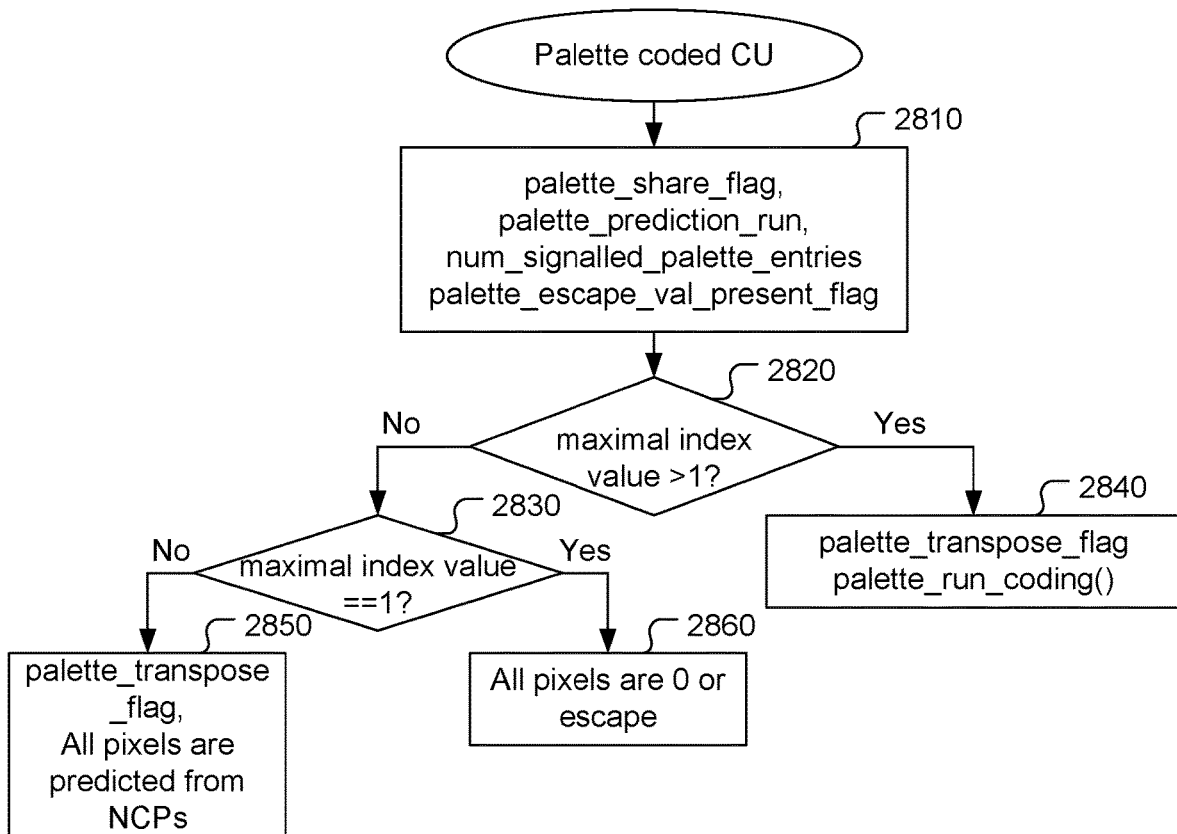
FIG. 28A illustrates an exemplary flow chart of signaling to support index prediction across a CU according to yet another embodiment of the present invention.

The encoder can signal palette_share_flag, palette_re-use_flag( ), num_signaled_palette_entries, palette_escape_val_present_flag as shown in step 2810 of FIG. 28A, and the decoder can calculate the maximal index value based on the information. If the maximal index value is equal to 0 or 1 (i.e., the "no" path from step 2820), palette_run_coding( ) can be skipped. If the maximal index value is equal to 0 (i.e., the "no" path from step 2830), all pixels are predicted from NCPs as shown in step 2850. If the maximal index value is greater than 1 (i.e., the "yes" path from step 2820), palette_transpose_flag can be signaled to imply prediction from left NCPs or above NCPs as shown in step 2840. Other prediction direction can also be signaled. If the maximal index value is equal to 1 (i.e., the "yes" path from step 2830), all color indices in a CU will be inferred as 0 or escape as shown in step 2860.

Syntax Example 10

Figure 28B:
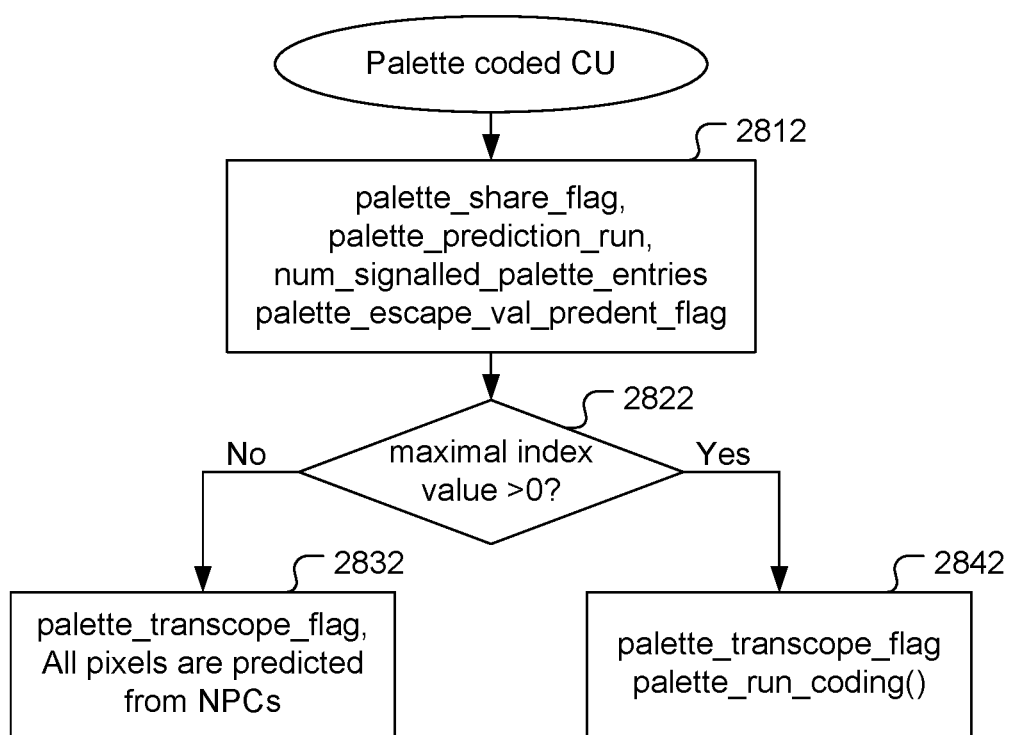
FIG. 28B illustrates an exemplary flow chart of signaling to support index prediction across a CU according to yet another embodiment of the present invention.

The encoder can signal palette_share_flag, palette_re-use_flag( ), num_signaled_palette_entries, palette_escape_val_present_flag as shown in step 2812 of FIG. 28B, and the decoder can calculate the maximal index value based on the information. If the maximal index value is equal to 0 (i.e., the "no" path from step 2822), all pixels are predicted from NCPs as shown in step 2832. If the maximal index value is greater than 0 (i.e., the "yes" path from step 2822), palette_transpose_flag can be signaled to imply prediction from left NCPs or above NCPs as shown in step 2842. Other prediction direction can be also signaled. Palette_run_coding( ) can be skipped. If the maximal index value is larger than 0, palette_transpose_flag and palette_run_coding( ) can be signaled, as FIG. 20.

In above syntax examples, the NCPs can be the nearest above row or the nearest left column. If the number of NCPs line is larger than 1, (e.g., two nearest above rows or two nearest left columns), additional signaling may be needed to indicate which NCPs line is used for prediction. In the case of "all pixel are predicted from NCPs" in the syntax examples, NCPs can be restricted to the nearest above row or the nearest left column.

While specific syntax elements are used to illustrate syntax examples to support index prediction across a CU according to embodiments of the present invention, these specific syntax elements shall not be construed as limitations of the present invention. A person skilled in the art may use other syntax elements and semantics to practice the index prediction across a CU without departing from the spirit of the present invention.

Syntax Element for Enabling Index Prediction Across a CU

For index prediction across a CU, an enabling flag can be signaled in PPS (picture parameter set) or SPS (sequence parameter set). Furthermore, the flag can be signaled only when palette_mode_enabled_flag in SPS is true. Otherwise it will be inferred as false. When the enabling flag for index prediction across a CU is false, index prediction across a CU is disabled. In other embodiment, when the enabling flag for index prediction across a CU is false, neighboring indices or values can be inferred as predefined values. For example, neighboring indices can be set to 0 and neighboring values can be set to 128 for each color component. In this invention, the method to predict indices or values in the block is not limited to the information of neighboring pixels (or blocks).

Context Selection for Run Mode:

In SCM 3.0, the syntax element, palette_mode for index map coding is context encoded. There are two contexts for palette_mode. The context is selected according to palette_mode of the above index. However, for the index in the first row, there is no above index.

Several methods are disclosed to deal with context selection in this case:
1. Context of the first row is fixed to a context. The context can be the first context when the above index is coded by a INDEX-RUN or the second context when the above index is coded by a COPY-RUN mode.
2. There can be the third context for the index of the first row.
3. All indices in a CU use the same context to encode palette_mode. The context can be selected according to the CU size, and all indices in a CU use the same context to encode palette_mode. There can be two contexts in this case. If the CU size larger than a fixed or derived threshold, the first context is used. Otherwise, another context is used. In another example, the number of context can be reduced to 1. In this case, the context is the same for all CU sizes.

Modified Intra Prediction Scheme

In another embodiment, to achieve the same effect of the prediction scheme as disclosed in FIG. 19 and FIG. 20. Based on the conventional Intra prediction in HEVC, HEVC range extension or HEVC SCC, the syntax element, rqt_root_cbf is signaled to indicate whether the TU (transform unit) rooted from the current CU has residual or not. The signaling of rqt_root_cbf can be the same as the rqt_root_cbf signaling for inter CU residual coding in HEVC.

Based on the Intra prediction with rqt_root_cbf according to an embodiment of the present invention, rqt_root_cbf can be selectively applied to a subset of the Intra prediction modes including luma and chroma Intra prediction modes. The rqt_root_cbf is signaled only for those Intra prediction modes in the subset. In one example, the modified scheme is only applied to luma Intra prediction mode equal to horizontal or vertical prediction modes while the chroma Intra prediction mode is not modified.

In yet another embodiment, one CU-level flag is signaled for an Intra CU to indicate if there are residual signal for coding this Intra CU. Similarly, this flag can be selectively applied to a subset of the Intra prediction modes.

Intra Block Copy (IntraBC) Search

An embodiment of the present invention changes source pixels of IntraBC. The pixels for IntraBC prediction and compensation can be the un-filtered pixels (i.e., before deblocking) or filtered pixels (i.e., after deblocking and SAO (sample adaptive offset)) depending on the position of the pixels.

Figure 29:
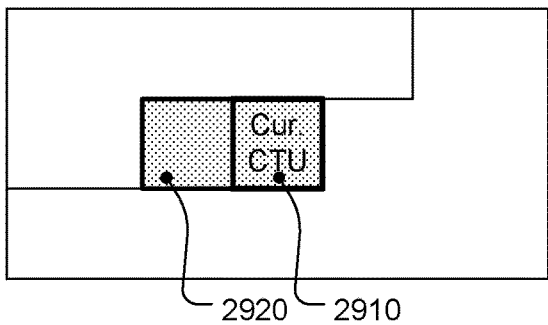
FIG. 29 illustrates an example of source pixels for Intra Block Copy prediction and compensation, where the dot-filled areas correspond to un-filtered pixels in the current CTU (coding tree unit) and left CTU.

For example, the pixels for IntraBC prediction and compensation can bebased on the un-filtered pixels for the pixels in current CTU (2910) and left CTU (2920) as shown in FIG. 29. Other pixels still use filtered pixels. FIG. 29 illustrates an example of source pixels according to an embodiment of the present invention, where the dot-filled pixels are from un-filtered pixels and the clear pixels are from filtered pixels for IntraBC.

Figure 30:
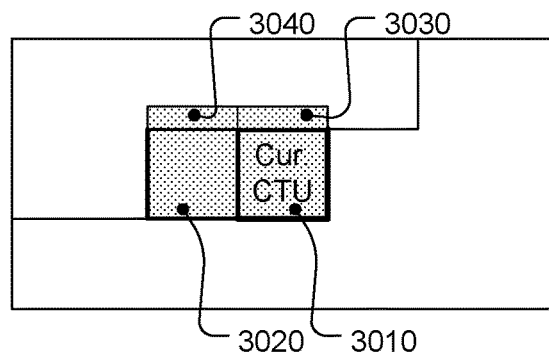
FIG. 30 illustrates another example of source pixels for Intra Block Copy prediction and compensation, where the dot-filled areas correspond to un-filtered pixels in the current CTU (coding tree unit), left CTU, and four bottom lines of the above CTU and four bottom lines of above-left CTU.

In another example, the pixels for IntraBC prediction and compensation are the un-filtered pixels for the pixels in current CTU (3010), left CTU (3020), and four bottom lines of the above CTU (3030) and four bottom lines of above-left CTU (3040) as shown in FIG. 30. Other pixels are using filtered pixels. In FIG. 30, the dot-filled pixels are from un-filtered pixels and the clear pixels are from filtered pixels for IntraBC.

Figure 31:
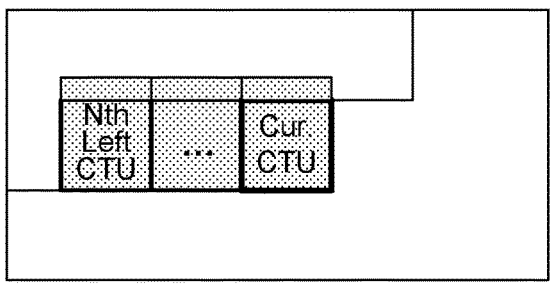
FIG. 31 illustrates yet another example of source pixels for Intra Block Copy prediction and compensation, where the dot-filled areas correspond to un-filtered pixels in the current CTU (coding tree unit), N left CTUs, four bottom lines of the above CTU and four bottom lines of N above-left CTUs.

In another example, the pixels for IntraBC prediction and compensation are the un-filtered pixels for the pixels in the current CTU, N left CTUs, and four bottom lines of the above CTU and four bottom lines of the N above-left CTUs as shown in FIG. 31. N is a positive integer. Other pixels are using filtered pixels. In FIG. 31, the dot-filled pixels are from un-filtered pixels and the clear pixels are from filtered pixels for IntraBC.

Figure 32:
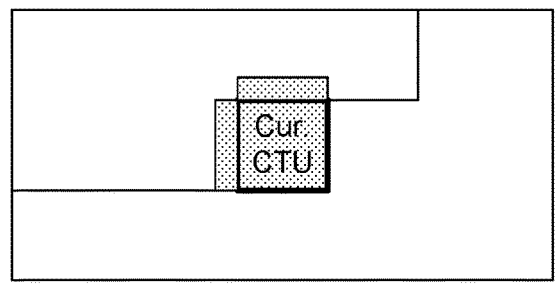
FIG. 32 illustrates yet another example of source pixels for Intra Block Copy prediction and compensation, where the dot-filled areas correspond to un-filtered pixels in the current CTU (coding tree unit), four bottom lines of the above CTU, and four right columns of the left CTU.

In another example, the pixels for IntraBC prediction and compensation are the un-filtered pixels for the pixels in current CTU, four bottom lines of the above CTU, and four right columns of the left CTU. Other pixels are using filtered as shown in FIG. 32. In FIG. 32, the dot-filled pixels are from un-filtered pixels and the clear pixels are from filtered pixels for IntraBC.

Figure 33:
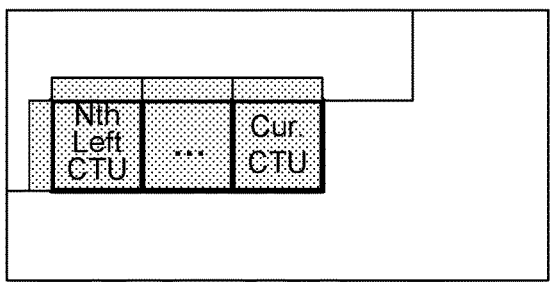
FIG. 33 illustrates yet another example of source pixels for Intra Block Copy prediction and compensation, where the dot-filled areas correspond to un-filtered pixels in the current CTU (coding tree unit), N left CTUs, and four bottom lines of the above CTU, four bottom lines of N above-left CTUs and four right columns of the (N+1)-th left CTU.

In another example, the pixels for IntraBC prediction and compensation are the un-filtered pixels for the pixels in current CTU, N left CTUs, four bottom lines of the above CTU and four bottom lines of of the N above CTUs, and four right columns of the (N+1)-th left CTU. N is a positive integer value. Other pixels are using filtered pixels. In FIG. 33, the dot-filled pixels are from un-filtered pixels and the clear pixels are from filtered pixels for IntraBC.

Figure 34:
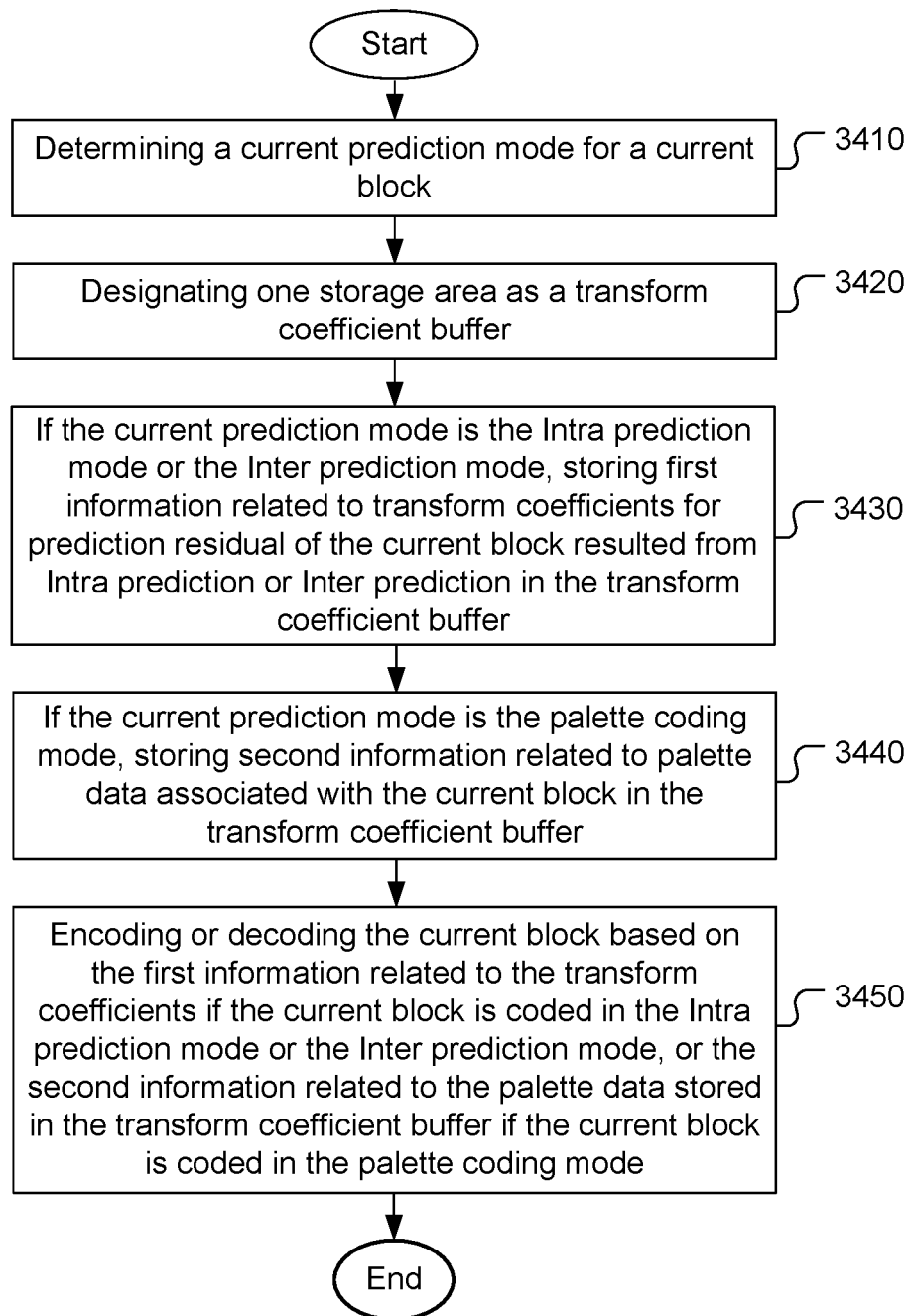
FIG. 34 illustrates an exemplary flowchart for a system incorporating an embodiment of the present invention for palette coded block to share transform coefficient buffer.

FIG. 34 illustrates an exemplary flowchart for a system incorporating an embodiment of the present invention for palette coded block to share transform coefficient buffer. The system determines a current prediction mode for a current block in step 3410 and designates a storage area as a transform coefficient buffer in step 3420. If the current prediction mode is the Intra prediction mode or the Inter prediction, first information related to transform coefficients for prediction residual of the current block resulted from Intra prediction or Inter prediction is stored in the transform coefficient buffer in step 3430. If the current prediction mode is the palette coding mode, information related to palette data associated with the current block is stored in the transform coefficient buffer in step 3440. The current block is then encoded or decoded based on the information related to the transform coefficients if the current block is coded in the Intra prediction mode or the Inter prediction mode, or the information related to the palette data stored in the transform coefficient buffer if the current block is coded in the palette coding mode in step 3450.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more electronic circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video coding using prediction modes including a palette coding mode, an Intra prediction mode, and an Inter prediction mode, the method comprising:
determining a current prediction mode for a current block;
if the current prediction mode for the current block is the Intra prediction mode or the Inter prediction mode,
storing first information related to transform coefficients for prediction residual of the current block resulted from performing an Intra prediction or an Inter prediction in a transform coefficient buffer, and
encoding or decoding the current block based on the first information related to the transform coefficients stored in the transform coefficient buffer; and if the current prediction mode for the current block is the palette coding mode,
storing second information related to palette data associated with the current block in the transform coefficient buffer, wherein when a previous block that is coded according to the Intra prediction mode or the Inter prediction mode exists, a memory area in the transform coefficient buffer that stores previous information related to transform coefficients for prediction residual of the previous block is at least partially reused to store the second information, and
encoding or decoding the current block based on the second information related to the palette data stored in the transform coefficient buffer,
wherein, if the current prediction mode for the current block is the palette coding mode,
the palette data includes a palette run type, a palette run value, palette indices, escape values, escape flags, a palette table, or any combination thereof associated with the current block,
the second information related to the palette data includes the palette data, parsed palette data, or reconstructed palette data,
the escape flags for the current block are obtained from the second information and stored in a part of the transform coefficient buffer, and
reconstructed pixel values or escape values of the current block are stored in another part of the transform coefficient buffer.

2. The method of claim 1, wherein, if the current prediction mode for the current block is the palette coding mode,
palette indices for samples of the current block are obtained from the second information in a parsing stage, and
the palette indices and reconstructed escape values of the current block are stored in the transform coefficient buffer at a decoder side.

3. The method of claim 1, wherein, if the current prediction mode for the current block is the palette coding mode,
palette indices for samples of the current block are obtained from the second information in a parsing stage,
the reconstructed pixel values are obtained using the palette table and the palette indices in the parsing stage, and
the reconstructed pixel values and reconstructed escape values of the current block are stored in the transform coefficient buffer at a decoder side.

4. The method of claim 3, wherein, if the current prediction mode for the current block is the palette coding mode,
one storage area is designated to store the palette table during the parsing stage, and
the one storage area is released from use by the palette table during a reconstruction stage.

5. The method of claim 1, wherein, if the current prediction mode for the current block is the palette coding mode,
the escape flags for the current block are stored in the transform coefficient buffer at a decoder side.

6. The method of claim 1, wherein the escape flags are stored in a most significant bit (MSB) part of the transform coefficient buffer.

7. A method of video coding using prediction modes including a palette coding mode, the method comprising:
receiving a video bitstream corresponding to coded data of a current block or input data associated with the current block;
if a current prediction mode for the current block is the palette coding mode, parsing all escape samples for the current block from the video bitstream at a decoder side, or arranging all the escape samples for the current block in the video bitstream at an encoder side, components of different colors of the escape samples being separately grouped in the video bitstream;
storing a group of components of a same color from the components in a transform coefficient buffer, wherein the transform coefficient buffer is reused to store different groups of components of different colors from the components of one color at a time; and
decoding or encoding the current block according to the palette coding mode using information including the escape samples,
wherein
the palette coding mode is performed according to palette data that includes a palette run type, a palette run value, palette indices, values of the escape samples, escape flags, a palette table, or any combination thereof associated with the current block,
the escape flags for the current block are stored in a part of the transform coefficient buffer, and
reconstructed pixel values or the values of the escape samples of the current block are stored in another part of the transform coefficient buffer.

8. The method of claim 7, wherein the escape samples for the current block are signaled at an end of coded palette data for the current block.

9. The method of claim 7, wherein the components of different colors of the escape samples are grouped and signaled separately for the current block.

10. A method of video coding using prediction modes including a palette coding mode, the method comprising:

parsing all initial palette predictor entries corresponding to initial color values for a global palette table applicable to a sequence, a picture, or a slice from a corresponding sequence parameter set (SPS), a corresponding picture parameter set (PPS), or a corresponding slice header of a video bitstream at a decoder side, or arranging all the initial palette predictor entries for the global palette table applicable to the sequence, the picture, or the slice in the corresponding SPS, the corresponding PPS, or the corresponding slice header at an encoder side, components of different colors of the initial palette predictor entries being separately grouped in the corresponding SPS, the corresponding PPS, or the corresponding slice header; and decoding or encoding at least one palette coded block within the sequence, the picture, or the slice, including:

deriving the global palette table according to the initial palette predictor entries;

obtaining one or more new palette entries corresponding to new color values applicable to the at least one palette coded block;

deriving a palette table for the at least one palette coded block by incorporating the global palette table and the one or more new palette entries; and decoding or encoding one or more samples of the at least one palette coded block according to indices of palette entries of the palette table.

11. A method of video coding using prediction modes including a palette coding mode, the method comprising:

parsing new palette entries corresponding to new color values for a current palette table applicable to a current block from a video bitstream at a decoder side, or arranging the new palette entries for the current palette table applicable to the current block in the video bitstream at an encoder side, components of different colors of the palette entries being separately grouped in the video bitstream; and decoding or encoding the current block using the current palette table derived according to the new palette entries, including:

obtaining a predicted palette table for the current block;

deriving the current palette table for the current block by incorporating the predicted palette table and the new palette entries; and decoding or encoding one or more samples of the current block according to indices of palette entries of the current palette table.

12. The method of claim 10, further comprising storing, in a same buffer one color at a time, different groups of components of different colors from the components of different colors.

* * * * *